(12) United States Patent
Molnar

(10) Patent No.: US 7,878,882 B2
(45) Date of Patent: Feb. 1, 2011

(54) ADVANCED WORKPIECE FINISHING

(75) Inventor: Charles J. Molnar, 12 Malvern Ct., Devon, Wimington, DE (US) 19810

(73) Assignee: Charles J. Molnar, St Marys, GA (US)

( * ) Notice: Subject to any disclaimer, the term of this patent is extended or adjusted under 35 U.S.C. 154(b) by 641 days.

(21) Appl. No.: 11/978,367

(22) Filed: Oct. 29, 2007

(65) Prior Publication Data

US 2008/0057830 A1 Mar. 6, 2008

Related U.S. Application Data

(63) Continuation-in-part of application No. 10/260,458, filed on Sep. 30, 2002, now Pat. No. 7,037,172, and a continuation-in-part of application No. 09/435,181, filed on Nov. 5, 1999, now Pat. No. 6,283,829, and a continuation-in-part of application No. 09/538,409, filed on Mar. 29, 2000, now Pat. No. 6,568,989, and a continuation-in-part of application No. 10/251,341, filed on Sep. 20, 2002, now Pat. No. 6,986,698, and a continuation-in-part of application No. 10/260,458, filed on Sep. 30, 2002, now Pat. No. 7,037,172, and a continuation-in-part of application No. 10/261,113, filed on Sep. 30, 2002, now Pat. No. 7,008,300, and a continuation-in-part of application No. 11/368,295, filed on Mar. 3, 2006, now Pat. No. 7,575,501.

(60) Provisional application No. 60/127,393, filed on Apr. 1, 1999, provisional application No. 60/128,278, filed on Apr. 8, 1999, provisional application No. 60/128,281, filed on Apr. 8, 1999, provisional application No. 60/336,448, filed on Oct. 29, 2001, provisional application No. 60/332,002, filed on Nov. 23, 2001, provisional application No. 60/393,212, filed on Jul. 7, 2002, provisional application No. 60/736,963, filed on Nov. 15, 2005, provisional application No. 60/740,764, filed on Nov. 30, 2005, provisional application No. 60/751,453, filed on Dec. 16, 2005.

(51) Int. Cl.
*B24B 49/00* (2006.01)
*B24B 51/00* (2006.01)
(52) U.S. Cl. .................. 451/5; 451/8; 451/41; 702/179; 702/182
(58) Field of Classification Search .................. 156/345; 216/38, 88, 89, 91; 252/79.1; 438/690–693, 438/745, 753, 756, 757; 451/5, 8, 36, 37, 451/41, 285–289, 4, 9, 10, 11; 700/266; 702/179, 182; 703/12; 705/1, 7, 8; 716/2
See application file for complete search history.

(56) References Cited

U.S. PATENT DOCUMENTS 4,421,068 A 12/1983 Aral .......................... 122/448

(Continued)

OTHER PUBLICATIONS

"Understanding and Using Cost of Ownership", Wright Williams & Kelly, Dublin, CA, rev 0595-1.

*Primary Examiner*—Timothy V Eley

(57) ABSTRACT

An apparatus for planarizing is disclosed. A methods of planarizing are disclosed. The methods and apparatus, can help improve yield and lower the cost of manufacture for planarizing of workpieces having extremely close tolerances such as semiconductor wafers. Cost of manufacture information are used for control. Methods to determine preferred changes to process control parameters are disclosed. Cost of manufacture models can be used and are disclosed. Process models can be used and are disclosed. A method to use business calculations combined with physical measurements to improve control is discussed. Use of business calculations to change the cost of planarizing and finishing semiconductor wafers is discussed. Activity based accounting can be used for some applications. Electro-planarizing and electro-processing for adding and removing material is disclosed. Use of current cost of manufacture information including activity based accounting information for improving manufacture, cost of manufacture, and profitability is discussed.

21 Claims, 16 Drawing Sheets

U.S. PATENT DOCUMENTS

| | | | |
|---|---|---|---|
| 4,544,375 A | 10/1985 | Rehmat et al. | 48/197 |
| 5,023,045 A | 6/1991 | Watnabe et al. | 376/215 |
| 5,486,995 A | 1/1996 | Krist et al. | 364/149 |
| 5,521,814 A | 5/1996 | Teran et al. | 364/402 |
| 5,537,325 A | 7/1996 | Iwakiri et al. | 364/468.28 |
| 5,609,511 A | 3/1997 | Moriyama | 451/5 |
| 5,667,629 A | 9/1997 | Pan | 438/13 |
| 5,682,309 A | 10/1997 | Bartusiak et al. | 700/29 |
| 5,691,895 A | 11/1997 | Kurtzberg et al. | 364/148 |
| 5,695,660 A | 12/1997 | Litvak | 216/85 |
| 5,740,033 A | 4/1998 | Wassick et al. | 364/149 |
| 5,774,633 A | 6/1998 | Baba et al. | 395/23 |
| 5,799,286 A | 8/1998 | Morgan et al. | 705/30 |
| 5,954,997 A | 9/1999 | Kaufman | 252/79.1 |
| 5,972,793 A | 10/1999 | Tseng | 438/692 |
| 5,987,398 A | 11/1999 | Halverson et al. | 702/179 |
| 6,038,540 A | 3/2000 | Krist et al. | 705/8 |
| 6,056,781 A | 5/2000 | Wassick et al. | 703/12 |
| 6,128,540 A | 10/2000 | Van Der Vegt et al. | 700/36 |
| 6,157,916 A | 12/2000 | Hoffman | 705/8 |
| 6,167,360 A | 12/2000 | Erickson | 703/6 |
| 6,197,604 B1 | 3/2001 | Miller | 438/14 |
| 6,263,255 B1 | 7/2001 | Tan et al. | 700/121 |
| 6,268,641 B1 | 7/2001 | Yano et al. | 257/620 |
| 6,298,470 B1 | 10/2001 | Breiner et al. | 716/4 |
| 6,363,294 B1 | 3/2002 | Coronel et al. | 700/121 |
| 6,390,890 B1 | 5/2002 | Molnar | 451/41 |
| 6,408,227 B1 | 6/2002 | Singhvi et al. | 700/266 |
| 6,428,388 B2 | 8/2002 | Molnar | 451/8 |
| 6,435,948 B1 | 8/2002 | Molnar | 451/41 |
| 6,526,547 B2 | 2/2003 | Breiner et al. | 716/4 |
| 6,551,933 B1 | 4/2003 | Molnar | 438/690 |
| 6,567,718 B1 | 5/2003 | Campbell | 700/121 |
| 6,568,989 B1 | 5/2003 | Molnar | 451/5 |
| 6,719,615 B1 | 4/2004 | Molnar | 451/41 |
| 6,739,947 B1 | 5/2004 | Molnar | 451/8 |
| 6,834,212 B1 | 12/2004 | Patel et al. | 700/121 |
| 6,847,854 B2 | 1/2005 | Discenzo | 700/99 |
| 6,904,328 B2 | 6/2005 | Rietman et al. | 700/97 |
| 6,970,857 B2 | 11/2005 | Card et al. | 706/19 |
| 6,986,698 B1 | 1/2006 | Molnar | 451/5 |
| 7,008,300 B1 | 3/2006 | Molnar | 451/41 |
| 7,020,569 B2 | 3/2006 | Cao et al. | 702/108 |
| 7,037,172 B1 | 5/2006 | Molnar | 451/5 |
| 7,050,863 B2 | 5/2006 | Mehta et al. | 700/29 |
| 7,050,873 B1 | 5/2006 | Discenzo et al. | 700/99 |
| 7,131,890 B1 | 11/2006 | Molnar | 451/8 |
| 7,143,016 B1 | 11/2006 | Discenzo et al. | 703/3 |
| 7,156,717 B2 | 1/2007 | Molnar | 451/5 |
| 7,206,646 B2 | 4/2007 | Nixon et al. | 700/83 |
| 7,220,164 B1 | 5/2007 | Molnar | 451/8 |
| 2002/0010563 A1 | 1/2002 | Ratteree et al. | 703/2 |
| 2002/0123818 A1 | 9/2002 | Yamada et al. | 700/121 |
| 2002/0199082 A1 | 12/2002 | Shanmugasundram et al. | 712/208 |
| 2003/0046130 A1 | 3/2003 | Golightly et al. | 705/7 |
| 2003/0061004 A1 | 3/2003 | Discenzo | 702/182 |
| 2003/0083757 A1 | 5/2003 | Card et al. | 700/28 |
| 2003/0093762 A1 | 5/2003 | Rietman et al. | 716/2 |
| 2003/0144932 A1 | 7/2003 | Martin et al. | |
| 2004/0267395 A1 | 12/2004 | Discenzo | 700/99 |

Wafer vaue: $250

Wafer vaue: $500

Die are: 1 cm2
Wafer vaue: $500 providing i) an at least one planarizing apparatus "A", ii) an at least one piece of workpiece fabrication machinery "B" other than the at least one planarizing apparatus "A", iii) an at least one piece of metrology equipment, iv) an at least one processor readable memory device, v) an at least one operative computerized network connecting the at least one processor readable memory device, the at least one planarizing apparatus "A", the at least one piece of workpiece fabrication machinery "B", and the at least one piece of metrology equipment

↓ applying a planarizing energy to the workpiece during a planarizing operation with the at least one planarizing apparatus "A"

↓ sensing an in situ processing information related to the planarizing operation with an operative sensor

↓ determining a change for a process control using an at least one processor, the at least one operative computerized network, and a family of processing information comprising (i) at least in part an at least one cost of manufacture model including at least in part an activity accounting information related at least in part to the planarizing operation, (ii) the in situ information related at least in part to the planarizing operation, (iii) at least in part an at least one process model related at least in part to the planarizing operation, (iv) an information from the at least one piece of metrology equipment related at least in part to the planarizing operation, and (v) an information at least in part related to the at least one workpiece fabrication machinery "B" and at least in part related to the planarizing operation

↓ changing the process control with an at least one operative controller for controlling a manufacturing operation related at least in part to the planarizing operation

Figure 10 providing a manufacturing process control information for a planarizing operation previously used by an at least one processor for an at least one process control and wherein the manufacturing process control information comprises manufacturing process control information at least in part from an operative network including an at least one planarizing apparatus "A" for an at least one planarizing operation, an at least one piece of workpiece fabrication machinery "B" other than the at least one planarizing apparatus "A", and an at least one piece of metrology equipment and wherein the manufacturing process control information includes information members comprising (i) at least in part an at least one cost of manufacture model including at least in part an activity accounting information related at least in part to the at least one planarizing operation, (ii) an in situ information related at least in part to the at least one planarizing operation, (iii) at least in part an at least one process model related at least in part to the at least one planarizing operation, (iv) an information from the at least one piece of metrology equipment related at least in part to the at least one planarizing operation, and (v) an information at least in part related to the at least one workpiece fabrication machinery "B" and at least in part related to the at least one planarizing operation

↓ supplying the manufacturing process control information to an at least one computer

↓ using the at least one computer to determine a change to an at least one information member in the manufacturing process control information

↓ changing the at least one information member in the manufacturing process control information forming a changed manufacturing process control information

↓ supplying the changed manufacturing process control information for an at least one changed process control for use in an at least one operative controller for controlling a manufacturing operation at least in part related to the at least one planarizing operation

Figure 11 providing a manufacturing process control information related at least in part to an at least one polishing operation previously used by an at least one processor for an at least one process control and wherein the manufacturing process control information comprises manufacturing process control information at least in part from an operative network including an at least one polishing apparatus "A", an at least one piece of workpiece fabrication machinery "B" other than the at least one polishing apparatus "A", and an at least one piece of metrology equipment and wherein the manufacturing process control information includes information members comprising (i) at least in part an at least one cost of manufacture model including at least in part an activity accounting information related at least in part to the at least one polishing operation, (ii) an in situ information related at least in part to the at least one polishing operation, (iii) at least in part an at least one process model related at least in part to the at least one polishing operation, (iv) an information from the at least one piece of metrology equipment related at least in part to the at least one polishing operation, and (v) an information at least in part related to the at least one workpiece fabrication machinery "B" and at least in part related to the at least one polishing operation

↓ supplying the manufacturing process control information to an at least one computer

↓ using the at least one computer to determine a change to an at least one information member in the manufacturing process control information

↓ changing the at least one information member in the manufacturing process control information forming a changed manufacturing process control information

↓ supplying the changed manufacturing process control information for an at least one changed process control for use in an at least one operative controller for controlling a manufacturing related to the at least one polishing operation

ADVANCED WORKPIECE FINISHING

CROSS REFERENCE TO RELATED APPLICATIONS

This application claims benefit of Provisional Application Ser. No. 60/127,393 filed on Apr. 1, 1999 entitled "Control of semiconductor wafer finishing"; Provisional Application Ser. No. 60/128,278 filed on Apr. 8, 1999 entitled "Improved semiconductor wafer finishing control", 60/128,281 filed on Apr. 8, 1999 entitled "Semiconductor wafer finishing with partial organic boundary lubricant", Provisional Application Ser. No. 60/336,448 filed on Oct. 29, 2001 entitled "Wafer finishing control", Provisional Application Ser. No. 60/332,002 filed on Nov. 23, 2001 entitled "Wafer refining control", Provisional Application Ser. No. 60/393,212 filed on Jul. 7, 2002 entitled "Wafer refining", Provisional Application Ser. No. 60/736,963 entitled "Advanced workpiece electro-processing" with filing date Nov. 15, 2005, Provisional Application Ser. No. 60/740,764 entitled "Advanced workpiece finishing" filed Nov. 30, 2005, and Provisional Application Ser. No. 60/751,453 entitled Advanced workpiece processing filed Dec. 16, 2005, This application claims benefit of Utility patent application Ser. No. 09/435,181 filed on Nov. 5, 1999 entitled "In situ friction detector method for finishing semi-conductor wafers" which is now U.S. Pat. No. 6,283,289, Utility patent application Ser. No. 09/538,409 filed Mar. 29, 2000 entitled "Improved semiconductor wafer finishing control" now U.S. Pat. No. 6,568,989, Utility patent application with Ser. No. 10/251,341 filed on Sep. 20, 2002 with title "Improved wafer refining" currently expected to issue with U.S. Pat. No. 6,986,698, Utility patent application with Ser. No. 10/260,458 filed on Sep. 30, 2002 with title "Advanced wafer planarizing", Utility patent application with Ser. No. 10/261,113 filed on Sep. 30, 2002 with title "Advanced wafer refining", and Utility patent application with Ser. No. 11/368,295 filed on Mar. 3, 2006 with title "Advanced workpiece finishing", Provisional Applications and Utility Patents above are included herein by reference in their entirety.

BACKGROUND OF INVENTION

Planarizing semiconductor wafers during manufacture is generally known in the art. Chemical mechanical polishing (CMP) is generally known in the art and a currently preferred method to planarize semiconductor wafers during manufacture. For example U.S. Pat. No. 5,177,908 issued to Tuttle in 1993 describes a finishing element for semiconductor wafers, having a face shaped to provide a constant, or nearly constant, surface contact rate to a workpiece such as a semiconductor wafer in order to effect improved planarity of the workpiece. U.S. Pat. No. 5,234,867 issued to Schultz et al. in 1993 describes an apparatus for planarizing semiconductor wafers which in a preferred form includes a rotatable platen for polishing a surface of the semiconductor wafer where a motor for rotating the platen and a non-circular pad is mounted atop the platen to engage and polish the surface of the semiconductor wafer. Other planarizing process for adding to or removing material to form a planar surface are generally known. Electrochemical planarizing and vapor deposition processes (such as electroplating, electropolishing, Chemical Vapor Deposition (CVD) and/or Physical Vapor Deposition processes) processes are generally known to those skilled in the semiconductor wafer processing arts.

Semiconductor wafer fabrication generally requires the formation of layers of material having particularly small thicknesses. A typical conductor layer, such as a metallization layer, is generally 2,000 to 6,000 angstroms thick and a typical insulating layer, for example an oxide layer, is generally 3,000 to 5,000 angstroms thick. The actual thickness is at least partially dependent on the function of the layer along with the function and design of the semiconductor wafer. A gate oxide layer can be less than 100 angstroms thick while a field oxide is in the thousands of angstroms in thickness. In higher density and higher value semiconductor wafers the layers can be below 500 angstroms in thickness. Generally during semiconductor fabrication, layers thicker than necessary are formed and then thinned down to the required tolerances with techniques needed such as Chemical Mechanical Polishing. Because of the strict tolerances, extreme care is given to attaining the required thinned down tolerances. As such, it is generally useful to accurately control the thinning of the layer during the thinning process and also as it reaches the required tolerances. The end point for the thinning, planarizing, or polishing operation has generally very close tolerances. One current method to remove selected amounts of material is to remove the semiconductor wafer periodically from the planarizing and/or polishing for measurements such as thickness layer measurements. Although this can be done it is time consuming and adds extra expense to the operation. Further the expensive workpieces can be damaged during transfer to or from the measurement process further decreasing process yields and increasing costs. In fact, microscratches which are deep enough to penetrate the target surface can occur before the target surface depth is reached causing lower yields and lost product. Microscratches and other unwanted surface defects formed during the planarizing and/or polishing can adversely lower the polishing yield adding unnecessary expense to the polishing step in semiconductor wafer manufacture.

BRIEF SUMMARY OF INVENTION

The control of the finishing and/or planarizing step and/or operations are very complex. The finishing and/or planarizing step(s) has generally multiple process control parameters. The optimizing of one control parameter to improve the control parameter's direct effect on cost of manufacture can have other generally unintended results which increase the cost of manufacture rather than the generally intended effect of decreasing the cost of manufacture. The manufacturing cost for the planarizing and/or finishing step is also complex. Cost of manufacture parameters can have different response surfaces to changes in control parameters thus making easy predictions on the overall cost effect generally very difficult. To most effectively evaluate the cost of manufacture for a material adding or removing planarizing and/or processing step generally requires the evaluation of multiple variables, and each with varying effects on the cost of manufacture. Further, some of the variables compete against each other. For instance, one may have a negative slope and one have an entirely different positive slope. One may be linear and one non-linear. One may have synergistic effects with a certain process control variable and not with another during a particular finishing application. For instance, a higher finishing rate can lower some aspects of the cost of manufacture such as fixed costs but can also increase other aspects, such as reducing yields. Some cost of manufacture parameters vary with the amount of product produced. Some cost of manufacture parameters remain fixed even as the amount of product produced is changed. Still further some costs can vary with the location and/or time of day. For example there can be shift pay differentials and/or energy cost differences during peak usage periods and non-peak usage periods. Still further some parameters can be changed which improve yields but reduce the semiconductor wafer throughput enough to raise the cost of manufacture for each semiconductor wafer. Still further, some costs can vary by customer or even by customer order (such as setup costs, overtime, shipping, packaging, etc.). Thus there is a need to evaluate the material adding and removing planarizing and/or processing effects on the cost of manufacture. Cost of manufacture can be done in a number of generally accounting methods. Thus there is a need to evaluate in real time to use cost of manufacture information and/or parameters to improve planarizing and/or processing. There are preferred parameters of the cost of manufacture to use for real time process control of chemical mechanical polishing. Tracking the semiconductor wafer as it undergoes multiple planarizing and/or processing steps to update and change the manufacturing cost model can aid advanced real time process control.

There is a need to develop a control subsystem, more preferably an in situ control subsystem, which changes the cost of manufacture for a planarizing and/or processing step. As discussed above, there is a need for an real time control for planarizing and/or processing methods which change, more preferably improve, the cost of manufacture for a planarizing and/or a processing operations. There is a need for planarizing and/or processing method which controls the planarizing and/or processing using a cost of manufacture model. There is a need for planarizing and/or processing method which controls the planarizing and/or processing using a business model. There is a need for a cost of manufacture model which tracks the semiconductor wafer during its various planarizing and/or processing steps and uses a cost of manufacture model appropriate to that individual planarizing and/or processing step. There is a need for operative sensors which monitor the planarizing and/or processing in a manner that improves the ability to control and improve the cost of manufacture for a particular finishing step.

It is an advantage of this invention to develop a control subsystem, more preferably an in situ control subsystem, which changes the cost of manufacture for a planarizing and/or processing step. It is an advantage of this invention to develop a control subsystem, more preferably an in situ control subsystem, which improves the cost of manufacture for a planarizing and/or processing step. It is an advantage of this invention to develop in some preferred embodiments an in situ control subsystem which can change the cost of manufacture for a planarizing and/or processing step. It is an advantage of this invention to develop a planarizing and/or processing method which improves control of planarizing and/or finishing during refining using a cost of manufacture parameters. It is an advantage of this invention to develop a method to use metrics related to cost of manufacture to improve control of the semiconductor wafer cost during its various planarizing and/or processing steps and to use this control to change, more preferably improve, the manufacturing cost in situ at one or more individual planarizing and/or processing operations. It is an advantage of this invention to develop a preferred method which uses preferred operative sensors which monitor the planarizing and/or processing in a manner that improves the ability to control and improve the cost of manufacture for multiple planarizing and/or processing steps and/or particular planarizing and/or processing steps. Further, merely controlling planarizing and/or processing in a manner that stops planarizing and/or processing at the endpoint, misses a particularly preferred aspect of controlling the processing and/or polishing process itself during a time period where defects such as microscratches, other unwanted surface defects, and unwanted costs can occur. It is generally an advantage of the improved control herein to improve the planarizing and planarizing control while also changing, more preferably reducing, the cost of manufacture of the workpiece. It is generally an advantage of the improved control herein to improve the planarizing and planarizing control while also changing, more preferably improving, the profitability of the workpiece. It is generally an advantage of the improved control herein to improve the processing and processing control while also changing, more preferably improving, the profitability of the workpiece. Further depending of the state of the business to improve profitability of the planarized workpieces a lower cost of manufacture can reduce profitability by reducing revenue such as in a generally sold out conditions. During non-sold out conditions, generally reducing cost of manufacture can improve profitability. Further, the sold out condition (or lack thereof) can vary between products and/or layers. Activity based accounting gives generally improved cost information for process control. Thus there is a need to evaluate in to use an at least one cost of manufacture model including at least in part an activity accounting information related at least in part to a planarizing operation for manufacturing control. Thus there is a need to evaluate in to use an at least one cost of manufacture model including at least in part an activity accounting information related at least in part to a planarizing operation and other manufacturing information for manufacturing control. Thus there is a need to use cost of manufacture information to improve polishing and/or planarizing. Thus there can be a need to know revenue information for some business conditions. Thus there can be a need to have a model with cost to use with revenue information for some business conditions for process control. Thus there can be a need for a model having cost to use with revenue and profit information for some business conditions for process control. It is an advantage to improve the profitability of a planarized and/or polished workpiece with advanced control. It is an advantage to improve the control of cost of manufacture of a planarized and/or polished workpiece with advanced control. Improved real-time control is preferred for some applications.

A preferred embodiment is directed to a factory for processing a workpiece comprising an at least one planarizing apparatus "A" for a planarizing operation; an at least one piece of workpiece fabrication machinery "B" other than the at least one planarizing apparatus "A"; an at least one piece of metrology equipment; an at least one processor; an at least one processor readable memory device; an at least one operative computerized network connecting the at least one processor, the at least one processor readable memory device, the at least one planarizing apparatus "A", the at least one piece of workpiece fabrication machinery "B", and the at least one piece of metrology equipment; an at least one operative sensor for sensing an in situ planarizing information; and wherein the at least one processor readable memory device includes stored information comprising (i) at least in part an at least one cost of manufacture model including at least in part an activity based cost information related at least in part to the planarizing operation, (ii) the in situ planarizing information, (iii) at least in part an at least one process model related at least in part to the planarizing operation, (iv) an information from the at least one piece of metrology equipment related at least in part to the planarizing operation, and (v) an information at least in part related to the at least one workpiece fabrication machinery "B" and at least in part related to the planarizing operation; and an at least one operative controller for controlling a manufacturing operation operatively connected at least in part to the stored information.

A preferred embodiment is directed to a method for processing a workpiece in a factory, the method comprising providing i) an at least one planarizing apparatus "A", ii) an at least one piece of workpiece fabrication machinery "B" other than the at least one planarizing apparatus "A", iii) an at least one piece of metrology equipment, iv) an at least one processor readable memory device, v) an at least one operative computerized network connecting the at least one processor readable memory device, the at least one planarizing apparatus "A", the at least one piece of workpiece fabrication machinery "B", and the at least one piece of metrology equipment; applying a planarizing energy to the workpiece during a planarizing operation with the at least one planarizing apparatus "A"; sensing an in situ processing information related to the planarizing operation with an operative sensor; determining a change for a process control using an at least one processor, the at least one operative computerized network, and a family of processing information comprising (i) at least in part an at least one cost of manufacture model including at least in part an activity based cost information related at least in part to the planarizing operation, (ii) the in situ information related at least in part to the planarizing operation, (iii) at least in part an at least one process model related at least in part to the planarizing operation, (iv) an information from the at least one piece of metrology equipment related at least in part to the planarizing operation, and (v) an information at least in part related to the at least one workpiece fabrication machinery "B" and at least in part related to the planarizing operation, and changing the process control with an at least one operative controller for controlling a manufacturing operation related at least in part to the planarizing operation.

A preferred embodiment is directed to a method for processing a workpiece, the method comprising providing a manufacturing process control information for a planarizing operation previously used by an at least one processor for an at least one process control and wherein the manufacturing process control information comprises manufacturing process control information at least in part from an operative network including an at least one planarizing apparatus "A" for an at least one planarizing operation, an at least one piece of workpiece fabrication machinery "B" other than the at least one planarizing apparatus "A", and an at least one piece of metrology equipment and wherein the manufacturing process control information includes information members comprising (i) at least in part an at least one cost of manufacture model including at least in part an activity based cost information related at least in part to the at least one planarizing operation, (ii) an in situ information related at least in part to the at least one planarizing operation, (iii) at least in part an at least one process model related at least in part to the at least one planarizing operation, (iv) an information from the at least one piece of metrology equipment related at least in part to the at least one planarizing operation, and (v) an information at least in part related to the at least one workpiece fabrication machinery "B" and at least in part related to the at least one planarizing operation; and supplying the manufacturing process control information to an at least one computer; using the at least one computer to determine a change to an at least one information member in the manufacturing process control information; changing the at least one information member in the manufacturing process control information forming a changed manufacturing process control information; and supplying the changed manufacturing process control information for an at least one changed process control for use in an at least one operative controller for controlling a manufacturing operation at least in part related to the at least one planarizing operation.

A preferred embodiment is directed to a method for manufacturing a workpiece, the method comprising providing a manufacturing process control information related at least in part to an at least one polishing operation previously used by an at least one processor for an at least one process control and wherein the manufacturing process control information comprises manufacturing process control information at least in part from an operative network including an at least one polishing apparatus "A", an at least one piece of workpiece fabrication machinery "B" other than the at least one polishing apparatus "A", and an at least one piece of metrology equipment and wherein the manufacturing process control information includes information members comprising (i) at least in part an at least one cost of manufacture model including at least in part an activity based cost information related at least in part to the at least one polishing operation, (ii) an in situ information related at least in part to the at least one polishing operation, (iii) at least in part an at least one process model related at least in part to the at least one polishing operation, (iv) an information from the at least one piece of metrology equipment related at least in part to the at least one polishing operation, and (v) an information at least in part related to the at least one workpiece fabrication machinery "B" and at least in part related to the at least one polishing operation; and supplying the manufacturing process control information to an at least one computer; using the at least one computer to determine a change to an at least one information member in the manufacturing process control information; changing the at least one information member in the manufacturing process control information forming a changed manufacturing process control information; and supplying the changed manufacturing process control information for an at least one changed process control for use in an at least one operative controller for controlling a manufacturing related to the at least one polishing operation.

A preferred embodiment is directed to a method for processing a workpiece in a factory, the method comprising providing i) an at least one polishing apparatus "A", ii) an at least one piece of workpiece fabrication machinery "B" other than the at least one polishing apparatus "A", iii) an at least one piece of metrology equipment, iv) an at least one processor readable memory device, v) an at least one operative computerized network connecting the at least one processor readable memory device, the at least one polishing apparatus "A", the at least one piece of workpiece fabrication machinery "B", and the at least one piece of metrology equipment; applying polishing energy to the workpiece during a polishing operation; sensing an in situ processing information related to the polishing operation with an operative sensor; determining a change for a process control using an at least one processor, the at least one operative computerized network, and a family of processing information comprising (i) at least in part an at least one cost of manufacture model including at least in part an activity based cost information related at least in part to the polishing operation, (ii) the in situ information related at least in part to the polishing operation, (iii) at least in part an at least one process model related at least in part to the polishing operation, (iv) an information from the at least one piece of metrology equipment related at least in part to the polishing operation, and (v) an information at least in part related to the at least one workpiece fabrication machinery "B" and at least in part related to the polishing operation; and changing the process control with an at least one operative controller for controlling a manufacturing operation related at least in part to the polishing operation.

One or more of advantages are found in the embodiments of this invention. Illustrative preferred advantages can include improved control of activity costs or quality. Illustrative preferred advantages can include improved feedforward and/or feedback control using a model having activity cost information. Illustrative preferred advantages can include improved adaptive and/or predictive control using a model having activity cost information. Illustrative preferred advantages can include improved control of planarizing and/or polishing. Illustrative preferred advantages can include improved control of planarizing and/or polishing as one operation in manufacturing facility having more than one manufacturing operation. Illustrative preferred advantages can include improved control of manufacturing when at least one operation includes planarizing and/or polishing and wherein manufacturing includes at least two operations. Illustrative preferred advantages can include improved control of manufacturing when at least one operation includes planarizing and/or polishing and wherein manufacturing includes a multiplicity of manufacturing operations.

These and other advantages of the invention will become readily apparent to those of ordinary skill in the art after reading the following disclosure of the invention. Other preferred embodiments are discussed herein.

BRIEF DESCRIPTION OF SEVERAL VIEWS OF THE DRAWINGS

FIGS. 10-11 are preferred methods of planarizing

FIG. 12 is a preferred method of polishing

REFERENCE NUMERALS IN DRAWINGS

Figure 1:
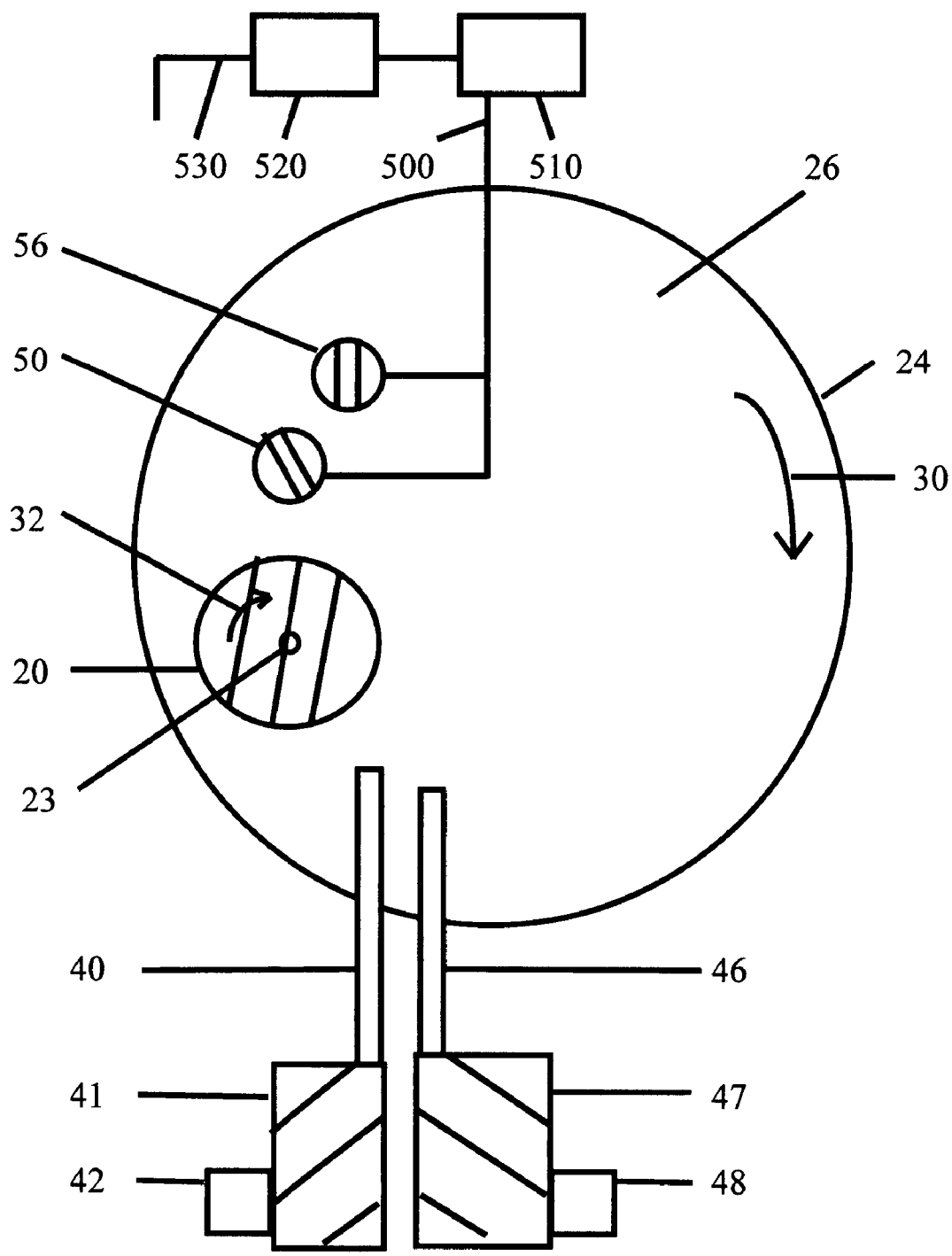
FIG. 1 is an artist's drawing of a preferred embodiment of some equipment from a top down perspective.

Reference Numeral 20 workpiece
Reference Numeral 21 workpiece surface facing away from the workpiece surface being finished
Reference Numeral 22 surface of the workpiece being finished
Reference Numeral 23 center of rotation of the workpiece
Reference Numeral 24 finishing element
Reference Numeral 26 finishing element finishing surface
Reference Numeral 28 finishing element surface facing away from workpiece surface being finished
Reference Numeral 29 finishing composition and, optionally, alternate finishing composition
Reference Numeral 30 direction of rotation of the finishing element finishing surface
Reference Numeral 32 direction of rotation of the workpiece being finished
Reference Numeral 33 pressure applied to the operative finishing interface substantially perpendicular to the finishing motion
Reference Numeral 34 operative finishing motion between the workpiece surface being finished and the finishing element finishing surface
Reference Numeral 35 applied pressure between the workpiece surface being finished and the finishing element finishing surface
Reference Numeral 36 operative finishing motion between the first friction sensor probe surface and the finishing element finishing surface
Reference Numeral 37 applied pressure between the second friction sensor probe surface and the finishing element finishing surface
Reference Numeral 38 operative friction motion between the second friction sensor probe surface and the finishing element finishing surface
Reference Numeral 39 applied pressure between the second friction sensor probe surface and the finishing element finishing surface
Reference Numeral 40 finishing composition feed line
Reference Numeral 41 reservoir of finishing composition
Reference Numeral 42 feed mechanism for finishing composition
Reference Numeral 46 alternate finishing composition feed line
Reference Numeral 47 alternate reservoir of finishing composition
Reference Numeral 48 alternate feed mechanism for finishing composition
Reference Numeral 50 first friction sensor probe
Reference Numeral 51 first friction sensor surface
Reference Numeral 52 first friction probe motor
Reference Numeral 54 operative connection between first friction sensor probe and first friction drive motor
Reference Numeral 56 second friction sensor probe
Reference Numeral 57 second friction sensor surface
Reference Numeral 58 second friction probe motor
Reference Numeral 56 operative connection between second friction sensor probe and second friction drive motor
Reference Numeral 61 unwanted raised surface region on the workpiece
Reference Numeral 62 carrier
Reference Numeral 63 operative contact element
Reference Numeral 64 motor for carrier
Reference Numeral 70 platen
Reference Numeral 72 surface of platen facing finishing element
Reference Numeral 74 surface of platen facing base support structure
Reference Numeral 76 surface of the base support structure facing the platen
Reference Numeral 77 base support structure
Reference Numeral 78 surface of the base support structure facing away from the platen
Reference Numeral 102 operative sensor connections
Reference Numeral 104 processor Reference Numeral 106 operative connection(s) between processor and controller
Reference Numeral 108 controller
Reference Numeral 110 operative connection(s) between controller and equipment controlled
Reference Numeral 500 operative connection between sensor(s) and processor
Reference Numeral 510 operative processor
Reference Numeral 520 operative controller
Reference Numeral 530 operative connection between controller and finishing apparatus (and optionally operative sensors)
Reference Numeral 600 voltage source
Reference Numeral 605 electrical conductor connecting anode
Reference Numeral 610 anode
Reference Numeral 615 attachment means for anode
Reference Numeral 620 electrical conductor for cathode
Reference Numeral 625 attachment means for cathode
Reference Numeral 630 cathode
Reference Numeral 635 area of electroplating
Reference Numeral 645 area of electropolishing
Reference Numeral 650 insulator block
Reference Numeral 655 metallized side of workpiece
Reference Numeral 660 workpiece
Reference Numeral 670 operative sensor
Reference Numeral 675 sensor signal(s)
Reference Numeral 690 movement direction of electroplating or deplating
Reference Numeral 700 workpiece support (abbreviated)
Reference Numeral 705 operative connection
Reference Numeral 710 process control subsystem
Reference Numeral 910 10% of a finishing cycle time with the smallest variable change over time
Reference Numeral 912 illustrates a non-steady state time period having the same variable change at least twice as much as during the more stable period

DETAILED DESCRIPTION OF THE INVENTION

The semiconductor industry is in a relentless journey to increase computing power and decrease costs. Planarizing of a semiconductor wafer using in situ calculations of cost of manufacture parameters to improve control of finishing parameters can help simultaneously to decrease cost and reduce unwanted defects. Real time control of the planarizing energy on the semiconductor wafer surface using cost of manufacture parameters for real time optimization is particularly useful and preferred to help to change and/or reduce cost of manufacture.

Using current cost of manufacture parameters along with a friction sensing method to evaluate and adjust the lubrication in a manner that adjustably controls the coefficient of friction in the operative finishing interface can be effective at reducing unwanted surface defects such as microscratches and microchatter for some applications. This system is particularly preferred for planarizing or finishing with abrasive, more preferably fixed abrasive finishing, elements. In addition to generally helping to improve such parameters as equipment yield, parametric yield, and defect density, the "cuttability" or cut rate of the fixed abrasive finishing element can generally be extended which improves uptime or equipment utilization. The planarizing in the operative finishing interface can change any number of times during a relatively short finishing cycle time making manual calculations ineffective, particularly during non-steady state planarizing time periods. Further, the semiconductor wafer cost of manufacture parameters are relatively complex to calculate and the planarizing process operation is relatively short thus manual calculations for equipment adjustment and control are even more difficult and ineffective. Rapid, multiple adjustments of process control parameters using process sensors operatively connected to a processor with access to cost of manufacture parameters, cost of manufacture information, and/or a model including cost information are particularly preferred for the rapid in situ process control as a preferred embodiment of this invention which helps to increase computing power in the finished semiconductor wafer and decrease or change manufacturing costs.

A finishing element finishing surface tends to have a higher friction than necessary with the workpiece being finished. The higher friction can lead to higher than necessary energy for finishing. The higher friction can lead to destructive surface forces on the workpiece surface being finished and on the finishing element finishing surface which can cause deleterious surface damage to the workpiece. The higher friction can lead to premature wear on the finishing element and even to the abrasive slurry particle wear. This premature wear on the finishing element and abrasive slurry particles can unnecessarily increase the cost of finishing a workpiece. Further, this higher than necessary friction can lead to higher than necessary changes in performance of the finishing element finishing surface during the finishing of a plurality of workpieces which makes process control more difficult and/or complex. Applicant currently believes that the higher than desirable number of defects in the workpiece surface being finished can at least partially be due to the fact that the abrasive particles in slurries although generally free to move about can become trapped in an elastomeric finishing element surface thus preventing rolling action and leading to a more fixed scratching type action. Further fixed abrasive finishing element surfaces can also scratch or damage of sensitive workpiece surface. This can unintentionally increase the cost of manufacture. Further, abrasive slurry particles which are not lubricated can tend to become dull or less effective at finishing the workpiece surface being finished which can reduce their effectiveness during finishing. This again can unintentionally increase the cost of manufacture. Current CMP slurries are generally complex chemical slurries and applicant has found that the addition of some new chemicals, such as finishing aids, can cause instability over time, precipitation of the abrasive particulates and/or agglomeration of the abrasive particulates to form large particles which can cause unwanted scratching to the workpiece surface being finished. Further, precipitation and/or agglomeration of the abrasive slurry particulates can have an adverse impact on the economical recycling of slurry for finishing workpiece surfaces by forming the larger particulates which either are not recycled or must be reprocessed at an increased expense to decrease their size to be within specification. Each of the above situations can lead to less than desirable surface quality on the workpiece surface being finished, higher than desirable manufacturing costs, and earlier than necessary wear on the expensive finishing element finishing surface. Once again, this can unintentionally increase the cost of manufacture. Using real time control with evaluations and/or determinations using at in part cost of manufacture parameters can improve processing and/or planarizing and generally help to change and/or reduce the cost of manufacture.

Supplying a finishing aid, particularly a lubricating aid, from the finishing element finishing surface to the interface of the workpiece surface being finished and the finishing element finishing surface reduces the effectiveness of some current in situ friction measurement feedback systems known in CMP. Particularly troublesome is a change in friction during planarizing or finishing due to changes in type or amount of lubricating aid. Some current known systems, quite simply, have no effective feedback loop to deal with these changes. By having at least one friction sensor to measure the change in friction due to changes in lubricating and/or finishing conditions while also having a friction sensor probe to monitor the progress of finishing on the finishing element finishing surface, effective feedback system for finishing of workpieces one can accomplish improved in situ control of finishing for some applications. By having at least two operative sensors to measure the changes in friction due to changes in lubricating (applied planarizing frictional energy, thermal energy, and pressure energy) while also having a feedback subsystem to monitor the progress of finishing on the workpieces one can more effectively accomplish in situ control of finishing by using cost of manufacture parameters for control in real time for some applications. The progress of finishing can be obtained by workpiece finishing sensors and/or other operative sensors discussed herein elsewhere. Look-up tables, mathematical equations, extrapolations, and interpolations can be used to along with the workpiece finishing sensors and/or friction sensors to facilitate improved progress of finishing information. For instance, cut rate control can be improved generally by accessing the operative finishing interface pressure and relative velocity and, more preferably, also effective coefficient of friction. Control of the coefficient of friction in the operative finishing interface is particularly useful and effective example for controlling planarizing energy applied to finishing a semiconductor wafer surface to help reduce overall cost of manufacture. In situ finishing information derived from an applied planarizing energy to a workpiece surface can be combined with using cost of manufacture parameters, preferably in situ, to determine improved process control parameters which when controllably adjusted can generally improve planarizing and reduce its cost.

The new problem recognition of this invention and unique solution are considered part of the invention.

Frictional and/or Chemical Planarizing (Nonlimiting Illustrative Preferred Example)

The book *Chemical Mechanical Planarization of Microelectric Materials* by Steigerwald, J. M. et al published by John Wiley & Sons, ISBN 0471138274, generally describes chemical mechanical finishing and is included herein by reference in its entirety for general background. In chemical mechanical finishing the workpiece is generally separated from the finishing element by polishing slurry. The workpiece surface being finished is in parallel motion with finishing element finishing surface disposed towards the workpiece surface being finished. The abrasive particles such as found in a polishing slurry interposed between these surfaces finish the workpiece. Chemical mechanical finishing is a preferred form of planarizing and/or finishing.

Discussion of some of the terms useful to aid in understanding this specification is now presented. Finishing is a term used herein for both planarizing and polishing. A finishing energy is a term used for a planarizing energy and/or a polishing energy. Planarizing is the process of making a surface which has raised surface perturbations or cupped lower areas into a planar surface and thus involves reducing or eliminating the raised surface perturbations and cupped lower areas. As a non-limiting example, during semiconductor manufacturing vias and trenches can be formed in a nonconductive material and then filled in (planarizing by adding material) with a conductive material. In some local regions, the added material is over-added creating an unwanted raised region. Removing and/or preventing the over-adding material to reduce, prevent, and/or remove the unwanted raised regions is a planarizing process. Controlling the adding material during a planarizing process to improve control of planarizing is preferred. Planarizing changes the topography of the workpiece from non planar to ideally perfectly planar. Planarizing can add material to low regions (such as trenches and vias) and remove material (such as from unwanted high regions) to improve the planarity of the workpiece surface and/or to form planar surfaces (such as microelectronic surfaces). As a further non-limiting example, planarizing changes a topography from non planar to the planarity desired for the intended workpiece and its intended utility. Polishing is the process of smoothing or polishing the surface of an object and tends to follow the topography of the workpiece surface being polished. A planarizing energy aids planarization. A finishing element is a term used herein to describe a pad or element for both polishing and planarizing. A finishing element finishing surface is a term used herein for a finishing element surface used for both polishing and planarizing. A finishing element planarizing surface is a term used herein for a finishing element surface used for planarizing. A finishing element polishing surface is a term used herein for a finishing element surface used for polishing. A workpiece surface being finished is a term used herein for a workpiece surface undergoing either or both polishing and planarizing. A workpiece surface being finished is a term used herein for a workpiece surface undergoing either or both polishing and planarizing with either or both a polishing energy or planarizing energy. A workpiece surface being planarized is a workpiece surface undergoing planarizing. A workpiece surface being polished is a workpiece surface undergoing polishing. A planarizing energy is used for planarizing a workpiece. A polishing energy is used for polishing a workpiece. The finishing cycle time is the elapsed time in minutes that the workpiece is being finished. The planarizing cycle time is the elapsed time in minutes that the workpiece is being planarized. The polishing cycle time is the elapsed time in minutes that the workpiece is being polishing.

As used herein, a refining surface comprises a surface for refining a workpiece surface using an operative motion selected from a motion consisting of a planarizing operative motion, a polishing operative motion, a buffing operative motion, and a cleaning operative motion or combination thereof.

As used herein, an appreciable amount is term which means "capable of being readily perceived or estimated". A change in the cost of manufacture by an appreciable amount is a preferred nonlimiting example.

As used herein, a die is one unit on a semiconductor wafer generally separated by scribe lines. After the semiconductor wafer fabrication steps are completed, the dies (or dice) are separated into units, generally by sawing. The separated units are generally referred to as "chips". Each semiconductor wafer generally has many die which are generally rectangular. The terminology of semiconductor wafer and die are generally known to those skilled in the arts. As used herein, within die uniformity refers to the uniformity within the die. As used herein, local planarity refers to die planarity unless specifically defined otherwise. Within wafer uniformity refers to the uniformity of finishing of the wafer. As used herein, wafer planarity refers to planarity across a wafer. Multiple die planarity is the planarity across a defined number of die. As used herein, global wafer planarity refers to planarity across the entire semiconductor wafer planarity. Planarity is important for the photolithography and/or patterning step(s) generally common to semiconductor wafer processing, particularly where feature sizes are less than 0.25 microns. As used herein, a device is a discrete circuit such as a transistor, resistor, or capacitor. As used herein, pattern density is ratio of the raised (up) area in square millimeters to the to area in square millimeters of region on a specific region such as a die or semiconductor wafer. As used herein, pattern density is ratio of the raised (up) area in square millimeters to the total area in square millimeters of a region on a specific region such as a die or semiconductor wafer. As used herein, line pattern density is the ratio of the line width to the pitch. As used herein, pitch is line width plus the oxide space. As an illustrative example, pitch is the copper line width plus the oxide spacing. Oxide pattern density, as used herein, is the volume fraction of the oxide within an infinitesimally thin surface of the die.

FIG. 1 is an artist's drawing of a non limiting preferred embodiment when looking from the top down including the interrelationships of some illustrative objects when for planarizing according to illustrative preferred embodiment. Reference Numeral 20 represents the workpiece being finished. Reference Numeral 23 is the center of the rotation of the workpiece. The workpiece surface facing the finishing element finishing surface is the workpiece surface being finished. Reference Numeral 24 represents the finishing element. Reference Numeral 26 represents the finishing element finishing surface. A finishing element finishing surface which is free of abrasive particles connected to the finishing surface is preferred for some applications. For these applications, a finishing element finishing surface which is free of inorganic abrasive particles connected to the finishing surface is more preferred and a finishing element finishing surface which is free of fixed abrasive particles is even more preferred. Abrasive particles which are connected to and/or fixed to the finishing surface increase the possibility of causing unwanted surface damage to the workpiece surface being finished. A preferred embodiment is to measure and control a control parameter such as active lubrication at the operative finishing interface to control planarizing. It is preferred to have a finishing feedback subsystem (such as an operative control subsystem) with can monitor and function well with or without lubricant changes during planarizing. By having the real time friction sensor subsystems and finishing sensor subsystems of a preferred embodiment of this invention, changes in friction due to real time lubrication at the operative finishing interface can be sensed, controlled and adjusted to improve finishing, with a finishing element surface free of fixed abrasives and with a finishing element surface having fixed abrasives. Supplying a finishing composition without abrasives is preferred and supplying a finishing composition without abrasive particles is more preferred. As illustrated, the finishing surface aids in applying a planarizing energy to the surface of the workpiece. Reference Numeral 30 represents the direction of rotation of the finishing element finishing surface. Reference Numeral 32 represents the direction of rotation of the workpiece being finished. The frictional energy in the operative finishing interface is a preferred planarizing energy. The chemical energy in the operative finishing interface is a preferred planarizing energy. The tribochemical energy in the operative finishing interface is a preferred planarizing energy. The thermal energy in the operative finishing interface is a preferred planarizing energy. The pressure energy in the operative finishing interface is a preferred planarizing energy. A planarizing energy selected from the group consisting of frictional energy, chemical energy, and thermal energy is a preferred group of planarizing energies. Reference Numeral 40 represents a finishing composition feed line for adding chemicals to the surface of the workpiece such as acids, bases, buffers, other chemical reagents, abrasive particles and the like. A liquid as represented here by the finishing composition can supply chemical energy to the semiconductor wafer surface for planarizing. The finishing composition feed line can have a plurality of exit orifices. A preferred finishing composition is finishing slurry. The abrasive(s) in a slurry can impart frictional energy to the semiconductor wafer surface for planarizing. Reference Numeral 41 represents a reservoir of a finishing composition to be fed to a finishing element finishing surface. Reference Numeral 42 represents a feed mechanism for the finishing composition such as a variable air or gas pressure or a pump mechanism. Reference Numeral 46 represents an alternate finishing composition feed line for adding a finishing chemical composition to the finishing element finishing surface to improve the quality of finishing. Reference Numeral 47 represents an alternate finishing composition reservoir of chemicals to be, optionally, fed to the finishing element finishing surface. The alternate finishing composition can also contain abrasive particles and thus can be a finishing slurry. The alternate finishing composition can introduce additional chemical and/or frictional energy to the semiconductor wafer surface for planarizing. Reference Numeral 48 represents a feed mechanism for the alternate finishing composition such as a variable pressure or a pump mechanism. A preferred embodiment is to feed liquids free of abrasives from the finishing composition feed line and the alternate finishing composition feed line in which at least one feed has a liquid having abrasive particles in a slurry. Another preferred embodiment, not shown, is to have a wiping element, preferably an elastomeric wiping element, to uniformly distribute the finishing composition(s) across the finishing element finishing surface. Multiple nozzles to feed the finishing composition and alternate finishing composition can be preferred to better distribute them across the finishing element finishing surface. Nonlimiting examples of some preferred dispensing systems and wiping elements is found in U.S. Pat. No. 5,709,593 to Guthrie et al., U.S. Pat. No. 5,246,525 to Junichi, and U.S. Pat. No. 5,478,435 to Murphy et. al. and are included herein by reference in their entirety for general guidance and appropriate modifications by those generally skilled in the art for supplying lubricants. Alternately supplying the finishing composition through pores or holes in the finishing element finishing surface to effect a uniform distribution of the finishing composition is also effective. Operative sensors 50 and 56 are operatively connected 500 to operative processor 510. An operative controller 520 is operatively connected 530 to the planarizing or finishing apparatus integral with the apparatus or separate from the apparatus. The plurality of operative process sensors, the operative processor, and the operative controller together represent a preferred finishing control subsystem which communicates with the sensors, the processor, and the controller to communicate with and control the finishing apparatus. Operative connections are generally known to those skilled in the art. Nonlimiting examples include electrical connections, optical fiber connections, and the use of electromagnetic wave senders and receivers. Reference Numerals 500, 510, 520, and 530 can represent a preferred finishing control subsystem. Processors having access to memory look-up tables and databases and the like are generally known to those skilled in the art. Memory look-up tables can be integrated with processor and/or in operatively connected memory devices. Processor(s) for processing information are preferred. Operative commercial computers are generally known to those skilled in the art. Processors for processing information are generally known to those skilled in the arts. Illustrative preferred examples include controlling the operative finishing motion. Further examples are discussed herein below. Reference Numeral 50 represents a first friction sensor probe. Reference Numeral 56 represents an optional second friction sensor probe. A thermal sensor probe is a preferred friction sensor probe. An infrared sensor probe is a preferred thermal sensor probe. A thermocouple probe is a preferred thermal sensor probe. A thermistor probe is a preferred thermal sensor probe.

Figure 2:
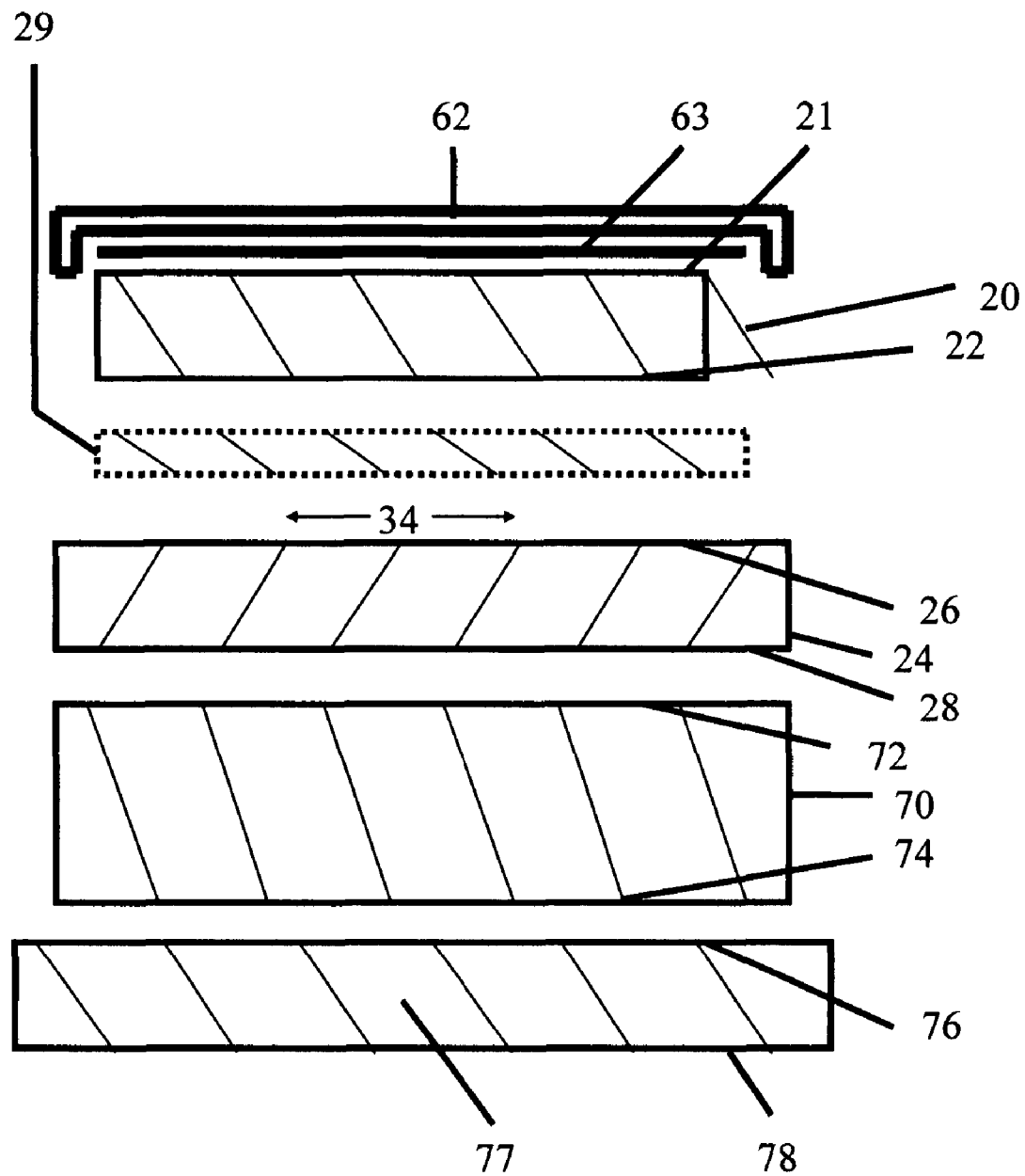
FIG. 2 is an artist's close up drawing of a particular preferred embodiment of some equipment including the interrelationships of the different objects when finishing according to this invention.

FIG. 2 is an artist's closeup drawing of a non limiting preferred embodiment showing some further interrelationships of the different objects when finishing according to the method of this invention. Reference Numeral 62 represents a carrier for the workpiece and in this particular embodiment, the carrier is a rotating carrier. The rotating carrier is operable to rotate the workpiece against the finishing element which rests against the platen and optionally has a motor. Optionally, the rotating carrier can also be designed to move the workpiece laterally, in an arch, figure eight, or orbitally to enhance uniformity of polishing. Optionally the carrier can be can have other motions. Optionally and preferably the carrier can have the ability to apply pressure locally in selective amounts as disclosed in U.S. Pat. No. 5,486,129 to Sandhu et al, and U.S. Pat. No. 5,762,536 to Pant et al. which are included by reference in their entirety for guidance and modification by those skilled in the arts. This generally is an enabling embodiment of applying local planarizing energy for local control of planarizing. Applying continuous local planarizing energy can be preferred for some applications. Applying discontinuous local planarizing energy can be preferred for some applications. Applying intermittent local planarizing energy can be preferred for some applications. The workpiece is in operative contact with the rotating carrier and optionally, has an operative contact element (Reference Numeral 63) to hold the workpiece to the carrier during finishing. An illustrative example of an operative contact element (Reference Numeral 63) is a workpiece held in place to the rotating carrier with a bonding agent. A hot wax is an illustrative example of a preferred bonding agent. Alternately, a porometric film can be placed in the rotating carrier having a recess for holding the workpiece. Reference Numeral 20 represents the workpiece. Reference Numeral 21 represents the workpiece surface facing away from the workpiece surface being finished. Reference Numeral 22 represents the surface of the workpiece being finished. Reference Numeral 24 represents the finishing element. Reference Numeral 26 represents the finishing element surface facing the workpiece surface being finished and is often referred to herein as the finishing element finishing surface. Reference Numeral 28 represents the surface of the finishing element facing away from the workpiece surface being finished. Reference Numeral 29 represents the finishing composition and optionally, the alternate finishing composition supplied between the workpiece surface being finished and surface of the finishing element facing the workpiece. Reference Numeral 34 represents a preferred direction of the operative finishing motion between the surface of the workpiece being finished and the finishing element finishing surface. Reference Numeral 70 represents the platen or support for the finishing element. The platen can also have an operative finishing motion relative to the workpiece surface being finished. Reference Numeral 72 represents the surface of the platen facing the finishing element. The surface of the platen facing the finishing element is in support contact with the finishing element surface facing away from the workpiece surface being finished. The finishing element surface facing the platen can, optionally, be connected to the platen by adhesion. Frictional forces between the finishing element and the platen can also retain the finishing element against the platen. Reference Numeral 74 is the surface of the platen facing away from the finishing element. Reference Numeral 76 represents the surface of the base support structure facing the platen. Reference Numeral 77 represents the base support structure. Reference Numeral 78 represents the surface of the base support structure facing away from the platen. The rotatable carrier (Reference Number 70) can be operatively connected to the base structure to permit improved control of the pressure application at the workpiece surface being finished (Reference Numeral 22).

Figure 3:
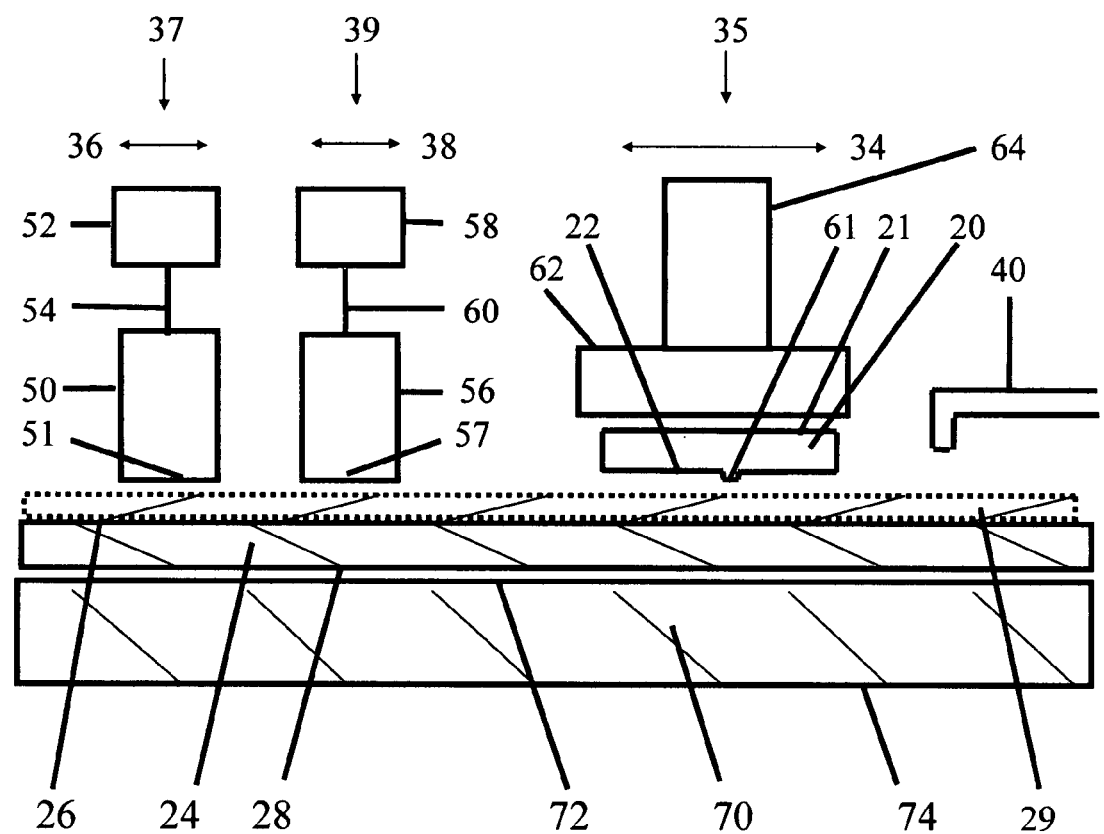
FIG. 3 is a drawing of a preferred embodiment of this invention

FIG. 3 is an artist's drawing of a non limiting preferred embodiment showing some further interrelationships of some of the objects when finishing according to the method of this invention. Reference Numeral 20 represents the workpiece being finished. Reference Numeral 21 represents the workpiece surface facing away from the finishing element finishing surface. Reference Numeral 22 represents the workpiece surface being finished. Reference Numeral 61 represents an unwanted raised region on the workpiece surface being finished. Reference Numeral 62 represents a simplified view of the carrier for the workpiece. The carrier for the workpiece can have a number of preferred options, depending on the finishing required, such as a retainer ring, a fluid filled chuck, and/or a chuck capable of applying localized differential pressures across the wafer to better control wafer finishing. Reference Numeral 64 represents the optionally preferred motor for applying a finishing motion to the workpiece being finished. Reference Numeral 34 represents a preferred operative finishing motion. Reference Numeral 35 represents a preferred operative pressure applied to the workpiece surface by urging it against or towards the finishing element finishing surface. Pressure/force energy is a preferred planarizing energy. A pressure sensor can be used to generally aid control of pressure energy during finishing in some apparatus. Reference Numeral 40 represents the finishing composition feed line. The alternate finishing feed line, Reference Numeral 46, is behind the Reference Numeral 40 and thus is not shown in this particular artist's drawing. Reference Numeral 24 represents the finishing element. Reference Numeral 26 represents the finishing element finishing surface. Reference Numeral 28 represents the finishing element surface facing away from the workpiece surface being finished. Reference Numeral 29 represents the finishing composition and optionally, the alternate finishing composition supplied between the workpiece surface being finished and the surface of the finishing element facing the workpiece. Reference Numeral 50 represent a first friction sensor probe. A friction probe or a friction sensor is a illustrative example of an operative sensor. Reference Numeral 51 represents the surface of the first friction probe in friction contact with the finishing element finishing surface and is often referred to herein as the first friction sensor surface. Reference Numeral 52 represents an optionally preferred motor to rotate the first friction sensor probe. Reference Numeral 54 represents an optional operative connection between the first friction sensor probe and motor. Reference Numeral 36 represents a preferred friction motion between the first friction sensor probe friction sensor surface and the finishing element finishing surface. Reference numeral 37 represents an operative pressure applied to the first friction probe friction sensor surface by urging it against or towards the finishing element finishing surface. Reference Numeral 56 represents a preferred optional second friction sensor probe. A second friction probe or a second friction sensor is a illustrative example of a second operative sensor. Reference Numeral 57 represents the surface of the second friction probe in friction contact with the finishing element finishing surface and is often referred to herein as the second friction sensor surface. Reference Numeral 58 represents an optionally preferred second motor to rotate the second friction sensor probe. Reference Numeral 60 represents an optional second operative connection between the second friction sensor probe and an optional motor. An operative electrical connection is a preferred example of an operative connection. An operative fiber optic connection is a preferred example of an operative connection. An operative connection using at least in part an operative electromagnetic wave connection is a preferred operative connection. Reference Numeral 38 represents a preferred friction motion between the second friction sensor probe friction sensor surface and the finishing element finishing surface. Reference Numeral 39 represents an operative pressure applied to a second friction probe friction sensor surface by urging it against or towards the finishing element finishing surface. The operative finishing motion, the operative first friction motion, and the operative second friction motion can differ from each other and are preferably controlled independently of each others motions and/or pressures. Those skilled in the current published chemical mechanical finishing arts are generally aware of friction sensors, operative sensors, and in general operative connections, and operative control subsystems. U.S. Pat. No. 6,283,829 to Molnar is a useful non-limiting reference for guidance and/or modification by those skilled in the art and is included herein in its entirety.

Figure 4:
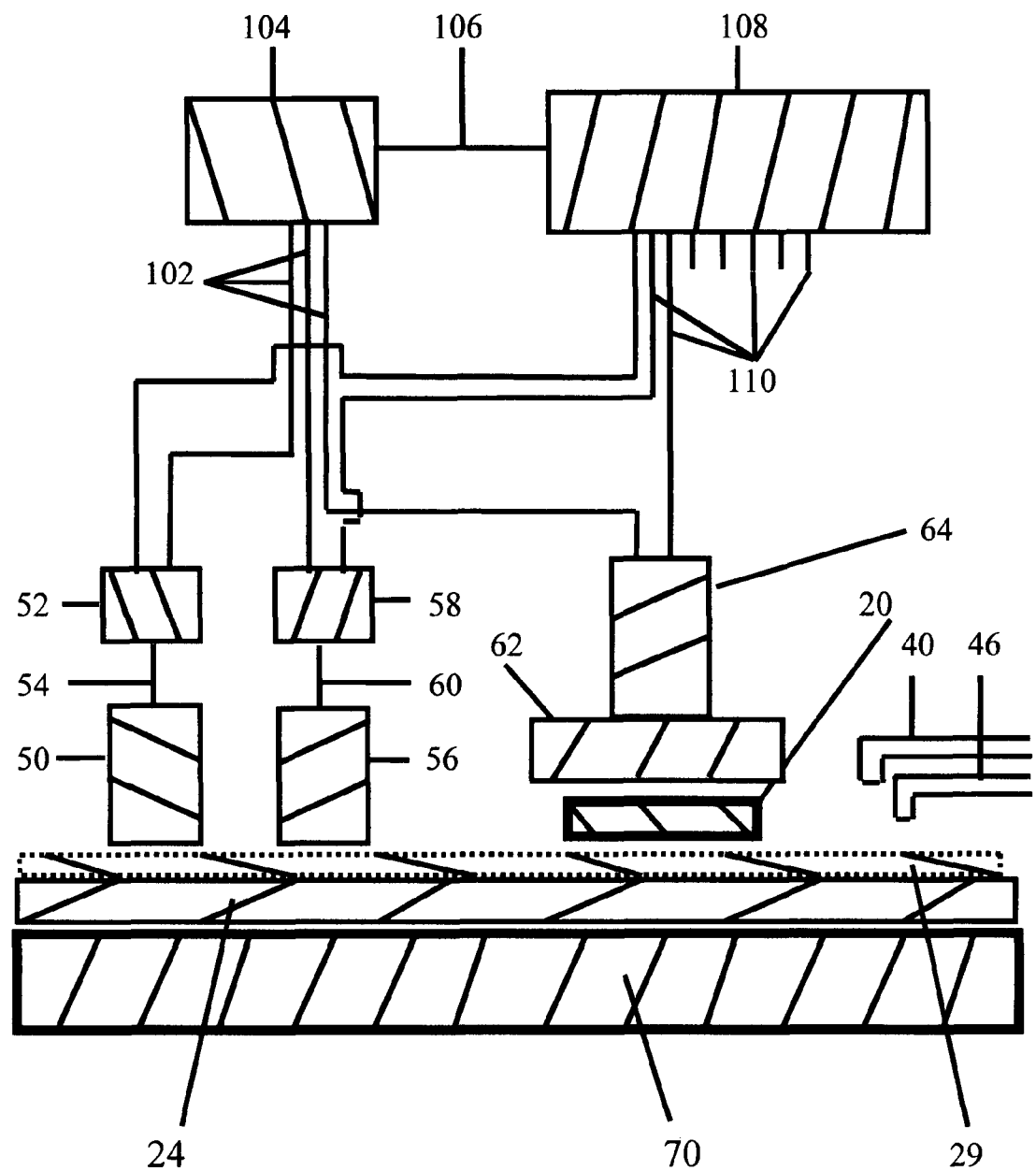
FIG. 4 is an artist's simplified view of the some major components in a finishing sensor

FIG. 4 is an artist's drawing of the some of the objects and their interconnections in a non limiting preferred embodiment. Reference Numeral 20 represents the workpiece being finished. Reference Numeral 24 represents the finishing element. Reference Numeral 29 represents the finishing composition and, optionally, the alternate finishing composition. Reference Numeral 40 represents the feed line for the finishing composition. Reference Numeral 46 represents the feed line for the alternate finishing composition. Reference Numeral 50 represents the first friction sensor probe. Reference numeral 52 represents an optional drive mechanism such as a motor or vibrating transducer for the first friction sensor probe. Reference Numeral 54 represents the operative connection between the first friction sensor probe and the drive mechanism. Reference Numeral 56 represents the second friction sensor probe. Reference numeral 58 represents an optional drive mechanism such as a motor or vibrating transducer for the second friction sensor probe. Reference Numeral 60 represents the operative connection between the second friction sensor probe and the drive mechanism. Reference Numeral 62 represents the carrier for the workpiece. Reference Numeral 64 represents the drive motor carrier for the carrier. Reference Numeral 70 represents the platen. Reference Numeral 102 represents preferred operative sensor connections from the first friction sensor probe, second friction sensor probe, and workpiece finishing assembly to the processor (Reference Numeral 104). Preferably the sensor connections are electrical connections. A data processor is a preferred processor and an electronic data processor is a more preferred data processor and a computer is an even more preferred processor. The processor (Reference Numeral 104) is preferably connected to a controller (Reference Numeral 108) with an operative processor to controller connection(s) represented by Reference Numeral 106. The controller is preferably in operative controlling connection (Reference Numeral 110) with the first friction sensor probe, the second friction sensor probe, and the workpiece finishing sensor subsystem and can adjust finishing control parameters during finishing the workpiece. An operative electrical connection is a preferred operative connection. An operative electromagnetic wave system such as operative infrared communication connections is another preferred operative connection. A controller can also adjust the operating friction probe control parameters such as, but not limited to, pressure exerted against the finishing element finishing surface and the friction probe friction sensor surface and related relative friction motion between the finishing element finishing surface and the friction probe friction sensor surface such as relative parallel motion. Preferred finishing control parameters are discussed elsewhere herein.

FIGS. 1-4 describe non limiting apparatus, sensors, controllers, and operative connections. Other illustrative apparatus, sensor(s), controller(s), and operative connections are discussed elsewhere herein and art included by reference for general illustration and modification using the teachings and guidance contained herein.

Some Further Helpful Background for Frictional Processing and/or Planarizing (and Finishing and Polishing)

Optional Finishing Elements

A finishing element having a synthetic polymeric body is preferred. A synthetic polymeric body comprising at least one material selected from the group consisting of an organic synthetic polymer, an inorganic polymer, and combinations thereof is preferred. A preferred example of an organic synthetic polymer is a thermoplastic polymer. Another preferred example of an organic synthetic polymer is a thermoset polymer. An organic synthetic polymeric body comprising organic synthetic polymers including materials selected from the group consisting of polyurethanes, polyolefins, polyesters, polyamides, polystyrenes, polycarbonates, polyvinyl chlorides, polyimides, epoxies, chloroprene rubbers, ethylene propylene elastomers, butyl polymers, polybutadienes, polyisoprenes, EPDM elastomers, and styrene butadiene elastomers is preferred. Polyolefin polymers are particularly preferred for their generally low cost. A preferred polyolefin polymer is polyethylene. Another preferred polyolefin polymer is a propylene polymer. A finishing element having a body element comprising a mixture of a plurality of organic synthetic polymers can be particularly tough, wear resistant, and useful. An organic synthetic polymeric body comprising a plurality of the organic synthetic polymers and wherein the major component is selected from materials selected from the group consisting of polyurethanes, polyolefins, polyesters, polyamides, polystyrenes, polycarbonates, polyvinyl chlorides, polyimides, epoxies, chloroprene rubbers, ethylene propylene elastomers, butyl polymers, polybutadienes, polyisoprenes, EPDM elastomers, and styrene butadiene elastomers is preferred. The minor component is preferably also an organic synthetic polymer and is preferably a modifying and/or toughening agent. A preferred example of an organic synthetic polymer modifier is a material which reduces the hardness or flex modulus of the finishing element body such as a polymeric elastomer. A compatibilizing agent can also be used to improve the physical properties of the polymeric mixture. Compatibilizing agents are often also synthetic polymers and have polar and/or reactive functional groups such as carboxylic acid, maleic anhydride, and epoxy groups. Organic synthetic polymers of the above descriptions are generally available commercially. Illustrative nonlimiting examples of commercial suppliers of organic synthetic polymers include Exxon Co., Dow Chemical, Sumitomo Chemical, and BASF.

An abrasive finishing elements can be used and are preferred for some applications. A fixed abrasive is a preferred example of an abrasive finishing element. The abrasive firmly attached to the finishing element finishing surface is preferred. The abrasive can be firmly attached to the finishing element finishing surface with known adhesives and/or mixed into a surface layer of a polymeric layer, preferably an organic polymeric layer. Particular abrasive surface topographies can be preferred for specific applications. Fixed abrasive finishing elements are generally known to those skilled in the art. Some nonlimiting examples include U.S. Pat. No. 4,966,245 to Callinan, U.S. Pat. No. 5,692,950 to Rutherford, U.S. Pat. No. 5,823,855 to Robinson, WO 98/06541 to Rutherford and WO 98/181159 to Hudson and are included herein by reference in their entirety for general guidance and modification of fixed abrasive finishing elements by those skilled in the art. Illustrative nonlimiting examples of fixed abrasive polishing pads for semiconductor wafers are commercially available 3M Co. and Sony Corporation.

An abrasive finishing element having abrasive asperities on the finishing element finishing surface is preferred. An abrasive finishing element having abrasive asperities having a height from 0.5 to 0.005 micrometers is preferred and an abrasive finishing element having abrasive asperities having a height from 0.3 to 0.005 micrometers is more preferred and an abrasive finishing element having abrasive asperities having a height from 0.1 to 0.01 micrometers is even more preferred and an abrasive finishing element having abrasive asperities having a height from 0.05 to 0.005 micrometers is more particularly preferred.

Optional Fibrous Fillers

A fibrous filler is a preferred stabilizing filler for the finishing elements of this invention. A plurality of synthetic fibers are particularly preferred fibrous filler. Fibrous fillers tend to help generate a lower abrasion coefficient and/or stabilize the finishing element finishing surface from excessive wear. By reducing wear the finishing element has improved stability during finishing. U.S. Pat. No. 4,877,813 to Jimmo, U.S. Pat. No. 5,079,289 to Takeshi et al., and U.S. Pat. No. 5,523,352 to Janssen are included herein by reference in its entirety for general guidance and appropriate modification by those skilled in the art.

Optional Processing and/or Finishing Compositions

Finishing compositions such as CMP slurries are generally known for finishing workpieces. A chemical mechanical polishing slurry is an example of a preferred finishing composition. Finishing compositions that have their pH adjusted carefully, and generally comprise other chemical additives are used to effect chemical reactions and/or other surface changes to the workpiece. A finishing composition having dissolved chemical additives is particularly preferred. Finishing compositions having small abrasive particles in a slurry are preferred for many applications. Illustrative preferred examples include dissolved chemical additives include dissolved acids, bases, buffers, oxidizing agents, reducing agents, stabilizers, and chemical reagents. A finishing composition having a chemical which substantially reacts with material from the workpiece surface being finished is particularly preferred. A finishing composition chemical which selectively chemically reacts with only a portion of the workpiece surface is particularly preferred. A finishing composition having a chemical which preferentially chemically reacts (or interacts) with only a portion of the workpiece surface is particularly preferred.

Some illustrative non-limiting examples of polishing slurries which can be used and/or modified by those skilled in the art are now discussed. An example slurry comprises water, a solid abrasive material and a third component selected from the group consisting of $HNO_3$, $H_2SO_4$, and $AgNO_3$ or mixtures thereof. Another polishing slurry comprises water, aluminum oxide, and hydrogen peroxide mixed into a slurry. Other chemicals such as KOH or potassium hydroxide can also be added to the above polishing slurry. Still another illustrative polishing slurry comprises $H_3PO_4$ at from about 0.1% to about 20% by volume, $H_2O_2$ at from 1% to about 30% by volume, water, and solid abrasive material. Still another polishing slurry comprises an oxidizing agent such as potassium ferricyanide, and an abrasive such as silica, and has a pH of between 2 and 4. Still another polishing slurry comprises high purity fine metal oxide particles uniformly dispersed in a stable aqueous medium. Still another polishing slurry comprises a colloidal suspension of $SiO_2$ particles having an average particle size of between 20 and 50 nanometers in alkali solution, demineralized water, and a chemical activator. U.S. Pat. No. 5,209,816 to Yu et al. issued in 1993, U.S. Pat. No. 5,354,490 to Yu et al. issued in 1994, U.S. Pat. No. 5,540,810 to Sandhu et al. issued in 1996, U.S. Pat. No. 5,516,346 to Cadien et. al. issued in 1996, U.S. Pat. No. 5,527,423 to Neville et al. issued in 1996, U.S. Pat. No. 5,622,525 to Haisma et al. issued in 1997, and U.S. Pat. No. 5,645,736 to Allman issued in 1997 comprise illustrative non-limiting examples of slurries contained herein for further general guidance and modification by those skilled in the arts. Commercial CMP polishing slurries are also available from Rodel Manufacturing Company in Newark, Del.

Optional Processing and/or Finishing Aids

Supplying an effective amount of finishing aid, more preferably a lubricating aid, which reduces the coefficient of friction between the finishing element finishing surface and the workpiece surface being finished is preferred. Supplying an effective amount of finishing aid, more preferably a lubricating aid, which reduces the unwanted surface damage to the surface of the workpiece being finished during finishing is preferred. Supplying an effective amount of finishing aid, more preferably a lubricating aid, which differentially lubricates different regions of the workpiece and reduces the unwanted surface damage to at least a portion of the surface of the workpiece being finished during finishing is preferred.

Non-Limiting Examples of Processing and/or Planarizing Energy-Finishing Motion

Chemical mechanical finishing during operation has the finishing element in operative finishing motion with the surface of the workpiece being finished. This operative finishing motion generally supplies processing and/or planarizing energy in the forms of frictional energy, pressure energy, chemical energy, and thermal energy. A relative lateral parallel motion of the finishing element to the surface of the workpiece being finished is an operative finishing motion. Lateral parallel motion can be over very short distances or macro-distances. A parallel circular motion of the finishing element finishing surface relative to the workpiece surface being finished can be effective. A tangential finishing motion can also be preferred. Moving the finishing element finishing surface in an operative finishing motion to the workpiece surface being finished is a preferred example of an operative finishing motion. Moving the workpiece surface being finished in an operative finishing motion to the finishing element finishing surface is a preferred example of an operative finishing motion. Moving the workpiece in a parallel circular motion to the finishing element surface is a preferred example of an operative finishing motion. Moving the finishing element finishing surface in a parallel circular motion to the workpiece surface being finished is a preferred example of an operative finishing motion. Moving the finishing element finishing surface in a parallel linear motion to the workpiece surface being finished is a preferred example of an operative finishing motion. Moving the workpiece surface in a parallel linear motion to the finishing element finishing surface is a preferred example of an operative finishing motion. An operative finishing motion which maintains substantially different instantaneous relative velocity between the finishing element and some points on the semiconductor wafer is preferred for some finishing equipment. Non-limiting illustrative examples of some planarizing motions and applied planarizing energies are found in patents U.S. Pat. No. 5,177,908 to Tuttle issued in 1993, U.S. Pat. No. 5,234,867 to Schultz et. al. issued in 1993, U.S. Pat. No. 5,522,965 to Chisholm et al. issued in 1996, U.S. Pat. No. 5,735,731 to Lee, U.S. Pat. No. 5,762,536 to Pant, U.S. Pat. No. 5,759,918 to Hoshizaki et al. and U.S. Pat. No. 5,962,947 to Talieh and which can be modified by those skilled in the art as appropriate and are included herein by reference in their entirety.

Illustrative Control Parameters

Control parameters for processing and/or planarizing are generally known in those in the processing arts. A change in composition of the finishing composition is a preferred control parameter. A change in the ionic strength is a preferred example of a change in finishing composition. A change in a chelating agent composition or strength are preferred examples of a change in finishing composition. A change in a surfactant composition or strength are preferred examples of a change in finishing composition. A change in pressure is a preferred control parameter. A change in temperature is a preferred control parameter. A change in chemical reaction rate or type is a preferred control parameter. A change in a removal rate is a preferred control parameter. A change in a friction induced chemical reaction rate or type are preferred control parameters. A change in the energy of planarizing amount or type are preferred control parameters. A change in the starting workpiece surface topology by controlling previous workpiece steps can also be used. For instance, the planarizing deposition step can be changed to improve a later planarizing workpiece material removal step. The type and relative velocity of processing and/or planarizing motion are preferred control parameters. Each of these illustrative control parameters can used by themselves or in any combination with each other to improve the cost of manufacture using cost of manufacture parameter control methodology for processing and/or planarizing.

Illustrative Commercial Examples of Processing, Planarizing, and CMP

The general structure, operation, pad dressing, operative cleaning, commercial operative sensors, operative connections, workpiece carrier(s) or a wafer holder(s), platens, and other general parts of commercial CMP equipment manufactured by such companies as Applied Material, and LAM Research is generally known to those skilled in the art and will not be discussed further herein for this reason.

Other Illustrative Examples of Frictional Chemical Finishing

Frictional-chemical finishing can be combined with electrolytic methods. For instance, one can apply a conductive material to a predetermined area of a wafer using an electrolyte solution disposed on the surface of the wafer, when the wafer is disposed between a cathode and anode, and preventing accumulation of the conductive material to areas other than the predetermine area by mechanically polishing the other areas while the conductive material is applied (U.S. Pat. No. 6,176,992 to Talieh). In another instance, under high pressure condition, the wafer is polished by flowing abrasive media with high viscosity, on the wafer in order to planarize the wafer. In another instance, a polishing apparatus having a drive motor, a carrier head, and a polishing platen with a magnetic region formed in either the carrier head or the polishing platen has been disclosed. In yet another instance, a magnetic slurry and a magnetic coil for polishing and finishing the wafer is used. It has been reported that by using a magnetic slurry and a magnetic coil the force used during polishing can be controlled with resulting greater control over the CMP process during the polishing of low k materials. Illustrative non-limiting examples of frictional-chemical finishing (and/or planarizing) are disclosed in U.S. Pat. No. 6,059,638 to Crevasse et al., U.S. Pat. No. 6,083,839 to Wong, U.S. Pat. No. 6,176,992 to Talieh, U.S. Pat. No. 6,280,295 to Wu, and U.S. Pat. No. 6,284,091 to Wong and are included in their entirety for guidance and modification by those skilled in the art.

Illustrative examples of preferred a processing and/or a planarizing energy include planarizing and/or processing energies selected from the group consisting of frictional planarizing energy, pressure planarizing energy, thermal planarizing energy, and chemical planarizing energy. Planarizing and/or processing energy applied with a mechanical mechanism is a preferred form of applying planarizing energy. Planarizing energy applied with magnetic energy is a preferred form of applying planarizing energy. Processing and/or planarizing energy applied at least in part with magnetic energy is a preferred form of applying planarizing energy. Processing and/or planarizing energy applied with magnetic energy can have greater control for some applications.

Illustrative Non-Limiting Electrochemical Processing and/or Planarizing

Figure 5:
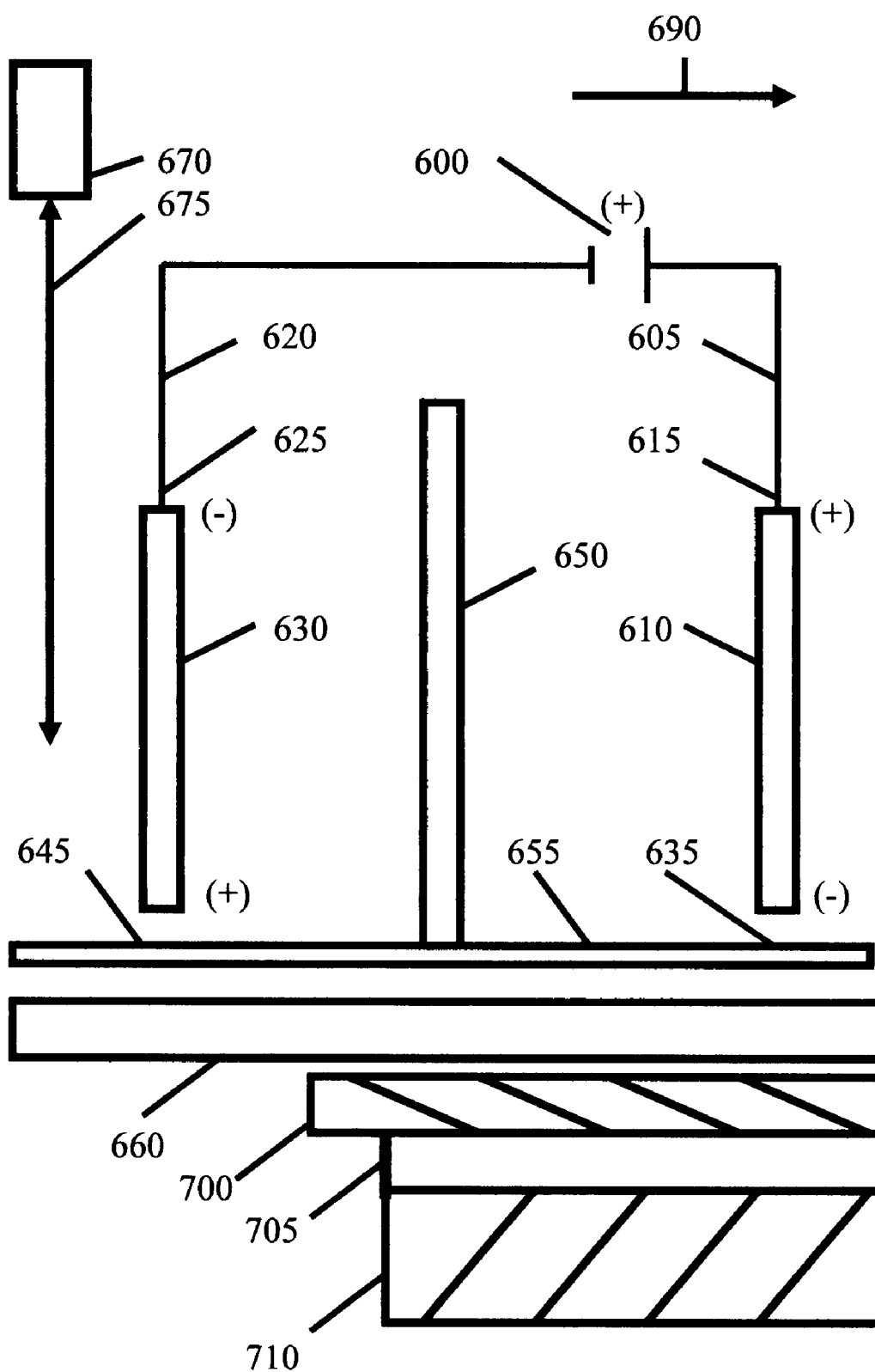
FIG. 5 is a schematic cross sectional view in elevation of a bipolar electrode electroplating cell for adding and subtracting material of U.S. Pat. No. 6,143,155

FIG. 5 is a schematic cross sectional view in elevation of a bipolar electrode electroplating cell for adding and subtracting material (U.S. Pat. No. 6,143,155 to Adams et al.). Applying a positive potential from a voltage source 600 through electrical conductor 605 and connecting to anode 610 attachment 615, while applying a negative potential through electrical conductor 620 and connection 625 to cathode 630, would result in electroplating occurring to area 635 immediately under anode 610 and deplating or electropolishing occurring to the area 645 immediately under the under the cathode 630 due to the standard bipolar electrochemical effect. An insulator block between the anode and cathode is represented by 650. The workpiece is 660. The metallized side of the workpiece is represented by 655. The electroplating and/or deplating direction is 690 in this illustrative embodiment. This single sided approach is taught and claimed in U.S. Pat. No. 6,145,155 to Adams et al. Application of electrochemical planarizing energy for planarizing workpieces, methods therefore, and apparatus therefore are generally known and U.S. Pat. No. 5,807,165 to Uzoh et al., U.S. Pat. No. 6,143,155 to Adams et al., U.S. Pat. No. 6,251,235 to Talieh, and U.S. Pat. No. 6,176,992 to Talieh are included by reference in their entirety for guidance and modification by those skilled in the art. An operative sensor to sense the finishing process information related to electroplating (or deplating depending on location) is shown as 670. In this embodiment the operative sensor is an optical sensor which measures reflected electromagnetic radiation of an incident beam of electromagnetic energy such as light 675. Operative sensor 670 has operative connections (not shown) to a process control subsystem 710. A workpiece carrier, holder, support is represented by 700 (Generally this would hold the entire workpiece but in this view it is shortened to simplify the illustration). An operative connection between the process control subsystem and the workpiece carrier or holder is represented by 705. An optional mechanical drive mechanism is not shown which can either move the workpiece surface relative to the anode and/or cathode. Of course, the mechanical drive mechanism can also move the anode and/or cathode relative to the workpiece surface.

Electrochemical planarizing energy is a preferred planarizing energy. In one preferred mode, the electrochemical planarizing energy adds material (electroplating). In another preferred mode, the electrochemical planarizing energy removes material (deplating). A plurality of planarizing energies can be applied simultaneously during planarizing. In other words, both electrochemical plating and deplating can be occurring at the same time (For instance, over a portion of the planarizing cycle time). A plurality of planarizing energies can be applied sequentially during planarizing. In other words, both electrochemical plating and deplating can be occurring at different times (For instance, over a portion of the planarizing cycle time).

As illustrated, planarizing can add material to the workpiece surface during planarizing. As illustrated, planarizing can remove material to the workpiece surface during planarizing. The electrochemical planarizing by addition and removal of material to the workpiece surface depends on the applied electric field as is generally understood by those skilled in the art.

Control parameters for electroplating and deplating are generally known to those skilled in the art. The distance of the anode to the workpiece surface is a preferred process control parameter. The distance of the cathode to the workpiece surface is a preferred process control parameter. The effective surface area of the anode is a preferred process control parameter. The effective surface area of the cathode is a preferred process control parameter. The shape of the active surface of the cathode is a preferred process control parameter. The shape of the active surface of the anode is a preferred process control parameter. The applied potential to the cathode is a preferred process control parameter. The applied potential to the anode is a preferred process control parameter. The residence time of the applied potential(s) is a preferred process control parameter. The relative motion of the cathode and anode during either/or both electroplating and/polishing is a preferred process control parameter. The relative velocity of movement between the anode and the workpiece surface and the cathode and the workpiece surface are further preferred process control parameters which can be controlled independently or relative to one another. The applied current to the anode and cathode are further preferred process control parameters. The shape of the application of potentials to the anode and cathode (for instance, continuous, discontinuous, and intermittent). Changes to the electrolytic solutions can also be a preferred process control parameter. A change to the chemical composition is a preferred example of a change to the electrolytic solution. Common electrolytic solutions can comprise a copper salt such as copper sulfate, an acid such as sulfuric acid, halogen ions such as chloride, accelerators, suppressors, and levelers. Electrolytic solutions and components are generally known to those skilled in the arts. Temperature can be a preferred process control parameter. Each of these process control parameters represent non-limiting examples of preferred process control parameters to use in co-operation with cost of manufacture parameter and finishing process information evaluation for improvement in real time to applying planarizing energy to planarize a semiconductor wafer.

Further nonlimiting examples of electropolishing and electroplating is found in the U.S. patent application with Ser. No. 10/218,740 filed on Aug. 14, 2002 with the title "Versatile wafer refining" now U.S. Pat. No. 6,719,615 by Molnar and is included herein in its entirety for guidance and modification by those skilled in the arts.

Electro-processing apparatus, electro-processing assemblies, and electro-processing subassemblies are generally known to those skilled in the semiconductor planarizing and polishing arts. Electrodes, operative connections, workpiece holders, chambers, and processing compositions are generally well known in the semiconductor planarizing and polishing arts. United States Patent Application of these types of electro-processing energies for processing workpieces, methods, apparatus, assemblies, and subassemblies therefore are generally known and U.S. Pat. No. 5,567,300 to Datta, U.S. Pat. No. 5,807,165 to Uzoh et al., U.S. Pat. No. 5,869,388 to Chan et al., U.S. Pat. No. 6,074,546 to Sun et al., U.S. Pat. No. 6,145,155 to Adams et al., U.S. Pat. No. 6,176,992 to Talieh, U.S. Pat. No. 6,251,235 to Talieh, U.S. Pat. No. 6,288,357 to Dyer, U.S. Pat. No. 6,291,367 to Kelkar, U.S. Pat. No. 6,527,920 to Mayer et al., U.S. Pat. No. 6,593,227 to Ryskoski, U.S. Pat. No. 6,719,615 to Molnar, WO 2003/092891 to Wu et al., WO 2005/083159 to Mazur et al., and 6,951,599 Yahalom et al. are included by reference in their entirety including but limited to the figures, discussion, guidance, background, and modification by those skilled in the art using the teachings and guidance given herein. Electro-processing apparatus, electro-processing assemblies, and electro-processing subassemblies are commercially available in the industry as illustrated by Applied Materials located in Santa Clara, Calif.

Other Non-Limiting Examples Planarizing Energy for Planarizing of Workpieces

Photochemically polishing a silicon wafer using electromagnetic waves within the spectrum of 150 to 2000 nanometers wavelength is generally known. A photochemical polishing apparatus in which the electromagnetic waves are provided by a waveguide in close proximity to the surface of a silicon wafer electrode has been illustrated. A vapor deposition process can be used to add material to a workpiece surface. A non-limiting illustrative example of a vapor deposition process is a physical vapor deposition process. A non-limiting illustrative example of a vapor deposition process is a chemical vapor deposition process. Vapor deposition processes are generally known to those skilled in the semiconductor wafer processing arts. A particular exemplary method to deposit a dielectric material on metal features using HDP-CVD techniques in an optimum thickness for global planarity is generally known. An ion beam mounted above a workpiece to remove micro irregularities from the workpiece surface is generally known. Photochemical planarizing energy is preferred for some applications. Electromagnetic wave planarizing energy for planarizing is preferred for some applications. Chemical vapor deposition planarizing energy is preferred for some applications. Thermal energy is preferred for some applications. Spin on material (as illustrated by spin on glass and spin on polymer) can be used for planarizing. Application of these types of planarizing energies for planarizing workpieces, methods therefore, and apparatus therefore are generally known and U.S. Pat. No. 5,567,300 to Datta, U.S. Pat. No. 5,807,165 to Uzoh et al., U.S. Pat. No. 5,869,388 to Chan et al., U.S. Pat. No. 6,074,546 to Sun et al., U.S. Pat. No. 6,288,357 to Dyer, U.S. Pat. No. 6,291,367 to Kelkar and U.S. Pat. No. 6,593,227 to Ryskoski are included by reference in their entirety for guidance and modification by those skilled in the art. Preferred process control parameters are generally disclosed in the above United States Patents and can be used with cost of manufacture parameters, the new process control methods, and preferred embodiments as taught herein to generally improve planarizing and reduce costs. Non-limiting illustrative examples of process control parameters include the amount of planarizing energy, the intensity of the planarizing energy, the location of the planarizing energy, type of movement applied to the planarizing energy, velocity of the movement of the planarizing energy, the duration and amount the planarizing energy is applied for (illustrative examples include ramped, intermittent, continuous, and/or discontinuous energies), application a differential planarizing energies (either in space or time or both), and real time control of the application of the planarizing energy or energies. Kinetic energy is a preferred a planarizing energy. Thermal energy is a preferred planarizing energy. Chemical energy is a preferred planarizing energy. Multiple planarizing energies can be applied simultaneously such as differential movements and differential energy application in different regions of the workpiece. Multiple planarizing energies can be applied at different times such as differential movements and differential energy application in different regions of the workpiece.

Those generally skilled in the semiconductor wafer processing arts are generally familiar with preferred process control parameters for using with vapor deposition, spin on materials, chemical mechanical planarization, planarizing induced with thermal and/or kinetic energies, electroplating, and electrodeposition for planarizing applications. Illustrative nonlimiting examples of process control parameters, depending on the particular planarizing, can include spin rate, relative velocities, environment (pressure can be negative or positive, reactive gases, inert gases, reactive chemicals, concentrations in an optional planarizing chamber), temperature, liquids, relative movements, local application of planarizing, and global application planarizing.

Workpiece

A workpiece needing finishing is preferred. A semiconductor wafer is particularly preferred. A homogeneous surface composition is a workpiece surface having one composition throughout and is preferred for some applications. A workpiece needing polishing is preferred. A workpiece needing planarizing is especially preferred. A workpiece having a microelectronic surface is preferred. A microelectronic part is a preferred workpiece. A microelectronic component is another preferred workpiece. A workpiece surface having a heterogeneous surface composition is preferred. A heterogeneous surface composition has different regions with different compositions on the surface, further the heterogeneous composition can change with the distance from the surface. Thus finishing can be used for a single workpiece whose surface composition changes as the finishing process progresses. Planarizing can be used for a single workpiece whose surface composition changes as the planarizing process progresses. Planarizing can be used for a heterogeneous workpiece whose surface composition changes as the planarizing process progresses. A semiconductor wafer surface having a heterogeneous surface composition is preferred. A heterogeneous surface composition having different regions with different compositions on the surface is a preferred heterogeneous surface. A heterogeneous surface having different local topographies such as unwanted raised regions is a preferred heterogeneous surface. An example of a heterogeneous surface is a surface having regions of higher conductivity and regions of lower conductivity. A heterogeneous surface uncovered during semiconductor wafer processing such as a heterogeneous interface having regions of higher conductivity and lower conductivity is a preferred heterogeneous surface. A workpiece having a microelectronic surface having both conductive regions and nonconductive regions is more preferred and is an example of a preferred heterogeneous workpiece surface. Illustrative examples of conductive regions can be regions having copper or tungsten and other known conductors, especially metallic conductors. Metallic conductive regions in the workpiece surface consisting of metals selected from the group consisting of copper, aluminum, and tungsten or combinations thereof are particularly preferred. A semiconductor device is a preferred workpiece. A substrate wafer is a preferred workpiece. A semiconductor wafer having a polymeric layer requiring finishing is preferred because a lubricating aid can be particularly helpful in reducing unwanted surface damage to the softer polymeric surfaces. An example of a preferred polymer is a polyimide. Polyimide polymers are commercially available from E. I. DuPont Co. in Wilmington, Del.

This invention is particularly preferred for workpieces requiring a highly flat surface. Finishing a workpiece surface to meet the specified semiconductor industry circuit design rule is preferred and finishing a workpiece surface to meet the 0.35 micrometers feature size semiconductor design rule is more preferred and finishing a workpiece surface to meet the 0.25 micrometers feature size semiconductor design rule is even more preferred and finishing a workpiece surface to meet the 0.18 micrometers semiconductor design rule is even more particularly preferred. An electronic wafer finished to meet a required surface flatness of the wafer device rule in to be used in the manufacture of ULSIs (Ultra Large Scale Integrated Circuits) is a particularly preferred workpiece made with a method according to preferred embodiments of this invention. The design rules for semiconductors are generally known to those skilled in the art. Guidance can also be found in the "The National Technology Roadmap for Semiconductors" published by SEMATECH in Austin, Tex.

Using cost of manufacture parameters to improve control of the planarizing of a semiconductor wafer having a diameter of at least 200 mm is preferred and of a semiconductor wafer having a diameter of at least 300 mm is preferred. Using a cost model to improve control of the planarizing of a semiconductor wafer having a diameter of at least 200 mm is preferred and of a semiconductor wafer having a diameter of at least 300 mm is preferred. Using a cost model which uses activity based accounting to improve control of the planarizing of a semiconductor wafer having a diameter of at least 200 mm is preferred and of a semiconductor wafer having a diameter of at least 300 mm is more preferred. Using a business model to improve control of the planarizing of a semiconductor wafer having a diameter of at least 200 mm is preferred and of a semiconductor wafer having a diameter of at least 300 mm is preferred. Using a business model which uses activity based accounting to improve control of the planarizing of a semiconductor wafer having a diameter of at least 200 mm is preferred and of a semiconductor wafer having a diameter of at least 300 mm is more preferred. Supplying an aqueous lubricating composition to a semiconductor wafer having a diameter of at least 200 mm is preferred and supplying an aqueous lubricating composition to a semiconductor wafer having a diameter of at least 300 mm is more preferred. Supplying an aqueous lubricating composition having a lubricant to a semiconductor wafer having a diameter of at least 200 mm is even more preferred and supplying aqueous lubricating having a lubricant to a semiconductor wafer having a diameter of at least 300 mm is more preferred. Large semiconductor wafers can generally be finished more effectively with an aqueous lubricating composition, particularly one having lubricant. Friction, heat generation, manufacturing costs can be more effectively controlled with the sensors and methods disclosed herein.

Using cost of manufacture parameters to improve control of the planarizing of a semiconductor wafer having a low-k layer is preferred and of a semiconductor wafer having a multiplicity of low-k layers is more preferred. For finishing of semiconductor wafers having low-k dielectric layers (low dielectric constant layers), finishing aids, more preferably lubricating aids, are preferred. Illustrative non-limiting examples of low-k dielectrics are low-k polymeric materials, low-k porous materials, and low-k foam materials. As used herein, a low-k dielectric has at most a k range of less than 3.5 and more preferably less than 3.0 and even more preferably less than 2.5 and even more especially preferred is less than 2.0. Illustrative examples include doped oxides, organic polymers, highly fluorinated organic polymers, and porous materials. A porous low-k dielectric layer is a preferred low-k dielectric layer. Low-k dielectric materials are generally known to those skilled in the semiconductor wafer arts. Abrasive organic synthetic resin particles can be effective to finishing low-dielectric materials. Abrasive organic synthetic resin asperities can be effective to finishing low-dielectric materials. Multilevel semiconductor wafers such as those having low-k dielectric layers and multilevel metal layers are generally known by those skilled in the semiconductor arts and U.S. Pat. No. 6,153,833 to Dawson et al, is included herein by reference for general non-limiting guidance for those skilled in the art. Since low-k dielectric layers generally have lower mechanical strength, the lower coefficient of friction that is offered by organic lubricating boundary layers is particularly preferred. A semiconductor wafer having a plurality of low-k dielectric layers is a preferred workpiece and a semiconductor wafer having at least 3 of low-k dielectric layers is a more preferred workpiece and a semiconductor wafer having at least 5 of low-k dielectric layers is an even more preferred workpiece. Supplying a lubricant to a plurality of the low-k dielectric layers during finishing of the same semiconductor wafer is preferred and supplying a lubricant to at least 3 of the low-k dielectric layers during finishing of the same semiconductor wafer is more preferred and supplying a lubricant to at least 5 of the low-k dielectric layers during finishing of the same semiconductor wafer is even more preferred. A semiconductor wafer having at most 10 low-k dielectric layers is currently preferred but in the future this can increase. Semiconductor wafers for logic integrated circuits are particularly preferred. Defects caused during finishing can be reduced by supplying a lubricant.

A semiconductor wafer having a plurality of metal layers is a preferred workpiece and a semiconductor wafer having at least 3 of metal layers is a more preferred workpiece and a semiconductor wafer having at least 5 of metal layers is an even more preferred workpiece. A semiconductor wafer having at most 10 metal layers is currently preferred but in the future this will increase. A semiconductor wafer having logic chips or logic die is particularly preferred because they can have multiple metal layers for supplying lubricants such as preferred lubricants during finishing. Supplying a lubricant to a plurality of finishing layers of the same semiconductor wafer is preferred and supplying a lubricant to at least 3 of finishing layers of the same semiconductor wafer is more preferred and supplying a lubricant to at least 5 of finishing layers of the same semiconductor wafer is more preferred. Defects caused during finishing can be reduced by supplying a lubricant. Semiconductor wafers having a plurality of metal layers or dielectric layers are generally known to those skilled in the semiconductor wafer arts and U.S. Pat. No. 5,516,346 to Cadien et al. and U.S. Pat. No. 5,836,806 to Cadien et al. are included herein in their entirety for general illustrative guidance. Further, defects in the first finished layer can cause defects in the second finished layer (and so on). In other words, defects in a prior layer can cause defects in a latter layer.

Preferred in situ control can help reduce unwanted defects and reduce costs. A method which updates the cost of manufacture control parameters, look-up tables, algorithms, or control logic consistent with the current manufacturing step is preferred. A method which updates the cost of manufacture control parameters, look-up tables, algorithms, or control logic consistent with the current manufacturing step while evaluating prior manufacturing steps (such as completed manufacturing steps) is preferred. A method which updates the cost of manufacture control parameters, look-up tables, algorithms, or control logic consistent with the current manufacturing step while evaluating future manufacturing steps is preferred. A method which updates the cost of manufacture control parameters, look-up tables, algorithms, or control logic consistent with the current manufacturing step while evaluating both prior and future manufacturing steps is more preferred. The semiconductor wafer can be tracked for each finishing step during processing with a tracking means such as tracking code. As an illustrative example, a semiconductor wafer can be assigned with a trackable UPC code. U.S. Pat. No. 5,537,325 issued to Iwakiri, et al., on Jul. 16, 1997 teaches a method to mark and track semiconductor wafers sliced from an ingot through the manufacturing process and is included for by reference in its entirety for general guidance and appropriate modification by those skilled in the art. Further nonlimiting examples of bar and/or tracking codes are found in U.S. Pat. No. 5,567,927 to Kahn et al., and U.S. Pat. No. 5,883,374 to Mathews and are included herein in there entirety for general guidance and appropriate modification by those skilled in the art. As a further nonlimiting example, Cognex Corporation in Natick, Mass. markets commercial tacking means for tracking semiconductor wafers. As further illustration of preferred tracking codes include 2D matrix (such as SEMI 2D matrix), alphanumeric, and bar codes. RFID (radio frequency identification) can also be used for tracking wafer batches such as in workpiece containers or transporters (e.g. a FOUP). Tracking codes using line of sight readers can be preferred from some applications such bar codes. Tracking codes using non-line of sight readers can be preferred from some applications such RFID. Both non-line sight tracking codes and line of sight tracking codes can generally enhance tracking information for some applications. Processes, performance, and preferred process control conditions and information can be tracked and stored by wafer (and/or wafer batches) with this technology when used with the new disclosures herein.

A semiconductor wafer having logic chips is preferred. A semiconductor wafer having memory chips is preferred. A DRAM is a preferred memory chip. An SRAM is a preferred memory chip. A digital signal processor (DSP) is a preferred semiconductor chip. A microprocessor is a preferred semiconductor chip. Telecommunications chips are a preferred semiconductor chip. A semiconductor chip having a plurality of metal layers is a preferred semiconductor chip. An optoelectronic chip is a preferred semiconductor chip. An SOC (System on a Chip) is a preferred semiconductor chip. A semiconductor wafer planarized in a foundry having manufacturing multiple types of semiconductor wafers is also preferred. Semiconductor chips are generally known to those skilled in the art. As non-limiting example U.S. Pat. No. 6,150,190 to Stankus is included herein by reference in its entirety along with other planarizing references for guidance and modification by those skilled in the art. These foundries generally have complex product lines and improvements to the cost of manufacture is very helpful in getting and/or retaining customers. Each of these semiconductor chips have multiple processing steps including various planarizing steps during manufacture and generally reducing the cost of manufacture and/or improving performance at the same cost will are expected to enhance profits for the manufacturer.

A workpiece which is manufactured in a multiplicity of separate manufacturing steps is preferred. A workpiece which is manufactured in a multiplicity of separate and distinct manufacturing steps is more preferred. A workpiece which is manufactured in at least 10 separate manufacturing steps is preferred. A workpiece which is manufactured in at least 10 separate and distinct manufacturing steps is more preferred. A workpiece which is manufactured in at least 25 separate manufacturing steps is preferred. A workpiece which is manufactured in at least 25 separate and distinct manufacturing steps is more preferred. A workpiece manufactured in steps which include a planarizing step having a portion of the step in non-steady state is preferred. A workpiece manufactured in steps which include a plurality of planarizing steps having a portion of the step in non-steady state is more preferred. A workpiece manufactured in steps which include at least three of planarizing steps having a portion of the step in non-steady state is more preferred. Determining a change for a process control parameter with progress of planarizing information and changing a process control parameter while a process is in a non-steady state is preferred for some process control operations. Determining a change for a process control parameter with progress of planarizing information and changing a process control parameter while a process is in a non-equilibrium time period of change is preferred for some process control operations. An illustrative example of non-steady state processing time period is the partial clearing of a conductive layer from a nonconductive layer. During this period of clearing the surface composition (refining) of the workpiece generally has a surface composition changing during a non-steady time period. During this period of clearing the surface composition (refining) of the workpiece can have frictional and/or differential frictional changes during a non-steady time period.

A generally robust control subsystem for manufacturing a workpiece having multiple manufacturing steps wherein some of the steps having non-steady time periods is preferred. A control system with a plurality of operative sensors, a plurality of processors, and at least one controller is a non-limiting example of a preferred control subsystem for controlling during non-steady state. A process model and/or a cost of manufacture model can be preferred. A workpiece having an identification code is preferred and a workpiece having a unique identification code is preferred. An identification code can further aid process control of a manufacturing process having multiple steps. A semiconductor wafer is a preferred example of a workpiece. A workpiece having a microelectronic component is another example.

Operative Sensors—Illustrative Examples

Operative sensors can be remote from the workpiece being planarized. Illustrative some illustrative examples follow. Sensing a change in planarizing, polishing, finishing, and/or processing is preferred. Sensing the change in friction of the friction sensor probe can be accomplished using technology disclosed herein. An optical friction sensor is a preferred friction sensor. Non-limiting preferred examples of the optical friction sensors is an infrared thermal sensing unit such as a infrared camera and a laser adjusted to read minute changes of movement friction sensor probe to a perturbation. A non-optical sensing friction sensor is a preferred friction sensor. Non-limiting preferred examples of non-optical friction sensors include thermistors, thermocouples, diodes, thin conducting films, and thin metallic conducting films. Electrical performance versus temperature such as conductivity, voltage, and resistance is measured. Those skilled in the thermal measurement arts are generally familiar with non-optical thermal sensors and their use. A change in friction can be detected by rotating the friction sensor probe in operative friction contact with the finishing element finishing surface with electric motors and measuring current changes on one or both motors. The current changes related to friction changes can then be used to produce a signal to operate the friction sensor subsystem. A change in friction can be detected by rotating the friction sensor probe in operative friction contact with the finishing element finishing surface with electric motors and measuring power changes on one or both motors. The power changes related to friction changes can then be used to produce a signal to operate the finishing control subsystem. Optionally one can integrate the total energy used by one or both motors over known time periods to monitor friction changes. One can monitor the temperature of the friction sensor surface with a friction sensor to develop a signal related to the friction at the interface between the friction sensor surface and the finishing element finishing surface. A sensor can also be used to detect imparted translational motion which corresponds to changes in friction. Using this information, integration coefficients can be developed to predict finishing effectiveness. An infrared camera or another type infrared temperature measuring device can be used for detecting and mapping of a temperature of the friction sensor surface which is predictive of the friction at the interface of the friction sensor surface and the finishing element finishing surface. The thermal image can then be analyzed and used to control the operational parameters of finishing. Operative process sensors to measure current, voltage, and wattage are generally known. Methods to measure friction are generally well known to those skilled in the art. Non limiting examples of methods to measure friction are described in the following U.S. Pat. No. 5,069,002 to Sandhu et al., U.S. Pat. No. 5,196,353 to Sandhu, U.S. Pat. No. 5,308,438 to Cote et al., U.S. Pat. No. 5,595,562 to Yau et. al., U.S. Pat. No. 5,597,442 to Chen, U.S. Pat. No. 564,050 to Chen, and U.S. Pat. No. 5,738,562 to Doan et al. and are included by reference herein in their entirety for guidance. Those skilled in the art can modify this information using the confidential information disclosed herein for use in the process sensors of this invention.

By having at least one operative process sensor such as a friction sensor probe to detect and output signals in real time on changes in finishing progress and friction due to operating parameter changes in lubrication and finishing can be more effectively controlled. By having two friction sensors, differential changes in friction can be monitored and used to even more effectively control finishing. By having two operative process sensors, differential changes in finishing progress can be monitored and improved finishing information obtained and used to even more effectively control finishing. Differential changes in friction can be monitored that are due to differential reaction (and/or interaction) and lubrication of different materials on two different friction sensor probe friction sensor surfaces which in turn can be used to better control finishing of the workpiece surface having these two materials. Generally, a multiplicity of operative finishing, more preferably planarizing, sensors can improve process information during differential finishing (planarizing) and this information used for improved decision making with the cost of manufacture parameters. Further the differential lubrication can be related to such finishing control parameters as operative finishing motion speed, type of motion such as continuous or vibrating motions, applied pressure, temperature of finishing, etc. By having at least one friction sensor probe, more preferably two friction sensor probes, which have been calibrated over time, such changes can be recognized and adjusted by those generally skilled in the art with mathematical equations and modeling within the capability of current processor devices such as computers. A friction sensor probe is an illustrative example of a preferred operative sensor(s).

An operative friction sensor is a preferred operative process sensor and a preferred for some applications. An operative finishing composition sensor is a preferred operative process sensor and a preferred for some applications. Differential calculations with the operative friction sensor information to determine differential lubrication is a preferred evaluation. Illustrative non-limiting operative process sensors, operative friction sensors, tracked information, and illustrated uses are found in Provisional Patent Application with PTO Ser. No. 60/107,300 filed on the Nov. 6, 1998 and having the title "In Situ Friction Detector for finishing workpieces", U.S. patent application with Ser. No. 09/538,409 filed Mar. 29, 2000 and in a U.S. Pat. No. 6,283,829 to Molnar and they are included in their entirety by reference for general guidance and modification of those skilled in the art.

Workpiece Operative Sensor—Illustrative Examples

A workpiece finishing sensor is an example of a preferred operative sensor. An operative process sensor is a preferred operative sensor. An operative workpiece sensor is a preferred operative sensor. A workpiece finishing sensor is a sensor which senses the finishing progress to the workpiece in real time so that an in situ signal can be generated. A workpiece finishing sensor is preferred. A workpiece finishing sensor probe which facilitates measurement and control of finishing in this invention is preferred. A workpiece finishing sensor probe which generates a signal which can be used cooperatively with the friction sensor signal to improve finishing is more preferred. As used herein, a finishing sensor probe is a sensor probe which senses parameters either directly or indirectly related to finishing of the workpiece in the operative finishing interface. A friction sensor probe is an example of a preferred finishing sensor. As used herein, a planarizing sensor probe is a sensor probe which senses parameters either directly or indirectly related to planarizing of the workpiece in the operative planarizing interface. A friction sensor probe is an example of a preferred planarizing sensor. A workpiece finishing sensor probe is a preferred finishing sensor.

The change in friction during finishing can be accomplished using technology generally familiar to those skilled in the art. A change in friction can be detected by rotating the workpiece being finished and the finishing element finishing surface with electric motors and measuring current changes on one or both motors. The current changes related to friction changes can then be used to produce a signal to operate the finishing control subsystem. A change in friction can be detected by rotating the workpiece finishing surface with the finishing element finishing surface with electric motors and measuring power changes on one or both motors. Changes in friction can also be measured with thermal sensors. A thermistor is a non-limiting example of preferred non-optical thermal sensor. A thermal couple is another preferred non-optical thermal sensor. An optical thermal sensor is a preferred thermal sensor. A infrared thermal sensor is a preferred thermal sensor. Sensors to measure friction in workpieces being finished are generally known to those skilled in the art. Non limiting examples of methods to measure friction in friction sensor probes are described in the following U.S. Pat. No. 5,069,002 to Sandhu et al., U.S. Pat. No. 5,196,353 to Sandhu, U.S. Pat. No. 5,308,438 to Cote et al., U.S. Pat. No. 5,595,562 to Yau et. al., U.S. Pat. No. 5,597,442 to Chen, U.S. Pat. No. 5,643,050 to Chen, and U.S. Pat. No. 5,738,562 to Doan et al. and are included by reference herein in their entirety for guidance and can be advantageously modified by those skilled in the art for use in this invention. Thermal sensors are available commercially from Terra Universal, Inc. in Anaheim, Calif. and Hart Scientific in American Fork, Utah. Measuring the changes in friction at the interface between the workpiece being finished and the finishing element finishing surface to generate an in situ signal for control is particularly preferred because it can be effectively combined with at least one friction sensor probes to this invention to improve finishing control. Measuring the changes in friction at the interface between the workpiece being finished and the finishing element finishing surface is a useful friction sensing method.

A workpiece finishing sensor for the workpiece being finished is preferred. A sensor for the workpiece being finished selected from the group consisting of friction sensors, thermal sensors, optical sensors, acoustical sensors, and electrical sensor is a preferred sensor for the workpiece being finished in this invention. A nonoptical sensor is a preferred sensor. An electromagnetic radiation sensor is a preferred control sensor. A voltage sensor is a preferred control sensor. A current sensor is a preferred control sensor. A magnetic field sensor is a preferred control sensor. Workpiece thermal sensors and workpiece friction sensors are non-limiting examples of preferred workpiece friction sensors. As used herein, a workpiece friction sensor can sense the friction between the interface of the workpiece being finished and the finishing element finishing surface during operative finishing motion.

Additional non-limiting preferred examples of workpiece sensors will now be discussed. Preferred optical workpiece sensors are discussed. Preferred non-optical workpiece sensors are also discussed. The endpoint for planarization can be effected by monitoring the ratio of the rate of insulator material removed over a particular pattern feature to the rate of insulator material removal over an area devoid of an underlying pattern. The endpoint can detected by impinging a laser light onto the workpiece being polished and measuring the reflected light versus the expected reflected light as an measure of the planarization process. A system which includes a device for measuring the electrochemical potential of the slurry during processing which is electrically connected to the slurry, and a device for detecting the endpoint of the process, based on upon the electrochemical potential of the slurry, which is responsive to the electrochemical potential measuring device can be used. Endpoint detection can be determined by an apparatus using an interferometer measuring device directed at an unpatterned die on the exposed surface of the wafer to detect oxide thickness at that point. A semiconductor substrate and a block of optical quartz are simultaneously polished and an interferometer, in conjunction with a data processing system is then used to monitor the thickness and the polishing rate of the optical block to develop an endpoint detection method. A layer over a patterned semiconductor is polished and analyzed using optical methods to determine the end point. An energy means for supplying prescribed energy to the semiconductor wafer is used to develop a detecting means for detecting a polishing end point to the polishing of film by detecting a variation of the energy supplied tot the semiconductor wafer. The use of sound waves can be used during chemical mechanical polishing by measuring sound waves emanating from the chemical mechanical polishing action of the substrate against the finishing element. A control subsystem can maintain a wafer count, corresponding to how many wafers are finished and the control subsystem regulates the backside pressure applied to each wafer in accordance with a predetermined function such that the backside pressure increases monotonically as the wafer count increases. Process sensors in United States Patents and their use are generally known to those skilled in the art. U.S. Pat. No. 5,081,796 to Schultz, U.S. Pat. No. 5,439,551 to Meikle et al., U.S. Pat. No. 5,461,007 to Kobayashi, U.S. Pat. No. 5,413,941 to Koos et al., U.S. Pat. No. 5,63,185 Murarka et al., U.S. Pat. No. 5,643,046 Katakabe et al., U.S. Pat. No. 5,643,060 to Sandhu et al., U.S. Pat. No. 5,653,622 to Drill et al., U.S. Pat. No. 5,705,435 to Chen., U.S. Pat. No. 5,872,633 to Holzapfel et al., U.S. Pat. No. 5,964,643 to Birang et al., U.S. Pat. No. 6,153,116 to Yang et al., U.S. Pat. No. 6,213,846 to Li et al., and U.S. Pat. No. 6,267,641 to Vanell et al. are included by reference in their entirety and included herein for general guidance and modification by those skilled in the art using the teachings and guidance herein.

Operative sensors to monitor and/or sense different planarizing processes are generally known to those skilled in the wafer processing arts.

Process Control Parameters

Preferred process control parameters include those control parameters which can be changed during processing and affect workpiece processing and/or finishing. The preferred control parameters have generally been discussed herein in relationship to different embodiments of applied energy processing and/or planarizing. Generally, given the teachings and guidance herein, one skilled in the art can generally select effective process control parameters for different apparatus and methods of applied energy planarizing.

Control of the operative finishing motion is a preferred process control parameter for some applications. Examples of preferred operative finishing motions include relative velocity, pressure, and type of motion. Examples of preferred types of operative finishing motions include tangential motion, planar finishing motion, linear motion, vibrating motion, oscillating motion, and orbital motion. Finishing temperature is a preferred process control parameter. Finishing temperature can be controlled by changing the heat supplied to the platen or heat supplied to the finishing composition. Alternately, friction can also change the finishing temperature and can be controlled by changes in lubrication, applied pressure during finishing, and relative operative finishing motion velocity. Changes in lubricant can be effected by changing finishing composition(s) and/or feed rate(s). A preferred group of process control parameters consists of parameters selected from the group consisting of operative finishing interface relative velocity, platen velocity, polishing pattern, finishing temperature, force exerted on the operative finishing interface, finishing composition, finishing composition feed rate, and finishing pad conditioning.

Non-limiting illustrative examples of general control parameters include the amount of planarizing energy, the intensity of the planarizing energy, the location of the planarizing energy, type of movement applied to the planarizing energy, velocity of the movement of the planarizing energy, temperature(s), and real time control of the application of the planarizing energy or energies. The applied planarizing energy can add material to the workpiece surface. The applied planarizing energy can remove material from the workpiece surface.

Operative sensors to monitor and/or sense different planarizing energies are generally known to those skilled in the wafer processing arts.

Processor

A processor is preferred to help evaluate the information. A processor can be a microprocessor, an ASIC, or some other processing means. A processor preferably has computational and digital capabilities. Non limiting preferred examples of processing information include use of various mathematical equations, calculating specific parameters, memory look-up tables or databases for generating certain parameters such as historical performance or preferred parameters or constants, neural networks, fuzzy logic techniques for systematically computing or obtaining preferred parameter values. Input parameter(s) can include information on current wafers being polished such as uniformity, expected polish rates, preferred lubricants(s), preferred lubricant concentrations, entering film thickness and uniformity, workpiece pattern. Further preferred non-limiting processor capabilities including adding, subtracting, multiplying, dividing, use functions, look-up tables, noise subtraction techniques, comparing signals, and adjusting signals in real time from various inputs and combinations thereof. Further general computing techniques such neural networks and statistical process control are generally known to those skilled in the semiconductor wafer processing arts. General computing techniques such as neural networks (including examples learning neural networks), fuzzy logic, gradients, derivatives, algebraic processes, nonlinear processes, iterative processes, rule based processes, Monte Carlo, data mining, and statistical process control (including examples of nonconstant mean of response variables) are generally known to those skilled in the various arts. Non-limiting illustrative examples of neural networks, gradients, derivatives, algebraic processes, nonlinear processes, iterative processes, Monte Carlo, fuzzy logic, data mining, statistical process control, and other generally known process control and data analysis techniques are found in U.S. Pat. No. 5,553,195 to Meijer, U.S. Pat. No. 5,774,833 to Baba et. al., U.S. Pat. No. 5,809,699 to Wong et al., U.S. Pat. No. 5,813,002 to Agrawal et al., U.S. Pat. No. 5,813,002 to Agrawal et al., U.S. Pat. No. 5,818,714 to Zou et al., U.S. Pat. No. 5,822,220 to Baines, U.S. Pat. No. 5,828,812 to Khan et al., U.S. Pat. No. 5,830,955 to Takeda et al., U.S. Pat. No. 5,832,468 to Miller et al., U.S. Pat. No. 5,832,466 to Feldgajer, U.S. Pat. No. 5,841,671 to Furumoto, U.S. Pat. No. 5,841,651 to Fu, U.S. Pat. No. 5,978,398 to Halverson, U.S. Pat. No. 6,587,744 to Stoddard et al., U.S. Pat. No. 6,591,254 to Keeler et al., and U.S. Pat. No. 6,725,208 to Hartman et al., U.S. Pat. No. 6,738,677 to Martin et al., U.S. Pat. No. 6,799,117 to Proett, et al., and U.S. Pat. No. 6,810,291 to Card et al. and are included herein by reference in their entirety for general guidance and modification by those skilled in the arts using the teachings herein.

Memory look-up tables and databases are generally made accessible through memory devices. The memory devices can be integral with the process or operatively connected to the processor. A plurality of processors can be used. As a non-limiting example, the memory look-tables can reside on a remote processor or computer. For instance, the remote processor can be on a local area network or in an even more remote location. The primary processing can be done on a remote processor and/or computer. A processor which determines an improved control parameter for one planarizing apparatus is preferred and which determines an improved control parameter for planarizing apparatuses is more preferred and which determines an improved control parameter for at least five planarizing apparatuses is even more preferred and which determines an improved control parameter for at least ten planarizing apparatuses is even more preferred. A processor which controls one planarizing apparatus is preferred and which controls a plurality of planarizing apparatuses is more preferred and one which controls at least five apparatuses is even more preferred and one which controls at least ten apparatuses is even more preferred. The desired processors and/or remote look-tables can be accessed as needed remotely and/or the remote look-tables can be temporarily downloaded to the processor (and/microcomputer) needing access them. For instance, the processors and/or look-up tables can be located in the same fab or primary processors and/or lookup tables can be located remotely away from one or more fabs which they serve. This can reduce investment and improve the cost of manufacture of the semiconductor wafers.

Cost of Manufacture Information

Figure 6:
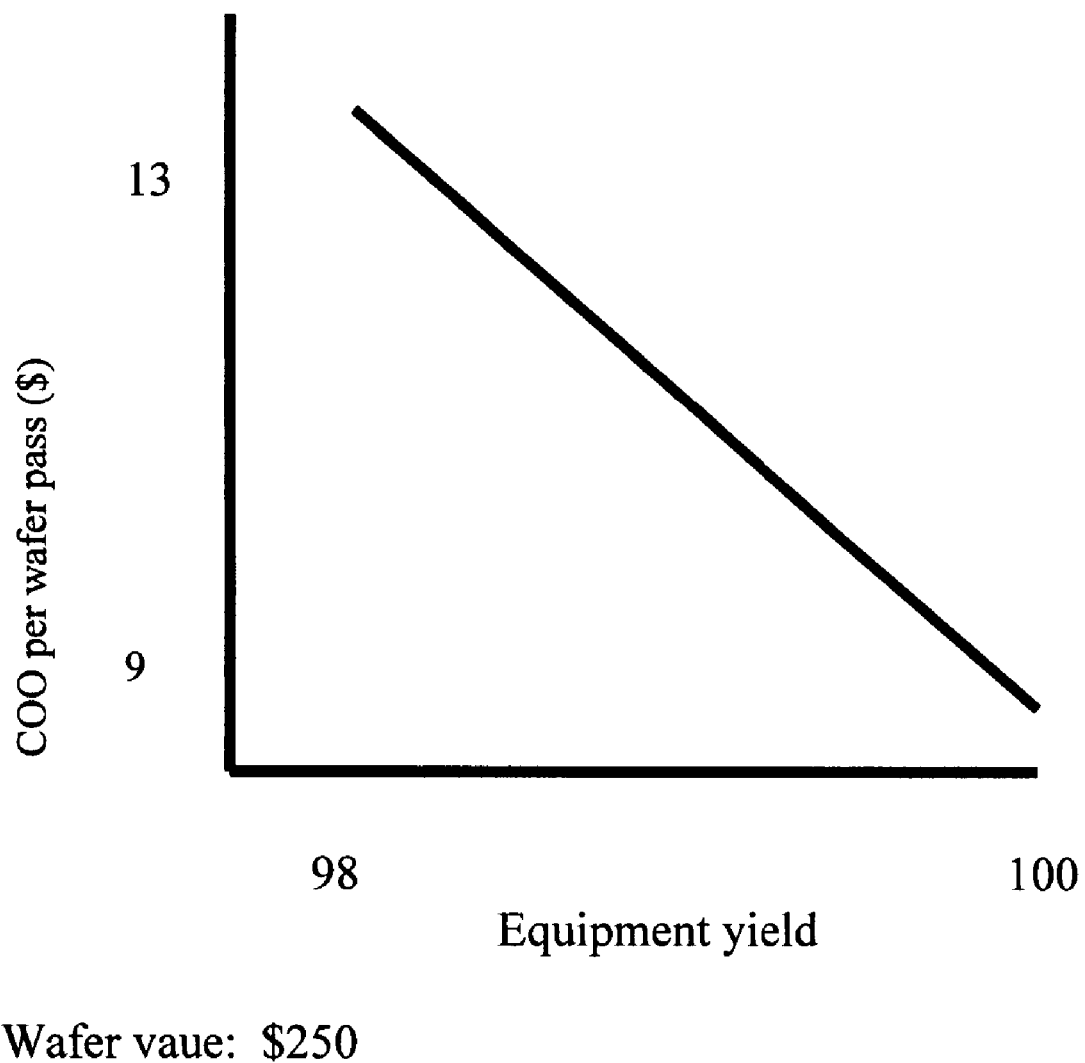
FIG. 6 is a plot of cost of ownership vs. defect density
Figure 7:
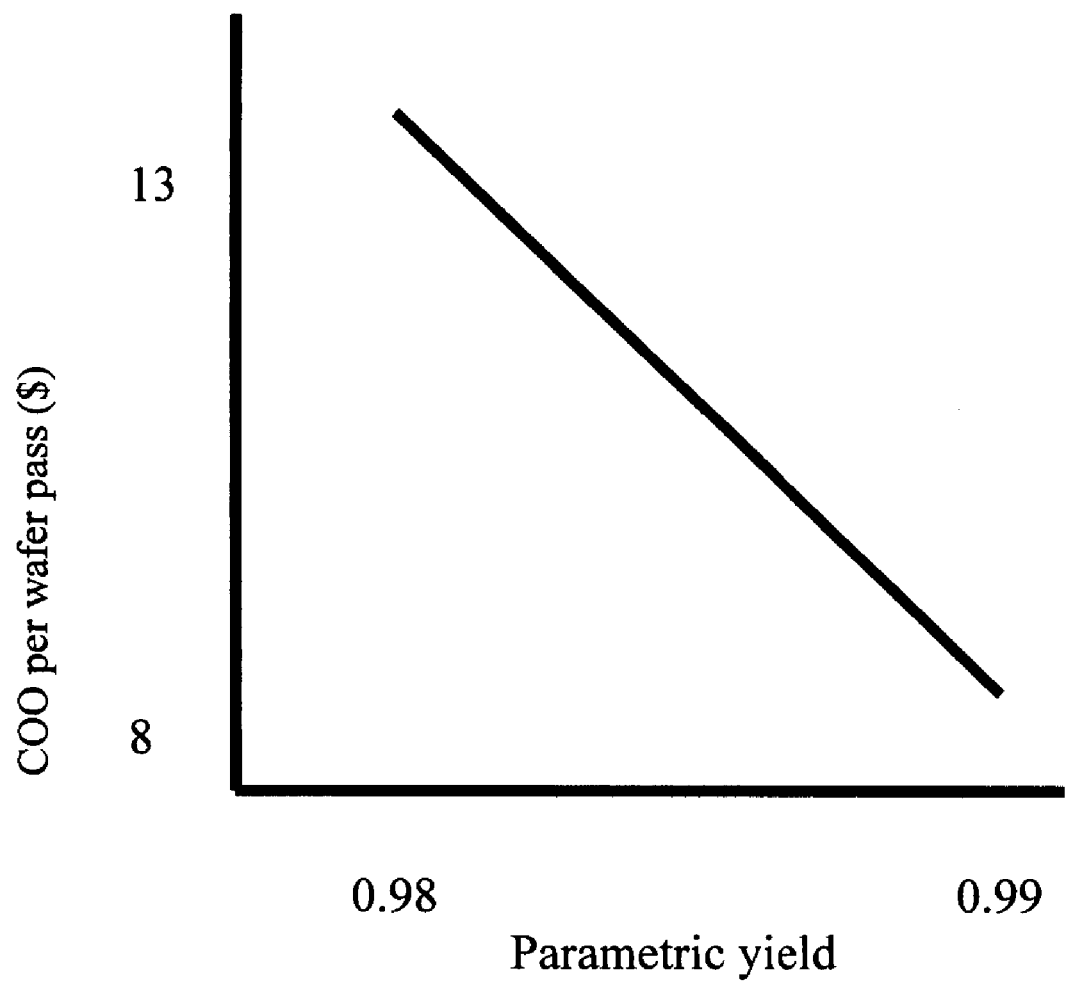
FIG. 7 is a plot of cost of ownership vs. equipment yield
Figure 8:
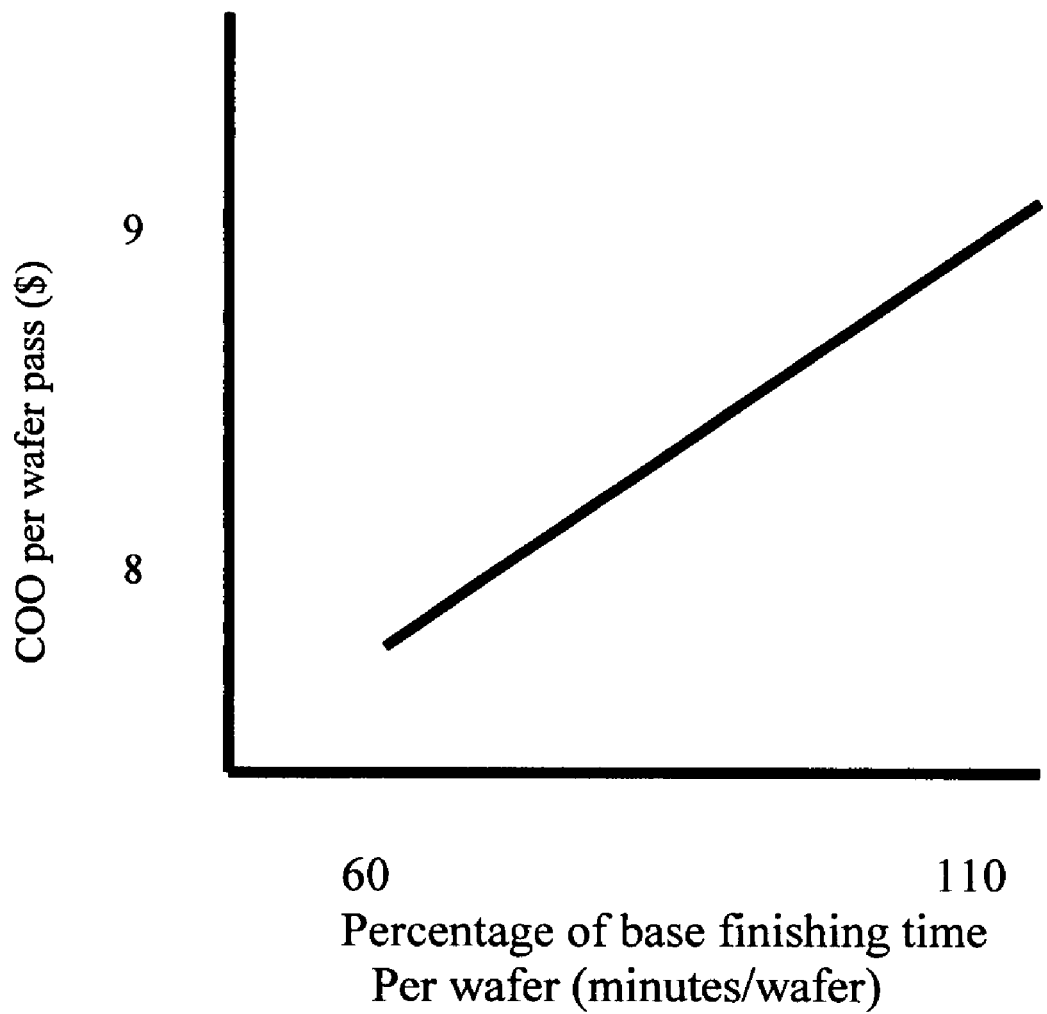
FIG. 8 is a plot of cost of ownership vs. parametric yield loss
Figure 9:
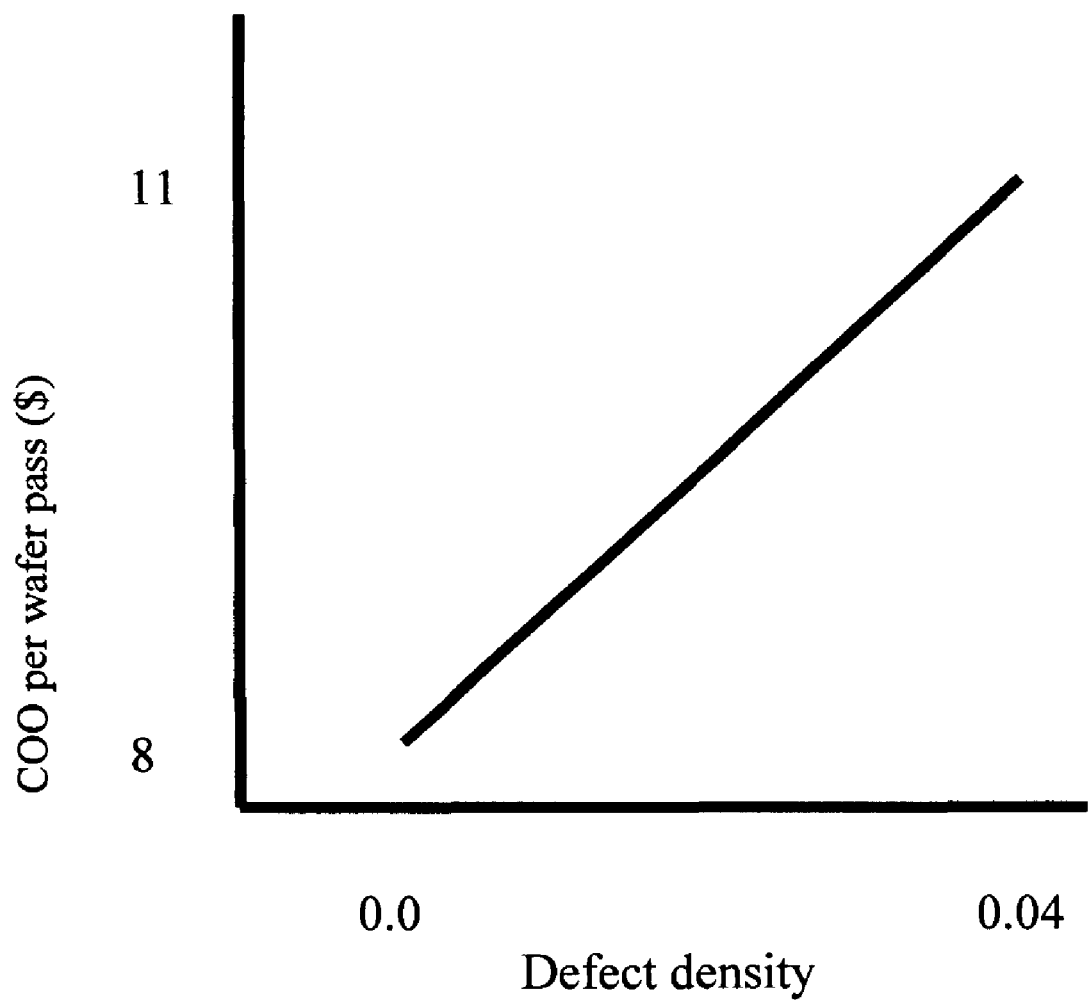
FIG. 9 is a plot of finishing rate effect on cost of ownership

Cost of manufacture parameters for adding and removing material during planarizing are very complex. Cost of manufacture parameters are preferred illustrative examples of cost of manufacture information. Cost of manufacture parameters for chemical mechanical finishing are very complex and can serve as nonlimiting illustrative example. During non-steady processing periods the changes in the process parameters and output variables can further increase complexity. To applicant's knowledge, because of their complexity they have not been used for in situ process improvement. Applicant has now found unexpectedly that cost of manufacture parameters can be used to advantage to improve both finishing control and cost of manufacture during real-time finishing. Evaluating multiple variables, each with varying effects on the cost of manufacture is a preferred for changing the cost of manufacture. Evaluating multiple variables, each with varying effects on the cost of manufacture is a preferred for improving the cost of manufacture. A process variable is a preferred variable. A process control variable is an illustrative example of a preferred process variable. A cost of manufacture parameter is a preferred variable. Illustrative preferred examples of process control parameters and cost of manufacture are discussed herein. Particular cost of manufacture parameters are preferred because they have a large impact on efficiency and effectiveness of chemical mechanical finishing as well as the proper selection of improved process control parameters and their selected values. A preferred cost of manufacture parameter is the defect density. FIG. 6 illustrates the effect of defect density on the cost of manufacture for a particular semiconductor wafer (finished wafer valued of $500). Note that an increase of defect density from 0.01 to 0.03 can increase the cost of manufacture for finishing by about $1.50. Another preferred cost of manufacture parameter is equipment yield. FIG. 7 illustrates the effect of a decrease of 1% in equipment yield can increase the cost of manufacture by $2.50 (in process wafer valued of $250). Another preferred cost of manufacture parameter for in situ process control is the parametric yield. FIG. 8 illustrates the effect of a decrease of 1% in parametric yield which can increase the cost of manufacture by $5.00 (finished wafer valued of $500). Another preferred cost of manufacture parameter for in situ process control is the finishing rate. FIG. 9 illustrates the effect of a finishing rate improvement on the cost of manufacture. FIGS. 6 to 9 represent illustrative non-limiting graphs and equations which can be used to improve finishing with tracked information such as cost of manufacture parameters. Tracked information for specific workpieces and/workpiece batches can generally improve in situ finishing control by, for example, improving cost information. It is also generally useful to note that depending on the particular finishing conditions, an increase in finishing rate can have a lowering effect on cost of manufacture due to an increase in throughput and can simultaneously increase the cost of manufacture by increasing the yield loss due to increased defect density. By using a processor, appropriate calculations and/or algorithms can be used in situ to change and/or improve cost of manufacture in real-time. Without the processor and the ready access to preferred cost of manufacture parameters, it is difficult to properly improve the process control parameters during real-time finishing. Cost of manufacture parameters and Cost of Ownership metrics are generally known by those skilled in the semiconductor arts. SEMATECH has published generally widely accepted cost of manufacture parameters and Cost of Ownership metrics which are included herein by reference in their entirety for guidance and use of those skilled in the semiconductor art. Further, Wright Williams and Kelly of Dublin, Calif. have published a manual entitled "Understanding and Using Cost of Ownership" (rev. 0595-1) containing cost of manufacture parameters and equations for cost of manufacture calculation which is also included herein by reference in its entirety for guidance and use of those skilled in the semiconductor arts. Where specific reference is made herein to a specific definition of a particular cost of manufacture metric, applicant will use for instance the Wright Williams and Kelly parametric yield or the SEMATECH equipment yield naming for additional specificity. As illustrated in FIGS. 6-9, cost of manufacture information and cost of manufacture parameters are preferably used in or converted to common form of monetary value. The denomination of monetary value can be varied to the needs such as US dollars, Japanese yen, Euro, and the like. Use cost of manufacture parameter in a monetary value in the evaluations and/or determinations is preferred. Use cost of manufacture information in a monetary value in the evaluations and/or determinations is preferred. Conversion to a monetary value and/or between monetary values is generally known to those skilled in the art. Use of cost of manufacture parameters and cost of manufacture information in a common monetary denomination value is generally known to those skilled in the accounting arts.

Non limiting example of methods to make available preferred cost of manufacture information include use of various mathematical equations, calculating specific parameters, memory look-up tables or databases for generating certain parameters such as historical performance or preferred parameters or constants, neural networks, fuzzy logic techniques for systematically computing or obtaining preferred parameter values. Systematically computing parameter values is preferred for some applications. It is also to be understood that often a single semiconductor wafer can undergo multiple wafer processing and/or finishing operations. Each time the semiconductor wafer is finished in a wafer pass, the value of the semiconductor wafer increases due to multiple processing steps and thus the value of the equipment yield changes. A method which updates the cost of manufacture parameters consistent with the current manufacturing step is preferred. Those skilled in the arts of activity based accounting can generally setup appropriate look-up tables containing appropriate cost of manufacture parameters to use for in situ process control given the teachings and guidance herein. The semiconductor wafer can be tracked during processing with a tracking code. As an illustrative example, a semiconductor wafer can be assigned with a trackable UPC code. Activity based accounting and tracking code guidance can be found in U.S. Pat. No. 5,537,325 to Iwakiri and U.S. Pat. No. 5,732, 401 to Conway and are included for by reference in their entirety for general background, guidance, and appropriate modification by those skilled in the art using the teachings and disclosures herein. Process and cost of manufacture information can be tracked and stored by wafer with this technology when used with the new disclosures herein.

Determining a change in at least one control parameter based upon at least one cost of manufacture parameter is preferred and determining a change in at least one control parameter based upon at least three cost of manufacture parameters is more preferred and determining a change in at least one control parameter based upon at least five cost of manufacture parameters is even more preferred and determining a change in at least one control parameter based upon at least ten cost of manufacture parameters is even more particularly preferred. Determining a change which improves the cost of manufacture of a semiconductor wafer manufacturing step is preferred and determining a change which improves at least two manufacturing steps is more preferred and determining a change which improves the cost of manufacture for at least three manufacturing steps is even more preferred. Determining a change which improves the cost of manufacture of at least two semiconductor wafer manufacturing steps for the same wafer is preferred and determining a change which improves at least three semiconductor manufacturing steps for the same semiconductor wafer is more preferred and determining a change which improves at least four semiconductor manufacturing steps for the same semiconductor wafer is even more preferred. Determining a change which improves the cost of manufacture of at least two semiconductor wafer manufacturing steps for the same design semiconductor wafer is preferred and determining a change which improves at least three semiconductor manufacturing steps for the same design semiconductor wafer is more preferred and determining a change which improves at least four semiconductor manufacturing steps for the same design semiconductor wafer is even more preferred. Determining the change which improves the cost of manufacture at least in part with a memory look-up table is preferred and determining the change which improves cost of manufacture at least in part with an equation is also preferred. Determining the change which improves the cost of manufacture at least in part with a memory look-up table and an equation is more preferred.

Evaluating a change in at least one control parameter based upon at least one cost of manufacture parameter is preferred and evaluating a change in at least one control parameter based upon at least three cost of manufacture parameters is more preferred and evaluating a change in at least one control parameter based upon at least five cost of manufacture parameters is even more preferred and evaluating a change in at least one control parameter based upon at least ten cost of manufacture parameters is even more particularly preferred. Evaluating a change which improves and/or changes the cost of manufacture of a semiconductor wafer manufacturing step is preferred and evaluating a change which improves and/or changes at least two manufacturing steps is more preferred and evaluating a change which improves and/or changes the cost of manufacture for at least three manufacturing steps is even more preferred. Evaluating a change which improves and/or changes the cost of manufacture of at least two semiconductor wafer manufacturing steps for the same wafer is preferred and evaluating a change which improves and/or changes at least three semiconductor manufacturing steps for the same semiconductor wafer is more preferred and evaluating a change which improves and/or changes at least four semiconductor manufacturing steps for the same semiconductor wafer is even more preferred. Evaluating a change which improves and/or changes the cost of manufacture of at least two semiconductor wafer manufacturing steps for the same design semiconductor wafer is preferred and evaluating a change which improves and/or changes at least three semiconductor manufacturing steps for the same design semiconductor wafer is more preferred and evaluating a change which improves and/or changes at least four semiconductor manufacturing steps for the same design semiconductor wafer is even more preferred. Evaluating the change which improves and/or changes the cost of manufacture at least in part with a memory look-up table is preferred and evaluating the change which improves and/or changes cost of manufacture at least in part with an equation is also preferred. Evaluating the change which improves and/or changes the cost of manufacture at least in part with a memory look-up table and an equation is more preferred.

A variable cost of manufacture parameter is a preferred cost of manufacture parameter. A consumable cost(s) is a preferred cost of manufacture parameter. A utility cost is a preferred cost of manufacture parameter. A fixed cost is a preferred cost of manufacture. A measure of yield(s) is a preferred cost of manufacture parameter. Labor cost is a preferred cost of manufacture parameter. A systematic yield loss is a preferred cost of manufacture parameter. A random yield loss is a preferred cost of manufacture parameter. Management cost is a preferred cost of manufacture parameter. Each of these parameters can be used to help improve the cost manufacture determination. A method of finishing of a semiconductor wafer surface being finished wherein a mathematical formula is used to calculate in situ at least one improved process control parameter value based at least in part upon at least one cost of manufacture parameter selected from the group consisting of parametric yield, equipment yield, defect density, and finishing rate and then adjusting in situ at least one improved process control parameter is preferred. A method of finishing of a semiconductor wafer surface being finished wherein a mathematical formula is used to calculate in situ at least one improved process control parameter value based at least in part upon at least two cost of manufacture parameters selected from the group consisting of parametric yield, equipment yield, defect density, and finishing rate and then adjusting in situ at least one improved process control parameter is more preferred. A method of finishing of a semiconductor wafer surface being finished wherein a mathematical formula is used to calculate in situ at least one improved process control parameter value based at least in part upon at least three cost of manufacture parameters selected from the group consisting of parametric yield, equipment yield, defect density, and finishing rate and then adjusting in situ at least one improved process control parameter is even more preferred. A method of finishing of a semiconductor wafer surface being finished wherein a mathematical formula is used to calculate in situ at least two improved process control parameter values based at least in part upon at least two cost of manufacture parameters selected from the group consisting of parametric yield, equipment yield, defect density, and finishing rate and then adjusting in situ at least those two improved process control parameters is even more particularly preferred. These preferred cost of manufacture parameters are relatively difficult to improve during in situ processing because of their complexity and because they can have opposite effects on the cost of manufacture and thus a processor is quite effective for these calculations. Preferably, the calculations can be completed at least 4 times during the finishing cycle time and more preferably the calculations can be completed at least 6 times during the finishing cycle time and even more preferably the calculations can be completed at least 10 times during the finishing cycle time and even more particularly preferably the calculations can be completed at least 20 times during the finishing cycle time. Preferably, the calculation to improve finishing using the in situ process information and the tracked information can be completed at least 4 times during the finishing cycle time and more preferably the calculations can be completed at least 6 times during the finishing cycle time and even more preferably the calculations can be completed at least 10 times during the finishing cycle time and even more particularly preferably the calculations can be completed at least 20 times during the finishing cycle time. Preferably, the in situ process control parameter value can be adjusted at least 4 times during the finishing cycle time and more preferably at least 6 times during the finishing cycle time and even more preferably at least 10 times during the finishing cycle time and even more particularly preferably at least 20 times during the finishing cycle time. By repeatedly calculating and adjusting the process control parameter(s) value(s), better process control and improved cost of manufacture can be effected. By repeatedly calculating and adjusting the process control parameter(s) value(s) using in situ process information and tracked information, better process control, improved finishing, and improved cost of manufacture can generally be effected. Generally, a maximum of one hundred calculations and process control parameter adjustments during a finishing cycle time are preferred although more can be used for particularly critical semiconductor wafer finishing. With optimum processors and programs, thousands of determinations can be accomplished in finishing cycle time. A process control parameter which changes the friction during finishing is a preferred process control parameter and a process control parameter which changes the coefficient of friction is a more preferred process control parameter.

A processor can evaluate input signals rapidly with the cost of manufacture parameters with algorithms, look-up tables, fuzzy logic, iterative calculation methods, and/or solving multiple simultaneous equations to develop an improved output control signal from the controller and/or subsystem controller. Systematic computing can be used. Formulas can be used. Formulas based at least in part on historical information can be preferred for some applications. Formulas based at least in part on first principles can be preferred for some applications.

The semiconductor industry is in a relentless journey to increase computing power and decrease costs. Finishing of a semiconductor wafer using in situ calculations of cost of manufacture parameters to improve control finishing parameters can help simultaneously to decrease cost and reduce unwanted defects. Using current cost of manufacture parameters along with a friction sensing method to evaluate and adjust the boundary layer lubrication in a manner that adjustably controls the coefficient of friction in the operative finishing interface can be particularly effective at reducing unwanted surface defects such as microscratches and microchatter. This system is particularly preferred for finishing with fixed abrasive finishing elements. In addition generally helping to improve such parameters as equipment yield, parametric yield, and defect density, the "cuttability" or cut rate of the fixed abrasive finishing element can generally be extended which improves uptime or equipment utilization. The coefficient of friction in the operative finishing interface can change any number of times during a relatively short finishing cycle time making manual calculations ineffective. Further, the semiconductor wafer cost of manufacture parameters are relatively complex to calculate and the finishing process is relatively short thus manual calculations for equipment adjustment and control are even more difficult and ineffective. Rapid, multiple adjustments of process control parameters using process sensors operatively connected to a processor with access to cost of manufacture parameters are particularly preferred for the rapid in situ process control which helps to increase computing power in the finished semiconductor wafer and decrease manufacturing costs. Thus one can more effectively control, preferably in situ, finishing during changes in lubricating aid changes (like composition, concentration, or operating condition changes) and as applied pressure or operative finishing motion changes by using the systems taught herein. Optimizing the cost of manufacture during real time with preferred operative friction sensor(s) information and useful cost of manufacture information such as current cost of manufacture information, preferably derived from individual and/or semiconductor wafer cost tracking information during manufacture, can aid in reducing costs on this relentless journey. Control of the coefficient of friction in the operative finishing interface is particularly useful and effective to help reduce unwanted surface defects, preferably when combined with real time cost of manufacture information, information processing capability, and real time finishing control capability. Tracked information such as cost of manufacture information can generally aid in improved effectiveness of process control and is even more preferred for use during the planarizing and/or finishing cycle time and is even more preferred for use during periods of non-steady state planarizing and/or finishing. Tracked information such as cost of manufacture information can aid in improved effectiveness of in situ control of lubrication in the operative finishing interface.

Cost of manufacture parameters can be helpful in improving yields and reducing costs during planarizing of a semiconductor wafer(s). A recurring cost is a preferred cost of manufacture parameter. A variable cost of manufacture parameter is a preferred cost of manufacture parameter. A variable cost of manufacture parameter is a cost that varies directly with workpiece volume. A recurring cost and a consumable cost are preferred examples of a preferred variable cost of manufacture parameters. A variable cost is generally known to those skilled in the art. A material cost is a preferred recurring cost. A consumable cost is a preferred recurring cost. A maintenance cost is a preferred recurring cost. A labor cost is a preferred recurring cost. A support cost is a preferred recurring cost. A personnel cost is a preferred recurring cost. A support services cost is a preferred recurring cost. Test wafers are a preferred cost of manufacture parameter. A fixed cost is a preferred cost of manufacture parameter. Depreciation is a preferred fixed cost parameter. Qualification cost is a preferred fixed cost parameter. Depreciation is a preferred fixed cost parameter. Installation is a preferred fixed cost parameter. Training is a preferred fixed cost parameter. Floor space is a preferred fixed cost parameter. Utilization is a preferred cost of manufacture parameter. Scheduled maintenance is a preferred utilization cost. Unscheduled maintenance is a preferred utilization cost. Assist time is a preferred utilization cost. Standby time is a preferred utilization cost. Production qualification time is a preferred utilization cost. Scheduled maintenance is a preferred utilization cost. Process engineering time is a preferred utilization cost. Mean time between failure is a preferred cost of manufacture parameter. Mean time to repair is a preferred cost of manufacture parameter. Mean time to test is a preferred cost of manufacture parameter. Change-out cost is a preferred cost of manufacture parameter. The change-out costs for changing from one polishing pad to another is a non-limiting example of a change-out cost. First pass first quality yield is a preferred cost of manufacture parameter. First pass first quality yield of semiconductor wafer batch is a preferred example of a preferred first pass first quality yield. First pass first quality yield die within a semiconductor wafer is a preferred example of a preferred first pass first quality yield. As discussed elsewhere herein, improving the cost of manufacture and yield for planarizing a semiconductor wafer and/or semiconductor die is generally useful and complex. As another instance, changing selected a control parameter(s) can shorten the life of a consumable such as a polishing pad (which raises costs) but can also enhances throughput, reduce needed floor space over time, and improve utilization.

Commercial wafer fabs can produce in a general range of 20,000 to 35,000 semiconductor wafers a month, thus developing with tracked information, generally useful memory-lookup tables, databases, and improving algorithms to improve real time process control to improve yields and lower costs. Solving of simultaneous equations in situ using selected cost of manufacture parameters along with finishing progress information can also be used to improve yields and/or lower costs. Solving of simultaneous equations ex situ using selected cost of manufacture parameters along with finishing progress information can also be used develop memory look-up tables, databases, and/or to improve equations for use in situ (real time) to improve yields and/or lower costs.

Algorithms, memory look-up tables, databases, and methods to solve equations simultaneously are generally known. Statistical methods to monitor manufacturing yields are generally known. FIGS. 6-9 represent some general costs, graphs, and equations for some cost of manufacture parameters for a given set of input data and can generally be modified by those skilled in the art for new, specific manufacturing conditions for specific semiconductor wafers having die. Methods for predictive control are known in the control arts. Methods for adaptive control are known in the control arts. Methods using statistical procedures for non-constant mean variable control are generally known in the control arts. Modeling process methods to aid control are also known. Each of these can be preferred for specific applications. Predictive control, adaptive control, and dynamic process optimization have in used in the control arts. U.S. Pat. No. 5,661,669 to Mozumder, U.S. Pat. No. 5,740,033 to Wassick et al., U.S. Pat. No. 5,774,633 to BaBa et al., U.S. Pat. No. 5,987,398 to Halverson et al., U.S. Pat. No. 6,167,360 to Erickson et al., U.S. Pat. No. 6,249,712 to Boiquaye, and U.S. Pat. No. 6,289,508 to Erickson et al. give general examples process optimization and are included in their entirety for general guidance and appropriate modification by those skilled in the art.

Storing the cost of manufacture parameters related to finishing a semiconductor wafer for future availability is preferred. Storing the cost of manufacture parameters from finishing a semiconductor wafer for future availability is preferred. The stored information can be cost of manufacture parameters, cost of manufacture information, and/or information from which cost of manufacture can be made available such as by recalculation. Storing control parameter information is another preferred type of information to store. Control parameter information is can be used help interpret stored information such as cost of manufacture information. The stored information having tracking code is preferred. Stored information related to a single semiconductor wafer, batch of wafers, group of wafers, a lot of wafers, and/or run of wafers is preferred. Stored information having identification, a code, and/or a tracking code(s) can be related to a single semiconductor wafer, batch of wafers, group of wafers, and/or run of wafers is preferred. Storing the preferred number of the cost of manufacture parameters is preferred. Storing the preferred number of the control parameters is preferred. The stored information can be used to improve finishing of later semiconductor wafers and/or subsequent steps for the same semiconductor wafer.

Preferably, the calculation to improve cost of manufacture using the cost of manufacture parameters can be completed at least 4 times during the planarizing cycle time and more preferably the calculations can be completed at least 6 times during the planarizing cycle time and even more preferably the calculations can be completed at least 10 times during the planarizing cycle time and even more particularly preferably the calculations can be completed at least 20 times during the planarizing cycle time. Preferably, the calculation to improve planarizing using the in situ process information and the tracked information can be completed at least 4 times during the planarizing cycle time and more preferably the calculations can be completed at least 6 times during the planarizing cycle time and even more preferably the calculations can be completed at least 10 times during the planarizing cycle time and even more particularly preferably the calculations can be completed at least 20 times during the planarizing cycle time. Preferably, the in situ process control parameter value can be adjusted at least 4 times during the planarizing cycle time and more preferably at least 6 times during the planarizing cycle time and even more preferably at least 10 times during the planarizing cycle time and even more particularly preferably at least 20 times during the planarizing cycle time. Preferably, the in situ process control parameter value is controlled at least 4 times during the planarizing cycle time and more preferably at least 6 times during the planarizing cycle time and even more preferably at least 10 times during the planarizing cycle time and even more particularly preferably at least 20 times during the planarizing cycle time. Currently, a planarizing cycle time of at most 6 minutes is preferred and of at most 4 minutes is more preferred and of at most 3 minutes is even more preferred and of at most 2 minutes is even more particularly preferred. Generally shorter cycle times are preferred because this generally increases throughput and reduces costs. Currently, a planarizing cycle time of at least one half minute is preferred. Planarizing cycle time is a preferred cost of manufacture parameter for optimization. By repeatedly calculating and adjusting the process control parameter(s) value(s), better process control and improved cost of manufacture can be effected. By repeatedly calculating and adjusting the process control parameter(s) value(s) using in situ process information and tracked information, better process control, improved refining, and improved cost of manufacture can generally be effected. Generally, a maximum of one hundred calculations and process control parameter adjustments during a planarizing cycle time are preferred although more can be used for particularly critical semiconductor wafer refining. A process control parameter which changes the friction during planarizing is a preferred process control parameter and a process control parameter which changes the coefficient of friction is a more preferred process control parameter.

In process costs tracked with an activity based cost model can be preferred. Activity based cost can measure a cost (or costs) by following activities along with their associated costs (resources used) during manufacture. Activity costs comprise resource related costs including labor, material, consumable, and equipment related activities which consume the costs. As a nonlimiting example, a resource can be refining equipment useful for planarizing, polishing, and buffing activities. The refining equipment cost can be related to the cost drivers of planarizing, polishing, and buffing activities by an output quantity (for example hours) consumed in each of planarizing, polishing, and buffing by cost driver per unit cost rate (for instance, $/hour of refining equipment used). In a similar manner, labor costs, material costs, and consumable costs can be assigned to activities using an appropriate cost driver(s) and output quantities. The activity costs can then be further related to the style, type, or intermediate stage of manufacture of a workpiece. Different types and/or different stages of manufacture of a semiconductor wafer use different amounts of different cost drivers (such as differences in planarizing, polishing, and buffing drivers). An activity based cost model having a multiple of different level of activity costs and a multiple of different cost drivers in each of the multiple of different levels of activity costs is preferred for semiconductor wafer refining process control. An activity cost is a preferred cost of manufacture parameter for process control. An activity cost and/or cost driver which is a mathematical composite derived from refining a multiplicity of workpieces are preferred. A mode, median or mean value of an activity cost and/or cost driver is a preferred example of a mathematical composite derived from refining a multiplicity of workpieces (or more preferably, workpiece batches). A multi-point moving mathematical composite (for instance a five point or ten point moving average) is a preferred example mathematical composite derived from refining a multiplicity of workpieces (or more preferably, workpiece batches). A preferred mathematical composite is derived, at least in part, mathematical expressions. Using a mathematical composite can facilitate process control using statistical methods to reduce short term noise which can adversely affect process control. An activity cost of the incremental costs associated with the specific step for instance, ILD planarizing is a preferred activity cost for process control. An activity cost of the cumulative costs associated up to and/or up to and including the specific step for instance, ILD planarizing is a preferred activity cost for process control. Each can give useful information for controlling the process control parameters. A multistage activity cost model is preferred for refining control during semiconductor wafer manufacture. An activity cost model based at least in part on the manufacturing sequential process activities is very preferred because this can aid in further evaluating the change(s) to a process control parameter when evaluating an activity based cost of manufacture parameter. Historical information including activity cost information is preferred stored in look-up tables. Cost drivers, activity functions, activity costs, and different activity cost models represent nonlimiting preferred historical information relating to activity costs for storing in a look-up table. An activity cost model based at least in part on the manufacturing process activities occurring chronologically in time is very preferred because this facilitates time sensitive process control with chronological activity costs. An activity cost model based at least in part on the manufacturing process activities occurring chronologically in time and further having a yield model is very preferred because this facilitates time sensitive process control with chronological activity costs including considerations of product yields.

Storing historical information including at least one cost of manufacture parameter in at least one lookup-table is preferred and storing historical information including at least two cost of manufacture parameters in at least one lookup-table is more preferred and storing historical information including at least five cost of manufacture parameters in at least one lookup-table is even more preferred and storing historical information including at least a majority of cost of manufacture parameters in at least one lookup-table is even more particularly preferred. Storing historical information including at least one process control parameter in at least one lookup-table is preferred and storing historical information including at least three process control parameters in at least one lookup-table is more preferred and storing historical information including at least five process control parameters in at least one lookup-table is even more preferred and storing historical information including a majority of the process control parameters in at least one lookup-table is even more particularly preferred. Historical information stored with tracking information related to individual workpieces is preferred and historical information stored with tracking information related to semiconductor wafer batches can also be preferred. Data mining can be accomplished on information used previously for process control. This reduces the cost of creating a new table or database for data mining. Further, the data mining results can be more readily applied to new, advanced process control algorithms. A cost of manufacture forecasting model can be accomplished on information used previously for process control. By having the cost of manufacture parameters stored in this manner, an improved cost of manufacture forecasting model can be developed and implemented. The new cost of manufacture models can be used when transitioning from a ramp-up phase of development to a commercial phase of development. Modified and/or new process control algorithms can be determined and/or developed by evaluating ramp-up historical information including process control parameters and cost of manufacture parameters and then applying the new process control algorithm for commercial manufacture. Modified and/or new process control algorithms can be determined and/or developed by evaluating previous historical information including process control parameters and cost of manufacture parameters and then applying the new process control algorithm for future commercial manufacture. Thus the historical information which is stored in a look-table is preferably used for a plurality of purposes to reduce the cost of manufacture and/or improved the enterprise profitability. By using the historical information used for initial process control multiple times, additional costs to collect information for data mining, cost of manufacture modeling, and process control algorithm improvement is accomplished in a new, more effective manner to give a new lower cost result.

FIGS. 10-11 illustrate some preferred embodiments of methods to planarize workpieces. FIG. 12 illustrate a preferred embodiment of method to polish workpieces.

Use of Information for Feedback, Feedforward, and Controller

Controllers to control the finishing of workpieces are generally known in the art. Controllers generally use information at least partially derived from the processor to make changes to the process control parameters. A processor is preferably operatively connected to a sensor to gain current information about the process and the processor is also operatively connected to a controller which preferably controls the finishing control parameters. As used herein, a control subsystem is a combination of an operative sensor operatively connected to a processor which is operatively connected to a controller which in turn can change finishing control parameters. Preferably, the control subsystem has real time access to tracked information on the workpiece being finished to improve control of finishing control parameters in real time (in situ) during the finishing cycle time (or a portion of the finishing cycle time).

An advantage of this invention is the additional degree of control it gives to the operator performing planarization and/ or polishing. To better utilize this control, the use of feedback information to control the finishing control parameters is preferred and in situ control is more preferred. Controlling the finishing control parameters selected from the group consisting of alternate finishing composition feed rates, alternate finishing composition concentration, operative finishing motion, and operative finishing pressure is preferred to improve control of the finishing of the workpiece surface being finished and in situ control is more particularly preferred. Another preferred example of a finishing control parameter is to use a different finishing element for a different portion of the finishing cycle time such as one finishing element for the planarizing cycle time and a different finishing element for the polishing cycle time. Workpiece film thickness, measuring apparatus, and control methods are preferred methods of control. Mathematical equations including those developed based on process results can be used. Finishing uniformity parameters selected from the group consisting of Total Thickness Variation (TTV), Focal plane deviation (FPD), Within-Wafer Non-Uniformity (WIW NU), and surface quality are preferred. Average cut rate is a preferred finishing rate control parameter. Average finishing rate is a preferred finishing rate control parameter. A preferred average cut rate can be the average cut rate across the surface of a semiconductor wafer at a particular time. A preferred average cut rate can be the average cut rate across the uniform region of the surface of a semiconductor wafer at a particular time (for example a uniform compositional region). Controlling finishing for at least a portion of the finishing cycle time with a finishing sensor subsystem to adjust in situ at least one finishing control parameter that affects finishing results is a preferred method of control finishing. Information feedback subsystems are generally known to those skilled in the art. Illustrative non limiting examples of wafer process control methods include U.S. Pat. No. 5,483,129 to Sandhu issued in 1996, U.S. Pat. No. 5,483,568 to Yano issued in 1996, U.S. Pat. No. 5,627,123 to Mogi issued in 1997, U.S. Pat. No. 5,653,622 to Drill issued in 1997, U.S. Pat. No. 5,657,123 to Mogi issued in 1997, U.S. Pat. No. 5,667,629 to Pan issued in 1997, and U.S. Pat. No. 5,695,601 to Kodera issued in 1997 and are included herein by reference in their entirety for guidance and modification by those skilled in the art and are included herein by reference in their entirety.

Using an aqueous lubricating composition having at least one boundary lubricant to form a partial lubricating boundary layer between two surfaces when the surfaces are in operative friction contact is preferred. Lubricating boundary layers can be controlled by changing the boundary layer control parameters. A preferred group of aqueous lubricating composition control parameters consists of parameters selected from the group consisting of operative finishing motion, aqueous lubricating composition, aqueous lubricating composition feed rate, and temperature. Another preferred group of operative finishing motions consists of motions selected from the group consisting of continuous motion, discontinuous motion, pressure, and velocity of the motion. A preferred group of operative finishing motions consists of motions selected from the group consisting of continuous motion, intermittent motion, and velocity of the motion. Vibrating motion, linear motion, and circular motion are preferred motions for changing or controlling the lubricating boundary layer performance. Changing the pressure at the operative finishing interface can change the organic boundary layer lubricating performance and this is a preferred control parameter as discussed herein above. Changing the motion for example, with the speed or type of motion can change the organic boundary layer lubricating performance. Changing the feed rate of the organic boundary layer lubricant can change the performance. Changing the pressure applied in the operative finishing interface, either total pressure or regional pressure, can change the lubricating boundary layer performance. Changing the temperature in the operative finishing interface, either average or regional temperatures, can change the lubricating boundary layer performance. Changing the chemistry of the aqueous lubricating composition can change the performance. Changing the pressure at the operative finishing interface can change the performance. The above parameters are preferred aqueous lubricating composition control parameters and can be used to effect changes in the finishing of the workpiece surface being finished. Changing an aqueous lubricating composition control parameter to change the effective coefficient of friction at the operative finishing interface is preferred and changing an aqueous lubricating composition control parameter to change the effective coefficient of friction at a region in the operative finishing interface is more preferred and changing an aqueous lubricating composition control parameter to change the effective coefficient of friction in at least in two regions of the operative finishing interface is even more preferred. Changing a control parameter to change the tangential force of friction at the operative finishing interface is preferred and changing a control parameter to change the tangential force of friction at a region in the operative finishing interface is more preferred and changing a control parameter to change the tangential force of friction in at least two regions of the operative finishing interface is even more preferred. Changing the organic boundary lubricating layer control parameters at least once during the finishing cycle time is preferred and changing the organic boundary lubricating layer control parameters at least four times during the finishing cycle time is more preferred. Changing the organic boundary lubricating layer control parameters in situ is preferred and changing the organic boundary lubricating layer control parameters in situ with a subsystem controller is more preferred and changing the organic boundary lubricating layer composition control parameters in situ with a controller based on a secondary friction sensor signal is even more preferred. Changing at least one control parameter in situ is preferred and changing at least one control parameter in situ with a subsystem controller is more preferred and changing at least one control parameter in situ with a controller based on a secondary friction sensor signal is even more preferred. Controlling at least one control parameter in situ is preferred and controlling at least one control parameter in situ with a subsystem controller is more preferred and controlling at least one control parameter in situ with a controller based on a secondary friction sensor signal is even more preferred.

Applying higher pressure in the unwanted raised region on the semiconductor wafer surface compared to pressure applied to the region below the unwanted raised region causing the boundary layer lubrication to be less on the unwanted raised region and the boundary layer lubrication to be greater on at least a portion of the semiconductor wafer surface below the raised region is a preferred method for differential finishing rates. Applying higher pressure in the unwanted raised region on the semiconductor wafer surface compared to pressure applied to the region below the unwanted raised region causes the boundary layer lubrication to be less on the unwanted raised region and the temperature to be higher on the unwanted raised region and the boundary lubrication to be greater on at least portion of the semiconductor wafer surface below the raised region and the temperature to be lower on the surface below the raised region and is a more preferred method for differential finishing rates.

Supplying an aqueous lubricating composition to the workpiece surface being finished which changes the rate of a chemical reaction is preferred. Supplying an aqueous lubricating composition having a property selected from the group consisting of a change in workpiece surface effective coefficient of friction, workpiece average finish rate change, a heterogeneous workpiece surface having a different ratio of the effective coefficient of frictions for different regions, and a heterogeneous workpiece surface having different finishing rate changes for different regions which reduces unwanted damage to the workpiece surface is particularly preferred.

Feedback information selected from the group consisting of finishing rate information and product quality information such as surface quality information is preferred. Non-limiting preferred examples of process rate information include polishing rate, planarizing rate, and workpiece finished per unit of time. Non-limiting preferred examples of quality information include first pass first quality yields, focal plane deviation, total thickness variation, measures of non uniformity. Non-limiting examples particularly preferred for electronics parts include Total Thickness Variation (TTV), Focal plane deviation (FPD), Within-Wafer Non-Uniformity (WIW NU), and surface quality. Cost of manufacture information is also preferred information for control. Cost of manufacture information comprises preferred information for tracking. Finishing uniformity parameters selected from the group consisting of Total Thickness Variation (TTV), Focal plane deviation (FPD), Within-Wafer Non-Uniformity (WIW NU), and surface quality can be information for tracking. Total Thickness Variation (TTV), Focal plane deviation (FPD), Within-Wafer Non-Uniformity (WIW NU), and surface quality are illustrative preferred data types for tracking, particularly for multi-level semiconductor wafers where one levels data can be helpful for in situ control while finishing a different level. Types of cost of manufacture information can be preferred data types. Semiconductor wafer film or layer thickness is another illustrative example of data type of tracked information for in situ control since this can also help optimizing the in situ adjustment of finishing control parameters which change the local and/or macro coefficient of friction can generally aid finishing control.

A control subsystem which uses a processor which uses at least in part a mathematical equation to aid control is preferred. A mathematical equation and/or formula developed from laboratory experience, semiworks experience, test wafer experience, and/or actual production can be preferred. Curve fitting to determine mathematical equations based on laboratory experience, semiworks experience, test wafer experience, and/or actual production are generally known to those skilled in the semiconductor arts. Mathematical equations can be used also generally for interpolation and extrapolation. Multiple mathematical equations with multiple unknowns can be solved or resolved in real time for improved process control with a processor. Differential information from multiple workpiece sensors and/or friction sensors can generally be used to improve real time (in situ) control with a processor. A lubrication control subsystem, a friction sensor subsystem, a finishing control subsystem, and a control subsystem can generally use mathematical equations to aid control. A friction sensor subsystem having at least one friction sensors is preferred and having at least two friction sensors is more preferred. A friction sensor subsystem having at least one friction sensor probe is preferred and having at least two friction sensor probes is more preferred.

A model to aid process control can be preferred which uses cost of manufacture parameters for process control. A process model is a preferred example of a model, which can be used in some embodiments for a process control and a process model which includes differential lubrication is a more preferred example of a model, each of which can be used in some embodiments for process control. A cost model is a preferred example of a model which can be used in some embodiments for a process control. A business model which determines profit using costs and revenue is a preferred example of a model which can be used in some embodiments for a process control. A business model having costs and revenue is a preferred example of a model which can be used in some embodiments for a process control. A business model using activity based accounting having costs and revenue is a preferred example of a model which can be used in some embodiments for a process control. A business model using activity based accounting which determines profit using costs and revenue is a preferred example of a model which can be used in some embodiments for a process control. A business model having access to a cost model and a sales model is a preferred example of a model which can be used in some embodiments for a process control. A business model having access to at least one cost of manufacture parameter, a cost model, and a sales model is a preferred example of a model which can be used in some embodiments for a process control. A business model having access to at least three cost of manufacture parameters, a cost model, and a sales model is a more preferred example of a model which can be used in some embodiments for a process control. A cost model using activity accounting is a preferred example of a model which can be used in some embodiments for process control. An activity based cost model is a preferred example of a model which can be used in some embodiments for a process control. A cost of manufacture model is a preferred example of a cost model which can be used in some embodiments for a process control. A cost of manufacture model using activity accounting is a preferred example of a cost model, which can be used in some embodiments for a process control. An activity based cost of manufacture model is a preferred example of a cost model which can be used in some embodiments for a process control. A sales model is a preferred example of a cost model which can be used in some embodiments for a process control. An activity based cost of sales model is a preferred example of a cost model which can be used in some embodiments for process control. An activity based cost of sales model which assigns activity costs by customer is a more preferred example of a cost model which can be used in some embodiments for process control. An activity based cost of sales model which assigns activity costs by customer and order is an even more preferred example of a cost model which can be used in some embodiments for process control. An empirically-based model can be preferred. An empirically-based model developed at least in part on stored historical performance is preferred. Process models are generally known to those skilled in the semiconductor wafer manufacturing arts. Determining a change for at least one process control parameter using at least one model disclosed herein for changing and/or controlling the method of making a workpiece is preferred. Cost models can, given the guidance and teachings herein, cost models can generally be developed by those generally skilled in the art and used for process control as used herein. Business models can, given the guidance and teachings herein, cost models can generally be developed by those generally skilled in the art and used for process control as used herein. Methods to compute cost of manufacture parameter(s) and/or activity based cost(s) with cost of manufacture information are generally well known. Methods to calculate cost of manufacture parameter(s) and/or activity based cost(s) with cost of manufacture information are generally well known. Methods to determine cost of manufacture parameter(s) and/or activity based cost(s) with cost of manufacture information are generally well known. Additional general helpful guidance on business, cost, and profit models along with generally useful calculations, mathematical algorithms, formulas, and other useful computing methods can be found in the books *Principles of Corporate Finance* by Richard A. Bealey and Stewart C. Myers, McGraw-Hill Companies, 1996, *Activity-based Cost Management Making* Work by Gary Cokins, McGraw-Hill Companies, 1996 and *Pricing for Profitability* by John L. Daly, John Wiley & Sons, Inc., 2002 and are included herein in their entirety for general guidance and modification by those skilled in the arts.

An empirically-based process model can be preferred. An empirically based process model developed at least in part on historical performance is preferred. A mathematical equation and/or formula developed from laboratory experience, semiworks experience, test wafer experience, and/or actual production can be preferred. Curve fitting to determine a mathematical equation and/or formula based on laboratory experience, semiworks experience, test wafer experience, and/or actual production is generally known to those skilled in the semiconductor arts. Curve fitting to determine mathematical formulas using historical performance can be preferred. Mathematical equations generally can be used also for interpolation and extrapolation. Multiple mathematical equations with multiple unknowns can be solved or resolved in real time for improved process control with a processor. A first principles-based process model can also be used for control. Using at least in part a first principles process model and at least in part an empirically based process model can be preferred for process control. A yield model can also be preferred for process control. A yield model based at least in part on historical performance is currently preferred. A recipe for finishing a semiconductor wafer can also be used. A recipes can be developed and/or modified based on historical performance. Multiple recipes stored in the look-up tables is preferred. A process model, more preferably multiple process models can be stored in the look-up tables. A processor having access to the look-up tables is preferred. A control subsystem having access to least one process model is preferred and access to at least two process models is more preferred and access to at least three process models is even more preferred. Yield models are generally known to those skilled in the semiconductor wafer manufacturing arts. Process models are generally known to those skilled in the semiconductor wafer manufacturing arts.

Connecting this process control technology, especially non-steady state process to control, in a networking fashion to other equipment in a factory can be preferred. Information on layer thickness, processing times, uniformity, and the like can be shared between equipment to further change and/or improve cost of manufacture. Connecting this process control technology, especially non-steady state process to control, in a networking fashion to other equipment in a factory can be preferred. Information on layer thickness, processing times, uniformity, and the like can be shared between equipment to further change and/or improve business performance and/or profits. For instance, if the layer added is thicker or thinner than target processing conditions for that station, the next station of finishing can be adjusted accordingly to change the finishing recipe and/or conditions. For instance, if the layer is too thick, the next station (if removing material) can be adjusted to remove material more aggressively or for a longer processing period. An apparatus for finishing connected to a multiplicity of other workpiece fabrication machinery, and information derived therefrom in an operative computerized network, the control subsystem having access to at least a portion of the other workpiece fabrication machinery, metrology equipment, and information derived therefrom is preferred. An apparatus for finishing connected to a multiplicity of other workpiece fabrication machinery, and information derived therefrom in an operative computerized network, the control subsystem having access to the other workpiece fabrication machinery, metrology equipment, and information derived therefrom for feedforward and feedback control while applying the finishing energy to the workpiece is also preferred. A process model is preferred for improved process control. A cost of manufacture model is preferred for improved process cost awareness and control thereof. An activity based cost of manufacture model is more preferred for improved process cost awareness and control thereof.

Storing information for later use including information selected from the group consisting of a sales cost, revenue, a customer, customer order, and a model along with a cost of manufacture parameter in a processor readable memory device is preferred. Storing information including information selected from the group consisting of a sales cost, a revenue, a customer, customer order, and a model along with a cost of manufacture parameter and a workpiece tracking code in a processor readable memory device for later use is preferred. Storing information for later use including information selected from the group consisting of a sales cost, a revenue, a customer, customer order, and a model along with cost of manufacture information including at least a cost of manufacture parameter in a processor readable memory device is preferred. Storing information for later use including information selected from the group consisting of a sales cost, a revenue, a customer, customer order, and a model along with cost of manufacture information including at least a cost of manufacture parameter and a workpiece tracking code in a processor readable memory device is preferred. Storing information for later use including information selected from the group consisting of a sales cost, a revenue, a customer, customer order, and a model along with cost of manufacture information including at least a cost of manufacture parameter and a workpiece tracked information in a processor readable memory device is preferred. Storing information for later use including information selected from the group consisting of a sales cost, a revenue, a customer, customer order, and a model along with cost of manufacture information including at least three cost of manufacture parameters and workpiece tracking code in a processor readable memory device is preferred. Storing information for later use including information selected from the group consisting of a sales cost, a revenue, a customer, customer order, and a model along with cost of manufacture information including at least three cost of manufacture parameters and workpiece tracked information in a processor readable memory device is preferred. Determining a change for at least one model with the stored information is preferred. Determining a change for a process model with the stored information is preferred and for at least two process models is more preferred and for at least three process models is even more preferred. Determining a change for at least one cost model with the stored information is preferred and for at least two cost models is more preferred and for at least three cost models is even more preferred. Determining a change for a cost of manufacture model with the stored information is preferred and for at least two cost of manufacture models is more preferred and for at least three cost of manufacture models is even more preferred. Determining for a change a business model with the stored information is preferred and for at least two business models is more preferred and for at three business models is even more preferred. Changing a model after determining a change is preferred and changing a model at two separate times is more preferred and changing a model at three separate times is even more preferred. Using the changed model for feedforward control is preferred. Using the changed model for feedback control is preferred. Using the changed model for real time control is more preferred. Determining a change for a process control parameter with the stored information is preferred. Changing a process control parameter after determining a change is preferred.

Reducing the processor readable storage space used for the stored information is preferred. Reducing the computer readable storage space used for the stored information is preferred. Reducing the stored information using a computer algorithm is preferred. Reducing the stored information using a computer algorithm is preferred. Reducing the stored information using at least one mathematical algorithm is preferred. By reducing the stored information, the costs can be reduced. Determining a change for a model with the reduced stored information is preferred. Determining a change for a process model with the reduced stored information is preferred. Determining a change for a cost model with the reduced stored information is preferred. Determining a change for a cost of manufacture model with the reduced stored information is preferred. Determining for a change a business model with the reduced stored information is preferred. Changing a model after determining a change is preferred. Using the changed model for feedforward control is preferred. The storage space is preferably processor readable. The storage space is preferably computer readable. Using the changed model for feedback control is preferred. Using the changed model for real time control is more preferred. Determining a change for a process control parameter with the reduced stored information is preferred. Changing a process control parameter after determining a change is preferred. A run to run, batch to batch, and in situ process control method having the features and benefits of the preferred embodiment of this invention are new and useful. The feedforward and feedback process control method having features and benefits of the preferred embodiments of this invention are new and useful. The networking of process equipment and methods of control have features and benefits of the preferred embodiments of this invention are new and useful.

An operative control subsystem can improve refining control and versatility of refining using cost of manufacture parameters, cost models, and/or business models in a new and unexpected manner giving new, unexpected results.

Further Comments on Method of Operation

Some particularly preferred embodiments directed at the method of planarizing and/or finishing are now discussed.

Controlling the thickness of a lubricating film by changing at least one lubrication control parameter in a manner that changes the coefficient of friction in at least two different regions in the operative finishing interface in response to an in situ control signal is preferred. Controlling the thickness of the lubricating film by changing at least two process control parameters in situ based on feed back information from a lubrication control subsystem having a friction sensor is also preferred. Controlling at least once the thickness of the lubricating film which changes the coefficient of friction in the operative finishing interface by changing at least one process control parameter in situ based on feed back information from a control subsystem during the finishing cycle time is preferred. A semiconductor wafer surface having at least a first region wherein the lubricating film is at most one half the molecular layer thickness compared to the lubricating film thickness on a second, different region is preferred and a semiconductor wafer surface having at least a first region wherein the lubricating film thickness is at most one third the molecular layer thickness compared to the lubricating film on a second, different region is more preferred when controlling the coefficient of friction, particularly when controlling the changes in the coefficient of friction.

A preferred control subsystem has access to cost of manufacture parameters, preferably useful cost of manufacture parameters, and even more preferably trackable and useful cost of manufacture parameters. A preferred example of generally useful cost of manufacture information is current cost of manufacture information which has been tracked and more preferably updated using generally known activity based accounting techniques. Another preferred example of useful cost of manufacture parameters is the cost of manufacture of manufacturing steps which preceded the current finishing step such as prior finishing steps, metallization steps, or interlayer dielectric steps. Another preferred example of useful cost of manufacture parameters is the cost of manufacturing steps which occur after the current finishing step such as later finishing steps, metallization steps, or interlayer dielectric steps. The current finishing step can affect the cost of manufacture of a later step because some defects such as generally poor planarity can adversely impact latter manufacturing step costs such as by negativity impacting latter step yields. A finishing control subsystem and/or a friction sensor subsystem having access to cost of manufacture parameters is preferred and having access to current cost of manufacture parameters is more preferred and having trackable information is even more preferred.

Evaluating finishing control parameters in situ for improved adjustment using finishing control is preferred and using the finishing control parameters in situ at least in part for this improved adjustment of finishing control is more preferred. Evaluating finishing control parameters in situ with tracked information for improved adjustment of finishing control is preferred and using the finishing control parameters in situ at least in part for this improved adjustment of finishing control is more preferred. Cost of manufacture information is an example of preferred tracked information. Prior steps such as metallizing steps, annealing steps, insulating layers steps represent non-limiting examples of preferred tracked information. Prior steps can impact the preferred in situ control of finishing control parameters such as, but not limited to, lubricating changes to the operative finishing interface, preferred pressures, and preferred coefficient of friction (either regional or across the operative finishing interface). For instance, if the metal layer has larger crystals due to the type of annealing which are subject to "pickout defects", lower a lower coefficient of friction in the conductive region (such as copper or copper alloy) can be preferred. In another application, the semiconductor can have multiple layers of porous low-k insulating layers which have lower tensile strengths and can form unwanted defects if subjected to high forces of friction during finishing. Changing the lubricating, downward pressure, and/or tangential friction of the operative finishing interface can reduce unwanted damage to the porous low-k layers. In another application, the interface between a conductive layer and a nonconductive layer can be of lower strength and thus again high forces of friction and/or applying unnecessary stress on the semiconductor wafer surface during planarizing can form unwanted defects which can cause unwanted yield losses during manufacture. Changing the finishing control parameters to reduce the coefficient of friction and/or reducing the unnecessary stresses in situ can aid in reducing unwanted yield losses. Thus tracked information can be used in situ to improve process control during finishing with a finishing control subsystem. Providing a finishing control subsystem having at least two operative process sensors for sensing in situ process information and having access to the tracking information is preferred and providing a finishing control subsystem having at least three operative process sensors for sensing in situ process information and having access to the tracking information is more preferred and providing a finishing control subsystem having at least five operative process sensors for sensing in situ process information and having access to the tracking information is even more preferred. Changing a control parameter in response to the in situ process information and tracking information which changes the coefficient of friction and/or stresses during at least a portion of the planarizing cycle time is preferred and which changes the coefficient of friction and/tangential force of friction in a uniform region of the workpiece surface is more preferred and which changes the coefficient of friction and/tangential force of friction in a plurality uniform regions of the workpiece surface is even more preferred.

A method which updates the cost of manufacture control parameters, look-up tables, algorithms, or control logic consistent with the current manufacturing step is preferred. A method which updates the tracked information such as the cost of manufacture control parameters, look-up tables, algorithms, or control logic consistent with the current manufacturing step while evaluating prior manufacturing steps (such as completed manufacturing steps) is more preferred. A method which updates with tracked information such as the cost of manufacture control parameters, look-up tables, algorithms, or control logic consistent with the current manufacturing step while evaluating future manufacturing steps is even more preferred. A method which updates with tracked and/or trackable information (such as projectable information) such as the cost of manufacture control parameters, look-up tables, algorithms, or control logic consistent with the current manufacturing step while evaluating both prior and future manufacturing steps is even more preferred. Memory look-up tables and databases can have preferred data types. A tracking code is a preferred method to aid evaluation of prior, current, and future manufacture steps. The tracking code can be related to individual semiconductor wafer and/or a semiconductor wafer batch. This can facilitate low cost manufacture and improved in situ control of planarizing. This is preferred for multi-level semiconductor wafer processing because one level finishing can affect the next level finishing. This is because a defect formed on one layer can generally affect (usually adversely) the next level(s). Further, the type and composition of each layer can impact the improved real time control of finishing such as where a particular layer has a reduced strength due to porosity.

An operative process sensor is preferred and at least two operative process sensors is more preferred and at least three operative sensors is even more preferred and at least five operative sensors is even more particularly preferred. Evaluating the in situ process information obtained from at least two operative sensors is a preferred and evaluating the in situ process information obtained from at least three of the operative sensors is more preferred and evaluating the in situ process information obtained from at least four of the operative sensors is even more preferred and evaluating the in situ process information obtained from at least five of the operative sensors is even more particularly preferred. By having multiple operative sensor information compared, preferably with mathematical expressions, algorithms, memory look-up tables and/or with data bases, differential localized lubrication such as on uniform regions in the operative finishing and/or planarizing interface can better be detected, quantified, and controlled by controlling the planarizing control parameters in real time. By having multiple operative sensor information compared, preferably with mathematical expressions, algorithms, memory look-up tables and/or with data bases, differential localized lubrication such as on uniform regions in the operative finishing and/or planarizing interface can better be detected, quantified, and controlled by controlling the planarizing control parameters in real time during a period of non-steady state planarizing. Preferred control of the finishing and/or planarizing control parameters by evaluating process information with cost of manufacture parameters can increase manufacturing yields and reduce cost.

Applying a planarizing energy to the semiconductor wafer surface is preferred and applying an effective amount of planarizing energy to the semiconductor wafer surface is more preferred. The planarizing energy supplies the energy such as chemical reactions, tribochemical reactions and/or abrasive wear energy for planarizing in some preferred applications. Applying a plurality of planarizing energies to the semiconductor wafer surface is preferred and applying an effective amount of a plurality of planarizing energies to the semiconductor wafer surface is more preferred. Applying the planarizing energy continuously over at least a portion of the planarizing cycle time is preferred for some applications. Applying the planarizing energy in discontinuously over at least a portion of the planarizing cycle time is preferred for some applications. Applying the planarizing energy intermittently over at least a portion of the planarizing cycle time is preferred for some applications.

Supplying a planarizing aid to the workpiece surface being finished which changes the rate of a chemical reaction (planarizing chemical energy) is preferred. Supplying a planarizing aid to the workpiece surface being finished which changes a coefficient of friction (planarizing frictional energy) is preferred. Supplying and controlling a planarizing aid to the workpiece surface being finished having a property selected from the group consisting of changing the workpiece surface coefficient of friction, changing workpiece surface average cut rate, and changing the cut rate of a specific material of the workpiece surface being finished is particularly preferred.

Using the method of this invention to finish a workpiece, especially a semiconductor wafer, by controlling finishing for a period of time with an operative process sensor subsystem to adjust in situ at least one finishing control parameter that affects finishing selected from the group consisting of the finishing rate and the finishing uniformity is preferred. When planarizing is accomplished by removing material, material removal rates can be preferred. A preferred method to measure finishing rate is to measure the change in the amount of material removed in angstroms per unit time in minutes (.ANG./min). Guidance on the measurement and calculation for polishing rate for semiconductor parts is found in U.S. Pat. No. 5,695,601 to Kodera et al. issued in 1997 and which are included herein in entirety for illustrative guidance. Methods to measure and monitor finishing rate in angstroms per minute is generally known to those skilled in the relevant art.

An average processing and/or planarizing rate range is preferred, particularly for workpieces requiring very high precision planarizing such as in process electronic wafers where material is removed. Average cut rate is used as a preferred metric to describe preferred planarizing rates. Average cut rate is metric and is generally known to those skilled in the art. For electronic workpieces, such as wafers, a cut rate of from 100 to 25,000 Angstroms per minute on at least a portion of the workpiece is preferred and a cut rate of from 200 to 15,000 Angstroms per minute on at least a portion of the workpiece is more preferred and a cut rate of from 500 to 10,000 Angstroms per minute on at least a portion of the workpiece is even more preferred and a cut rate of from 500 to 7,000 Angstroms per minute on at least a portion of the workpiece is even more particularly preferred and a cut rate of from 1,000 to 5,000 Angstroms per minute on at least a portion of the workpiece is most preferred. A finishing rate of at least 100 Angstroms per minute for at least one of the regions on the surface of the workpiece being finished is preferred and a finishing rate of at least 200 Angstroms per minute for at least one of the materials on the surface of the workpiece being finished is preferred and a finishing rate of at least 500 Angstroms per minute for at least one of the regions on the surface of the workpiece being finished is more preferred and a finishing rate of at least 1000 Angstroms per minute for at least one of the regions on the surface of the workpiece being finished is even more preferred where significant removal of a surface region is desired. During finishing there are often regions where the operator desires that the finishing stop when the target is reached such when removing a conductive region (such as a metallic region) over a non conductive region (such as a silicon dioxide region). For regions where it is desirable to stop finishing (such as the silicon dioxide region example above), a finishing rate of at most 1000 Angstroms per minute for at least one of the regions on the surface of the workpiece being finished is preferred and a finishing rate of at most 500 Angstroms per minute for at least one of the materials on the surface of the workpiece being finished is preferred and a finishing rate of at most 200 Angstroms per minute for at least one of the regions on the surface of the workpiece being finished is more preferred and a finishing rate of at most 100 Angstroms per minute for at least one of the regions on the surface of the workpiece being finished is even more preferred. When a low cut rate is desired (for example final finishing, polishing or buffing), a finishing cut rate of at most 10 Angstroms per minute is preferred. The finishing rate can be controlled with organic boundary lubricants and with the process control parameters discussed herein.

Using finishing of this invention to remove raised surface perturbations and/or surface imperfections on the workpiece surface is preferred. Using the method of this invention to finish a workpiece, especially a semiconductor wafer, at a planarizing rate and/or planarizing uniformity according to a controllable set of finishing control parameters that upon variation change the planarizing rate and/or planarizing uniformity and wherein the finishing parameters consist of at least two finishing control parameters is more preferred. Using embodiment to polish a workpiece, especially a semiconductor wafer, wherein a control subsystem changes an operative planarizing composition feed mechanism in situ is preferred.

Common semiconductor wafer planarizing can involve the removal of one layer comprised predominantly of a conductive material such as copper during planarizing in order to change to a predominantly non-conductive material. Changes in friction measured by the friction sensor probes, with or without the addition of lubricant, along with knowledge of planarizing performance as a function of this measure of friction, and particularly when integrated with a workpiece sensor, can deliver good planarizing control and ability to stop planarizing when desired. End points can be detected by detecting a changed level of friction at the operative planarizing interface by using the friction sensor probes to detect and develop information to correct in real time to changing planarizing control parameters including, but not limited to, changes in lubrication and changes in planarizing element planarizing surface changes with time.

A preferred embodiment is directed to a method of finishing a workpiece having a workpiece surface, the method comprising providing an operative sensor, a controller, and a processor; applying an operative finishing motion for removing material from the workpiece surface; sensing a progress of finishing information with the operative sensor during at least a portion of a finishing cycle time; evaluating the finishing control parameters for improved adjustment using (i) the processor, (ii) a current cost of manufacture information, (iii) a cost of manufacture model, (iv) a process model, (v) a maintenance information, (vi) an uptime information, and (vii) the progress of finishing information during at least the portion of the finishing cycle time; and changing the at least one finishing control parameter which changes the finishing during at least the portion of the finishing cycle time.

A preferred embodiment is directed to a method of finishing a workpiece having a workpiece surface, the method comprising providing an operative sensor, a controller, and a processor; applying an operative finishing motion for removing material from the workpiece surface; sensing a progress of finishing information with the operative sensor during at least a portion of a finishing cycle time; evaluating the finishing control parameters for improved adjustment using (i) the processor, (ii) a current cost of manufacture information, (iii) a cost of manufacture model, (iv) a process model, (v) an equipment utilization, and (vi) the progress of finishing information during at least the portion of the finishing cycle time; and changing the at least one finishing control parameter which changes the finishing during at least the portion of the finishing cycle time.

A preferred embodiment is directed to a method of finishing a workpiece having a workpiece surface, the method comprising providing an operative sensor, a controller, and a processor; applying an operative finishing motion for removing material from the workpiece surface; sensing a progress of finishing information with the operative sensor during at least a portion of a finishing cycle time; evaluating the finishing control parameters for improved adjustment using (i) the processor, (ii) a current cost of manufacture information, (iii) a cost of manufacture model, (iv) a process model, (v) an equipment yield, and (vi) the progress of finishing information during at least the portion of the finishing cycle time; and changing the at least one finishing control parameter which changes the finishing during at least the portion of the finishing cycle time.

A preferred embodiment is directed to a method of finishing a workpiece having a workpiece surface, the method comprising providing an operative sensor, a controller, and a processor; applying an operative finishing motion for removing material from the workpiece surface; sensing a progress of finishing information with the operative sensor during at least a portion of a finishing cycle time; evaluating the finishing control parameters for improved adjustment using (i) the processor, (ii) a current cost of manufacture information, and (iii) the progress of finishing information during at least the portion of the finishing cycle time; and controlling in situ a finishing control parameter to improve the cost of manufacture of the workpiece surface.

A preferred embodiment of this invention is directed to a memory chip manufactured by a method of according to preferred embodiments. A preferred embodiment of this invention is directed to a logic chip manufactured by a method of according to preferred embodiments. A preferred embodiment of this invention is directed to a digital signal processor chip manufactured by a method of according to preferred embodiments. A preferred embodiment of this invention is directed to a system on a chip manufactured by a method of according to preferred embodiments. A preferred embodiment of this invention is directed to an optoelectronic chip manufactured by a method of according to preferred embodiments. A preferred embodiment of this invention is directed to an optoelectronic device manufactured by a method of according to preferred embodiments. A preferred embodiment of this invention is directed to a semiconductor wafer chip manufactured in a foundry using a method according to preferred embodiments. Chips and devices made by the methods herein can have cost of manufacture and/or performance advantages.

A preferred embodiment is directed to a method of finishing of a semiconductor wafer having a semiconductor wafer surface comprising providing a finishing element finishing surface; positioning the semiconductor wafer surface proximate to the finishing element finishing surface; providing at least one operative sensor capable of gaining information about the finishing; applying an operative finishing motion between the semiconductor wafer surface and the finishing element finishing surface forming an operative finishing interface; sensing the progress of the finishing of the semiconductor wafer surface with the operative sensor and sending the information about the finishing to a processor having access to current cost of manufacture parameters; evaluating finishing control parameters for improved adjustment using both the current cost of manufacture parameters and finishing control parameters to improve the cost of manufacture; and controlling in situ a finishing control parameter to improve the cost of manufacture of the semiconductor wafer.

A preferred embodiment is directed to a method for planarizing a workpiece having a workpiece surface, the method comprising providing an operative sensor, a controller, and a processor; applying an electrochemical planarizing energy for removing material from the workpiece surface; sensing a progress of planarizing information with the operative sensor during at least a portion of a planarizing cycle time; determining a change for at least one process control parameter using at least in part (i) the processor, (ii) a cost of manufacture information, (iii) a revenue information, and (iv) the progress of planarizing information during at least the portion of the planarizing cycle time; and changing the at least one process control parameter which changes the planarizing during at least the portion of the planarizing cycle time.

A preferred embodiment is directed to a method of processing a workpiece having a workpiece surface, the method comprising providing an operative sensor, a controller, and at least one processor; removing material from the workpiece surface using a process selected from the group consisting of a planarizing process and a polishing process; sensing a progress of processing information with the operative sensor during at least a portion of a processing cycle time; evaluating an at least two processing control parameters for improved adjustment using (i) the at least one processor, (ii) a current cost of manufacture information, (iii) a cost of manufacture model information, (iv) a process model, and (v) the progress of processing information during at least the portion of the processing cycle time; and changing the at least two processing control parameters which changes the processing during at least the portion of the processing cycle time.

A preferred embodiment is directed to a method for changing manufacturing control for a workpiece, the method comprising receiving a processing control information previously used in a processing apparatus for at least two processing operations in the processing apparatus and wherein the at least two processing operations include removing material from the workpiece surface using a process selected from the group consisting of a planarizing process and a polishing process, the processing control information including information members comprising (i) an at least one processor, (ii) a current cost of manufacture information, (iii) a cost of manufacture model information, (iv) a process model, and (v) the progress of processing information during at least the portion of the processing cycle time, and supplying the processing control information to at least one processor; evaluating an at least two processing control parameters for improved adjustment using (i) the at least one processor, (ii) the current cost of manufacture information, (iii) the cost of manufacture model information, (iv) the process model, and (v) the progress of processing information during at least the portion of the processing cycle time; using the at least one processor to determine a change in the processing control information; and changing at least one information member in the processing control information forming a changed processing control information.

A preferred embodiment is directed to a method of processing a workpiece having a workpiece surface, the method comprising providing an operative sensor, a controller, and at least one processor; removing material from the workpiece surface using process selected from the group consisting of a planarizing process having an operative finishing motion and a polishing process; sensing a progress of processing information with the operative sensor during at least a portion of a processing cycle time; evaluating an at least two processing control parameters for improved adjustment using (i) the at least one processor, (ii) a current cost of manufacture information, (iii) a cost of manufacture model information, (iv) a process model, and (v) the progress of processing information during at least the portion of the processing cycle time; and changing the at least two processing control parameters which changes the processing during at least the portion of the processing cycle time.

A preferred embodiment is directed to a method of processing a workpiece having a workpiece surface, the method comprising providing an operative sensor, a controller, and at least one processor; removing material from the workpiece surface using an operative finishing motion; sensing a progress of finishing information with the operative sensor during at least a portion of a processing cycle time; evaluating an at least two finishing control parameters for improved adjustment using (i) the at least one processor, (ii) a current cost of manufacture information, (iii) a process model, and (iv) the progress of processing information during at least the portion of the processing cycle time; and changing the at least two processing control parameters which changes the processing during at least the portion of the processing cycle time.

A processor with access to memory can be preferred for some applications. A processor for communicating memory can be preferred for some applications. A processor communicating memory can be preferred for some applications. Communications and access can be during the real time and/or during a planarizing cycle time for some applications. Communications and access can be outside or different from a planarizing cycle time for some applications. Communications and access can be during a portion of a planarizing cycle time for some applications.

A processor-readable, program storage device encoded with instructions that, when executed by a processor, performs the methods and embodiments described herein are generally preferred for some applications. A computer programmed to perform the methods and embodiments described herein are generally preferred for some applications. A process controller having access to or communications with a manufactured article having a processor readable medium with processor readable instructions for performing the methods and embodiments described herein are generally preferred for some applications. An apparatus for planarizing a workpiece having a process controller, the process controller having access to or communications with a manufactured article having a computer readable medium with computer readable instructions for performing the methods and embodiments described herein are generally preferred for some applications. Apparatus for planarizing and control subsystem apparatus having access to or communications with a manufactured article having a computer readable medium with computer readable instructions for performing the methods and embodiments described herein are generally preferred for some applications.

An integrated circuit for accessing a computer readable memory and/or other integrated circuits is preferred. A processor for accessing a computer readable memory and/or other integrated circuits is preferred. An integrated circuit for communicating with a computer readable memory and/or other integrated circuits is preferred. A processor for communicating with a computer readable memory and/or other integrated circuits is preferred. As an illustrative example, at least one processor or at least one integrated circuit can be used for determining a change for a process control parameter(s) occurs during a planarizing cycle time and then changing a process control parameter(s) with the controller occurs during a planarizing cycle time. As a further illustrative example, the at least one processor can include at least two processors and wherein the at least two processors are in operative communication with each other during a planarizing cycle time. As a further illustrative example, the at least one processor can include at least two processors and wherein the at least two processors are in operative communication with each other outside of a planarizing cycle time. As a further illustrative example, the at least one processor can include at least two processors and wherein the at least two processors are in operative communication with each other during a portion of a planarizing cycle time.

Processor Readable Memory Device—Further Comments

A computer-readable, program storage device encoded with instructions that, when executed by a processor, performs preferred embodiment of methods of processing disclosed herein is preferred. A computer-readable, program storage device encoded with instructions that, when executed by a processor, performs preferred embodiment of methods of planarizing and/or finishing disclosed herein is preferred. A computer-readable, program storage device encoded with instructions that, when executed by a computer performs preferred embodiment of methods of planarizing and/or finishing disclosed herein is more preferred. A computer-readable, program storage device encoded with instructions that, when executed by a computer performs preferred embodiment of methods of processing disclosed herein is more preferred. A computer programmed to perform the preferred methods of manufacturing disclosed herein is preferred.

A manufactured article having a processor readable medium with computer readable instructions for performing the preferred embodiments of the methods disclosed herein is preferred. A manufactured article having a computer readable medium with computer readable instructions for performing the preferred embodiments of the methods disclosed herein is preferred. A process controller having access to a manufactured article having a processor readable medium with processor readable instructions for performing the preferred embodiments of the methods disclosed herein is preferred. At least three process controllers wherein the at least three process controllers are in operative communication with each other; and the at least three process controllers have access to a manufactured article having a processor readable medium with processor readable instructions for performing the methods of embodiments of the methods disclosed herein is preferred. At least three process controllers wherein the at least three process controllers are in operative communication with each other and the at least three process controllers have access to a manufactured article having a computer readable medium with computer readable instructions for performing the methods of embodiments of the methods disclosed herein is preferred. An apparatus for planarizing a workpiece having a process controller, the process controller having access to a manufactured article having a computer readable medium with computer readable instructions for performing the methods of embodiments of the methods disclosed herein is preferred. A process controller having access to a manufactured article having a computer readable medium with computer readable instructions for performing the methods of embodiments of the methods disclosed herein is preferred.

Cost of manufacture information is preferred for determining changes to process control parameters. Historical performance including a quantity of historical cost of manufacture information is preferred and historical performance including a quantity of cost of manufacture information from the current workpiece is more preferred and historical performance including a quantity of cost of manufacture information from the current workpiece and prior workpieces is even more preferred. Cost of manufacture information including a quantity of historical cost of manufacture information is preferred and cost of manufacture information including a quantity of cost of manufacture information from the current workpiece is more preferred and cost of manufacture information including a quantity of cost of manufacture information from the current workpiece and prior workpieces is even more preferred. Storing cost of manufacture information is preferred and storing cost of manufacture information including a quantity of cost of manufacture information from the current workpiece is more preferred and storing cost of manufacture information including a quantity of cost of manufacture information from the current workpiece and prior workpieces is even more preferred. Storing a portion of the cost of manufacture information is also preferred. The stored information can be used for current and future process control and data mining.

An apparatus for changing a surface of workpiece using the embodiments herein is preferred. A controller operating with the methods of embodiments described herein is also preferred. A processor readable medium including processor readable instructions for the embodiments herein is also preferred. By having apparatus, controller, and/or processor readable medium available, costs can be generally be saved and the implement can be shortened in time. Sensing the progress of planarizing information during the planarizing cycle time is preferred. Evaluating multiple variables during the planarizing cycle time is preferred. Determining a change for at least one control parameter during the planarizing cycle time is preferred. Changing the at least one process control parameter during the planarizing cycle time is preferred. Sensing the progress of finishing information during the finishing cycle time is preferred. Evaluating multiple variables during the finishing cycle time is preferred. Determining a change for at least one control parameter during the finishing cycle time is preferred. Changing the at least one process control parameter during the finishing cycle time is preferred. By accomplishing these steps during the cycle time (at least once, more preferably a multiplicity of times) generally more sensitive control can be effected.

Cost of manufacture information is preferred for determining changes to process control parameters. Evaluating multiple variables, each having varying effects on the cost of manufacture, prior to changing process control parameters can generally facilitate optimal control. Determining a change for a process control parameter(s) using the evaluation multiple variables and cost of manufacture information provides a generally advanced level of information to compute the change for the process control parameter(s). The evaluation of the multiple variables and determination of a change for a process control parameter can be combined into one step of method, combined into overlapping steps (in time), or sequentially. A manufacturing objective can be minimize costs, consumption of certain material of limited availability, to maximize throughput, to maximize the quantity of salable product, to maximize the value of the salable product (for instance, revenue), and/or to maximize earnings. The objective can be related to a specific semiconductor wafer, semiconductor wafer batch, and/or to a manufacturing run of multiple semiconductor wafer batches. Tracked information of the workpiece can facilitate the applying the appropriate computations and control to the appropriate semiconductor wafers (or die therein).

Figure 16:
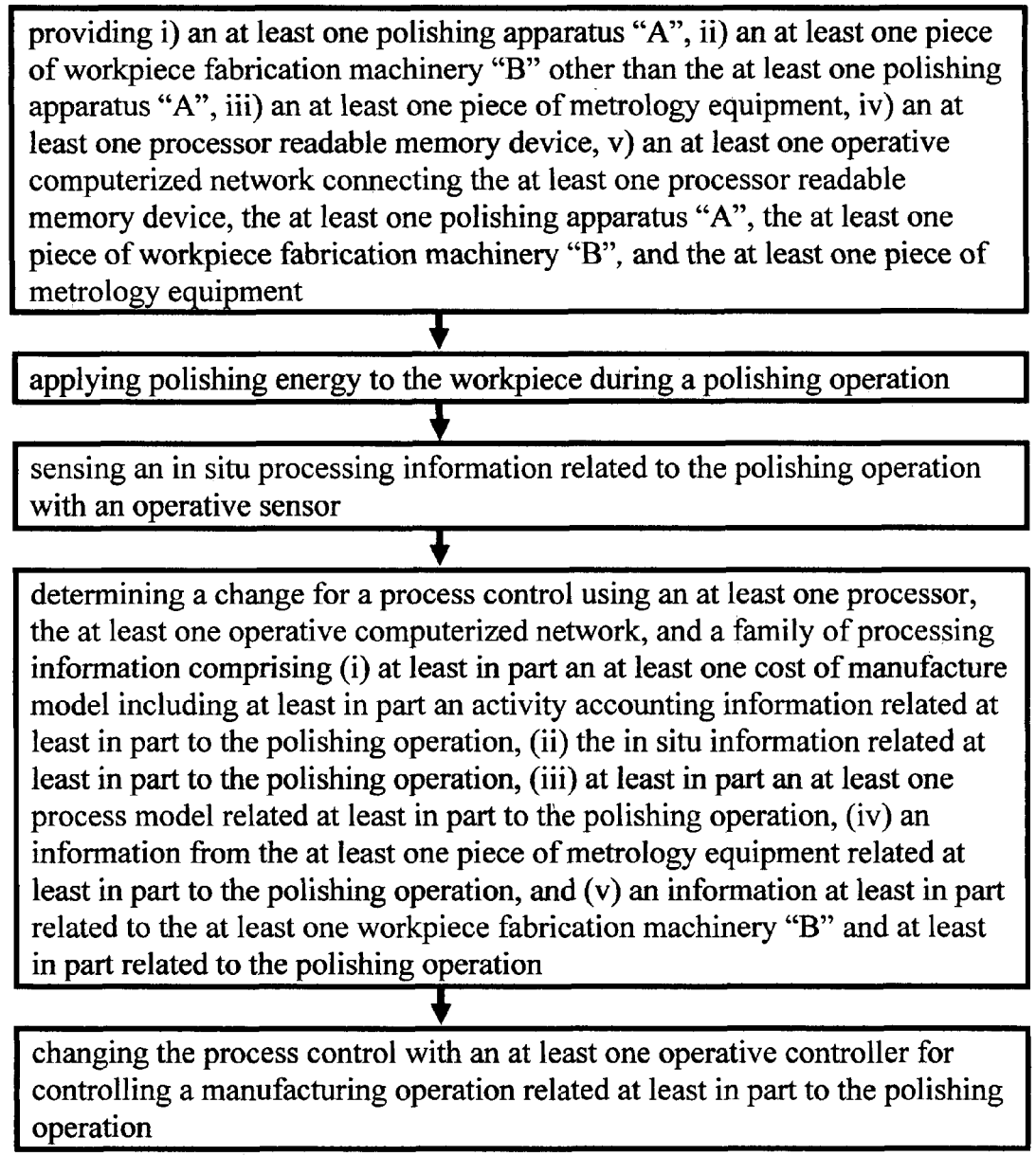
FIG. 16 is a preferred method of polishing

Nonlimiting illustrative example of a method using these advanced methods of control strategy is included in FIG. 16 and will be generally understood by those skilled in the particular art.

Using at least one cost of manufacture parameter to determine improved process control parameter(s) is preferred and using at least two cost of manufacture parameters to determine improved process control parameter(s) is more preferred and using at least five cost of manufacture parameters to determine improved process control parameter(s) is even more preferred and using at least ten cost of manufacture parameters to determine improved process control parameter(s) is even more particularly preferred. Cost of manufacture parameters which are related to the current planarizing step are preferred and cost of manufacture parameters which are derived from the current planarizing step are more preferred. Cost of manufacture parameters which are related to the current planarizing apparatus are preferred and cost of manufacture parameters which are derived from the current planarizing apparatus are even more preferred. Cost of manufacture parameters which are related to the in-use planarizing step are preferred and cost of manufacture parameters which are derived from the in-use planarizing step are more preferred. Cost of manufacture parameters which are related to the in-use planarizing apparatus are preferred and cost of manufacture parameters which are derived from the in-use planarizing apparatus are even more preferred. Cost of manufacture parameters which are current are preferred and cost of manufacture parameters which have been updated for the current manufacture step are more preferred. Cost of manufacture parameters updated to the current manufacturing step with activity based accounting is preferred. Use cost of manufacture information in a common economic value during evaluation and/or determinations is preferred. Use cost of manufacture parameters of a common economic value during evaluation and/or determinations is preferred. By using actual cost of manufacture parameters for optimizing process control with planarizing progress information from operative process sensors in the multi-step semiconductor wafer, the potential to improve one quality control parameter in real time to the detriment of the total cost of manufacture is reduced. Cost of manufacture can generally be optimized more efficiently and effectively for in situ control having access to multiple real time cost of manufacture parameters. Cost of manufacture information derived from the in-use planarizing method and equipment is generally more helpful for real time control. Cost of manufacture information derived from other planarizing methods and apparatus can be used but with generally more effort and increased determination and/or evaluation effort such as modeling, fuzzy logic, extrapolation, interpolations, and the like.

A preferred number of cost of manufacture parameters are updated for evaluating planarizing control parameters with the current manufacturing step in a preferred embodiment. A preferred number cost of manufacture parameters which have been updated consistent with the current manufacturing step is preferred and a preferred number cost of manufacture parameters which have been updated consistent with the current manufacturing step using activity based accounting is more preferred. A planarizing energy which adds material to the semiconductor wafer surface can be preferred for some applications. A planarizing energy which removes material to the semiconductor wafer surface can be preferred for other applications. A method of planarizing wherein the two different planarizing energies are applied at different times during at least a portion of the planarizing cycle time is preferred. A method of planarizing wherein one planarizing energy comprises electrolytic deposition energy and one planarizing energy comprises electropolishing energy is preferred. A method of planarizing wherein one planarizing energy comprises abrasive wear energy and one planarizing energy comprises tribochemical reaction energy is preferred. A method of planarizing wherein one planarizing energy comprises abrasive wear energy and one planarizing energy comprises chemical reaction energy is preferred. A method of planarizing wherein one planarizing energy comprises frictional energy and one planarizing energy comprises chemical reaction energy. A method of planarizing wherein the two different planarizing energies are applied sequentially in time during at least a portion of the planarizing cycle time is preferred. A method of planarizing wherein one planarizing energy comprises abrasive wear energy and one planarizing energy comprises tribochemical reaction energy is preferred. A method of planarizing wherein one planarizing energy comprises abrasive wear energy and one planarizing energy comprises chemical reaction energy is preferred. A method of planarizing wherein the two different planarizing energies are applied at the same time during at least a portion of the planarizing cycle time is preferred. A method of planarizing wherein the planarizing of the semiconductor wafer surface has a planarizing cycle time; and wherein evaluating planarizing control parameters for improved adjustment includes using the at least one cost of manufacture parameter comprising first pass first quality yield; and wherein the at least one cost of manufacture parameters has been updated for improved control evaluation with the current manufacturing step is more preferred. A method of wherein the planarizing of the semiconductor wafer surface has a planarizing cycle time; and wherein the at least one cost of manufacture parameter comprises at least three cost of manufacture parameters; the at least three cost of manufacture parameters have been updated for evaluating planarizing control parameters with the current manufacturing step; and wherein the controlling step comprises adjusting at least 4 times the at least one planarizing control parameter during the planarizing cycle time to improve the cost of manufacture of the semiconductor wafer. Each of the above preferred embodiments can be used to improve the process control of planarizing and finishing when using at least in part cost of manufacture parameters to reduce the cost of making a semiconductor wafer and/or semiconductor wafer chip. Semiconductor wafers made with the preferred method are preferred because they can have reduced costs and/or enhanced performance. Semiconductor wafer chips made according to a preferred method are preferred because they also can be made reduced costs and/or enhanced performance.

A method wherein the semiconductor wafer being finished has a plurality of metal layers is preferred. A method wherein the semiconductor wafer being finished has at least 3 of metal layers is more preferred. A method wherein the semiconductor wafer being finished has a plurality of porous low-k dielectric layers is preferred. A method wherein the semiconductor wafer being finished has a plurality of low-k dielectric layers having organic polymers therein is more preferred. A method wherein the semiconductor wafer being finished has a low-k dielectric layer having a value of less than 2.5 is preferred. A method wherein the semiconductor wafer being finished has a plurality of low-k dielectric layers, each having a value of less than 2.0 is more preferred. As the number of layers become greater, the cost of manufacture increases and thus optimization can save more costs per wafer. Semiconductor wafers with low-k dielectric layers are currently relatively expensive to produce and therefore cost savings can generally be attractive.

Sensing the process progress information in real time is preferred. Determining in real time improved control parameters using cost of manufacture parameters is preferred. Controlling the control parameter(s) in real time is preferred. Performing these steps in real time can generally improve the ability to make quick timely changes to improve the cost of manufacture of preferred workpieces.

Sensing the process progress information in situ is preferred. Determining in situ improved control parameters using cost of manufacture parameters is preferred. Controlling the control parameter(s) in situ is preferred. Performing these steps in situ can generally improve the ability to make quick timely changes to improve the cost of manufacture of preferred workpieces.

Storing the progress information, process control parameter information, cost of manufacture information, and other related information in the database(s) or memory look-up tables and the like of the process control subsystem forms a knowledge information repository which can be used to improve later semiconductor wafer planarizations. That is the process control subsystem can have command of an evolving and improving database(s) and/memory look-up tables. Using techniques such as neural networks and/or fuzzy logic with the evolving and improving database(s) and/or memory look-up table(s), continued improvement of the evaluations and/or determinations for improved real time process control. This can lead generally to further reductions in the cost of producing semiconductor wafers.

An energy planarizing method using a cost of manufacture centered analysis for real time control is preferred. Using the techniques of the cost of manufacture parameter centric real time process control, individual quality and material costs can be used for evaluations in a generally more balanced method to lower costs.

Applying a planarizing energy comprises applying the planarizing energy to an in-process semiconductor wafer having a multiplicity of in-process processor devices is preferred. Applying a planarizing energy comprises applying the planarizing energy to an in-process semiconductor wafer having a multiplicity of in-process microprocessor devices is preferred. Applying a planarizing energy comprises applying the planarizing energy to an in-process semiconductor wafer having a multiplicity of in-process logic devices is preferred. Applying a planarizing energy comprises applying the planarizing energy to an in-process semiconductor wafer having a multiplicity of in-process memory devices is preferred. A DRAM is a preferred memory in-process device (which when done will be a DRAM chip). An SRAM is a preferred memory in-process device (which when done will be a SRAM chip). Applying a planarizing energy comprises applying the planarizing energy to an in-process semiconductor wafer having a multiplicity of in-process digital signal processor (DSP) devices is preferred. Applying a planarizing energy comprises applying the planarizing energy to an in-process semiconductor wafer having a multiplicity of in-process optoelectronic devices is preferred. Applying a planarizing energy comprises applying the planarizing energy to an in-process semiconductor wafer having a multiplicity of in-process telecommunications devices is preferred. Applying a planarizing energy comprises applying the planarizing energy to an in-process semiconductor wafer having a multiplicity of in-process MicroElectroMechanical Systems (MEMS) devices is preferred. Applying a planarizing energy comprises applying the planarizing energy to an in-process semiconductor wafer having a multiplicity of in-process electronic devices having a plurality of metal layers is preferred. Applying a planarizing energy comprises applying the planarizing energy to an in-process semiconductor wafer having a multiplicity of in-process electronic devices having a plurality of low-k layers is preferred. Applying the planarizing energy is preferably done during a discrete in-process step performed on the in-process semiconductor wafer and which will lead to the production of operating integrated circuit devices or chips. A fab manufacturing multiple types of semiconductor wafers is also preferred. A foundry manufacturing multiple types of semiconductor wafers is also preferred. Semiconductor chips (or dice) are generally known to those skilled in the art. An in-process semiconductor wafer is generally known to those skilled in the art. Control of costs can improve the value of these in-process devices, chips, dice, and/or manufacturing operations. Electronic chips which are particularly price sensitive such as memory chips, subject to early obsolescence such as microprocessors, and/or made in short runs (and thus, substantial changeover costs) such as MEMS can benefit from incorporation of these new control subsystems and control methods.

Storing the information used for process control for future use is preferred. By storing information, preferably electronically, more preferably in look-up tables, the information can be looked-up and used without having to re-enter data with its associated costs and potential for error. Using the stored information to make a change, more preferably an appreciable change, to a process model having a plurality of organic lubricating control parameters is preferred. As an illustrative example, the stored information can be used to modify the Preston Equation in a process model for polishing which is generally known to those skilled in the semiconductor wafer polishing art. The stored information can be used for data mining. Data mining can be used to improve a process model, cost of manufacture, cost of manufacture model, and/or to identify preferred changes to control parameters for improved finishing. The stored information during ramp-up stage can used to improve a commercial stage process model and/or cost of manufacture model. By directly storing information for future use, a multiple valuable uses are made available at reduced cost and with reduced chance for error.

Storing information is preferred and then evaluating the stored information for change and changing the stored information is more preferred. Changing the stored information with an algorithm is a preferred method of changing the stored information. The stored information can be reduced in size using a computer algorithm. Simplifying stored information is a preferred method of changing stored information. Historical performance is a preferred type of stored information. Historical performance including tracked information is a preferred type of stored information. A tracking code and tracked information belonging to the tracking code is a preferred type of stored information. A process model having at least in part a portion of tracked information is a preferred type of stored information. A process model developed at least in part with tracked information is a preferred type of stored information. A model developed with tracked information from at least three workpieces is preferred and from at least 25 workpieces is more preferred and from at least 100 is even more preferred and from at least 300 is even more particularly preferred. Determining a change using the stored information for a process model is a preferred use of the stored information. Changing a model to change process control optimization is a preferred method of changing the stored information. Determining a change using the stored information with operative control subsystem or accessible computer or processor is a preferred method of changing the stored information. Transferring the stored information to a different computer (or processor) and determining a change with the different computer using at least in part the transferred information can also be preferred. Determining a change using the stored information with operative control subsystem or accessible computer or processor is a preferred method of changing the stored information. Determining a change using the stored information while accessing computer or processor with operative control subsystem is a preferred method of changing the stored information. Stored information can be used to determine previously unknown or under appreciated process control parameter(s) using various computer algorithms. Stored information can be used to determine previously unknown or under appreciated process control parameter interactions using various computer algorithms. Stored information can be used to determine previously unknown or under appreciated workpiece design interactions (such as feature size or gate dimensions for integrated circuits) with predicted cost of manufacturing parameters using various computer algorithms. Stored information can be used to determine a change for workpiece design (such as a changed feature size or gate dimensions for integrated circuits) before manufacturing, thus improving manufacturability. Stored information can be used to determine a process model, a cost of manufacture model, and/or cost of manufacture parameters for a new workpiece to determine future manufacturability and/or cost therefore. Stored information can be used to determine apparatus or network of multiple apparatus for a new workpiece (such as changed feature size or gate dimensions for integrated circuits) to determine future manufacturability and/or cost therefore. A method wherein at least one member of the group consisting of storing information, evaluating the stored information, changing the at least one member of information, and using the at least one member of information is performed during at least a portion of time outside of the finishing cycle time is also preferred. A method wherein at least one member of the group consisting of storing information, evaluating the stored information, changing the at least one member of information, and using the at least one member of information is performed during at least a portion of time is different from the finishing cycle time is also preferred. Mathematical algorithms can be used for these determinations. Fuzzy logic can be used for these determinations. Neural networks can be used for these determinations. These new and useful results can improve time to market and reduce to costs to reach to the market.

A method of evaluating of planarizing process information and progress of planarizing information in real time is preferred. A method of evaluating of in situ information and progress of processing information in real time is preferred. A method of evaluating of planarizing process information and progress of planarizing information in situ is preferred. A method of evaluating of processing process information and progress of processing information in situ is preferred. A method of controlling a control parameter in real time is preferred. A method of controlling a control parameter in situ is preferred. A method of adjusting a control parameter in real time is preferred. A method of adjusting a control parameter in situ is preferred. By using a method which functions in real time, faster adjustment to the process control parameter can effected and generally a lower cost of manufacture is thus available (rather than waiting for the next batch, run, or semiconductor wafer and any adverse costs thereby associated therewith for waiting). Adverse costs can include removing the semiconductor wafer for the process apparatus only to have to reload it later therefore incurring excess costs for labor costs, materials costs, and loss of apparatus utilization for the unloading and loading (and also any defects caused there between). Further with processors, multiple improved process control parameter(s) settings can be determined and then adjusted with the control subsystem using the preferred method.

Data mining can be accomplished on information used previously for process control. Data processing can be accomplished on information used previously for process control. This reduces the cost of creating a new table or database for data mining. Further, the data mining results can be more readily applied to new, advanced process control algorithms. New process control algorithms can be developed by evaluating ramp-up historical information including process control parameters and then applying the new process control algorithm for commercial manufacture. New process control algorithms can be developed by evaluating ramp-up historical information including process control parameters and cost of manufacture parameters and then applying the new process control algorithm for commercial manufacture. New process control algorithms can be developed by evaluating previous historical information including process control parameters and then applying the new process control algorithm for future commercial manufacture. New process control algorithms can be developed by evaluating previous historical information including process control parameters and cost of manufacture parameters and then applying the new process control algorithm for future commercial manufacture. Thus the historical performance which is stored in a look-table is preferably used for a plurality of purposes to reduce the cost of manufacture and/or improved the enterprise profitability. Historical performance stored in at least 10 look-up tables is preferred and stored in at least 25 look-up tables is more preferred and stored in at least 50 look-up tables is even more preferred. Historical performance stored in a database is preferred and in a relational database is even more preferred. By using the historical information used for initial process control multiple times cost of manufacture modeling, and process control algorithm improvement is accomplished in a new, more effective manner to give a new lower cost result because historical information does not have to be entered twice or more times for this analysis.

Process control parameters for electroplating and/or electropolishing can be selected from the group consisting of applied voltage(s), applied current(s), ionic strength, temperature, operative refining motion, secondary operative refining motion(s) or applied energies (such abrasive motion(s) or energy), ionic strength of the refining composition, pH of the refining composition, selected elemental ionic strength in the refining composition, and separation distance of the operating electrodes is preferred. Control of the applied electric field is a preferred process control parameter. Control of the current density is a preferred process control parameter. Control of the applied voltage is a preferred process control parameter. Control of the applied voltage at a working electrode is a preferred nonlimiting example of a controlled applied voltage. Control of the pH of the refining composition is a preferred process control parameter. Control of particular ions (e.g. copper ions) in the refining composition is a preferred process control parameter. Control of the pH of the refining composition is a preferred process control parameter. Control of the operative refining motion is a preferred process control parameter. Down force is a preferred example of a part of the operative refining motion. Relative velocity is a preferred example of a part of the operative refining motion. Continuous motion and non-continuous motion is a preferred example of a part of the operative refining motion. Control of a plurality of operative refining motions is a preferred process control parameter. Control of a applied abrasive energy during electroplating and/or polishing (or an electroplating and/or electropolishing step) is a preferred process control parameter. Control of a tribochemical reaction(s) during electroplating and/or polishing (or an electroplating and/or polishing step) is a preferred process control parameter. Control of a reaction(s) during electroplating and/or electropolishing (or an electroplating and/or polishing step) is a preferred process control parameter. Combinations of these can also be used. With a plurality of electro-planarizing elements, a plurality of different applied currents can be used. With a plurality of electro-planarizing elements, a plurality of independently controlled applied currents can be used. With a plurality of currents, generally a plurality of power supplies are used. A process model for electro-refining such as using the number of Coulombs or Faraday's law are generally know to those skilled in the art. Historical performance and information can also be used to develop or refine a process model. A process model is preferred for control. A control subsystem having an operative sensor, a processor, and a controller is preferred and discussed in more detail elsewhere herein. Control of electro-refining can increase manufacturing yields, enhance versatility, and reduce costs.

Determining a change for a process control parameter at least 4 times during the planarizing cycle time is preferred and at least 6 times during the planarizing cycle time is more preferred and at least 10 times during the planarizing cycle time is even more preferred and at least 20 times during the planarizing cycle time is even more particularly preferred. Determining a change for a process control parameter in situ process information and the tracked information at least 4 times during the planarizing cycle time is preferred and at least 6 times during the planarizing cycle time is more preferred and at least 10 times during the planarizing cycle time is even more preferred and at least 20 times during the planarizing cycle time is even more particularly preferred. Changing process control parameter value at least 4 times during the planarizing cycle time is preferred and at least 6 times during the planarizing cycle time is more preferred and at least 10 times during the planarizing cycle time is even more preferred and at least 20 times during the planarizing cycle time is even more particularly preferred. Controlling the process control parameter value at least 4 times during the planarizing cycle time is preferred and at least 6 times during the planarizing cycle time is more preferred and at least 10 times during the planarizing cycle time is even more preferred and at least 20 times during the planarizing cycle time is even more particularly preferred. Currently, a planarizing cycle time of at most 6 minutes is preferred and of at most 4 minutes is more preferred and of at most 3 minutes is even more preferred and of at most 2 minutes is even more particularly preferred. By repeatedly determining, changing and controlling through adjusting the process control parameter(s) value(s), better process control and improved cost of manufacture can be effected. By repeatedly calculating and adjusting the process control parameter(s) value(s) using in situ process information and tracked information, better process control, improved refining, and improved cost of manufacture can generally be effected. Repeating the sensing, determining, and changing steps above in this paragraph during a single period of non-steady state refining is preferred. Repeating the sensing, determining, and changing steps above in this paragraph at least 4 times is during a single period of non-steady state refining is more preferred. Repeating the sensing, determining, and changing steps above in this paragraph at least 10 times during a single period of non-steady state refining is more preferred in the above embodiments and repeating at least 25 times is even more preferred and repeating at least 50 times is even particularly preferred. Generally, a maximum of one hundred calculations and process control parameter adjustments during a planarizing cycle time are preferred although more can be used for particularly critical semiconductor wafer planarizing (and as processor speeds and controllers improve). A process control parameter which changes the friction, planarizing rate, cut rate, or tribochemical reaction rate during planarizing are preferred non-limiting examples of a planarizing cycle time which can benefit a process control parameter.

Determining a change for a process control parameter at least 4 times during the non-steady state process time is preferred and at least 6 times during the non-steady state process time is more preferred and at least 10 times during the non-steady state process time is even more preferred and at least 20 times during the non-steady state process time is even more particularly preferred. Determining a change for a process control parameter in situ process information and the tracked information at least 4 times during the non-steady state process time is preferred and at least 6 times during the non-steady state process time is more preferred and at least 10 times during the non-steady state process time is even more preferred and at least 20 times during the non-steady state process time is even more particularly preferred. Changing process control parameter value at least 4 times during the non-steady state process time is preferred and at least 6 times during the non-steady state process time is more preferred and at least 10 times during the non-steady state process time is even more preferred and at least 20 times during the non-steady state process time is even more particularly preferred. Controlling the process control parameter value at least 4 times during the non-steady state process time is preferred and at least 6 times during the non-steady state process time is more preferred and at least 10 times during the non-steady state process time is even more preferred and at least 20 times during the non-steady state process time is even more particularly preferred. Currently, a non-steady state process time of at most 3 minutes is preferred and of at most 2 minutes is more preferred and of at most 1.5 minutes is even more preferred and of at most 1 minute is even more particularly preferred. By repeatedly determining, changing and controlling through adjusting the process control parameter(s) value(s), better process control and improved cost of manufacture can be effected. By repeatedly calculating and adjusting the process control parameter(s) value(s) using in situ process information and tracked information, better process control, improved refining, and improved cost of manufacture can generally be effected. Generally, a maximum of one hundred calculations and process control parameter adjustments during a non-steady state process time are preferred although more can be used for particularly critical semiconductor wafer refining (and as processor speeds and controllers improve). A process undergoing differential frictional changes during refining can be a preferred non-limiting example of a non-steady state change which can benefit from the non-steady state a process control methods herein.

Figure 13:
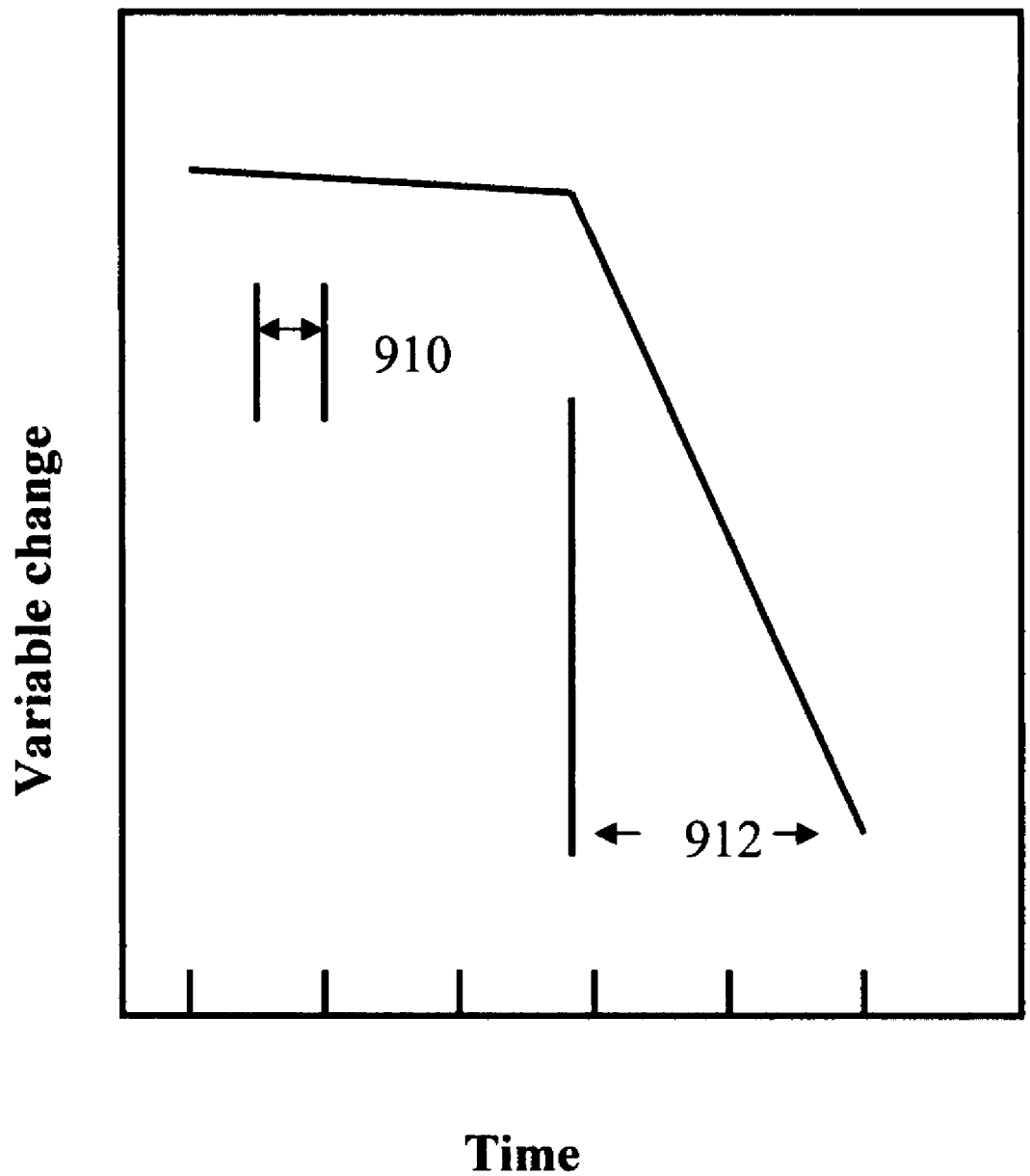
FIG. 13 illustrates an embodiment of time period of non-steady state operation

A non-steady state time period is generally understood by those skilled in the art. Certain types of non-steady state are preferred for control purposes in specific applications. A time period non-steady state finishing comprising a time period in which a process variable changes at least twice as fast as the process variable changes during a time period of most steady state planarizing, the time period of the most steady state finishing is defined as that time period equal to 10% of the entire finishing cycle time in minutes in which the smallest variation in the process variable occurs is preferred for preferred embodiments of process control. FIG. 13 illustrates a nonlimiting example of non-steady processing. Reference Numeral 910 illustrates a 10% of a finishing cycle time with the smallest variable change. Reference Numeral 912 illustrates a non-steady state time period having the same variable change at least twice as much as during the more stable period illustrated by Reference Numeral 910. A workpiece surface of having a uniform surface region and wherein the period of non-steady state finishing comprises a time period of finishing the uniform surface region wherein the cut rate of the first composition measured in angstroms per minute is changing an appreciable amount with time is also preferred for preferred embodiments of process control. A workpiece surface having a first chemical composition and a second chemical composition and wherein the period of non-steady state finishing comprises a time period of finishing the workpiece surface wherein the amount of material removed of the first chemical composition measured in micrograms per minute is changing an appreciable amount with time is also preferred for preferred embodiments of process control. A workpiece surface having a first region and a second region and wherein the period of non-steady state finishing comprises a time period of finishing the workpiece surface wherein the amount of material removed of the first region measured in micrograms per minute is changing an appreciable amount with time is also preferred for preferred embodiments of process control. A workpiece having a surface and the period of non-steady state finishing comprises a period in minutes of finishing the workpiece surface wherein the amount of material removed from a portion of the surface of the layer measured in micrograms per minute is changing an appreciable amount with time is also preferred in preferred embodiments. A finishing cycle time comprising a time in which the workpiece resides in a specific workpiece holder while applying a continuous finishing energy is a preferred finishing cycle time.

A generally robust control subsystem for manufacturing a workpiece having multiple manufacturing steps wherein some having non-steady time periods is preferred. A control system with a plurality of operative sensors, a plurality of processors, and at least one controller is a nonlimiting example of a preferred control subsystem for controlling during non-steady state. A process model and/or a cost of manufacture model can be preferred. A workpiece having an identification code is preferred and a workpiece having a unique identification code is preferred. An identification code can further aid process control of a manufacturing process having multiple steps. A semiconductor wafer is a preferred example of a workpiece. A workpiece having a microelectronic component is another example.

Figure 14A:
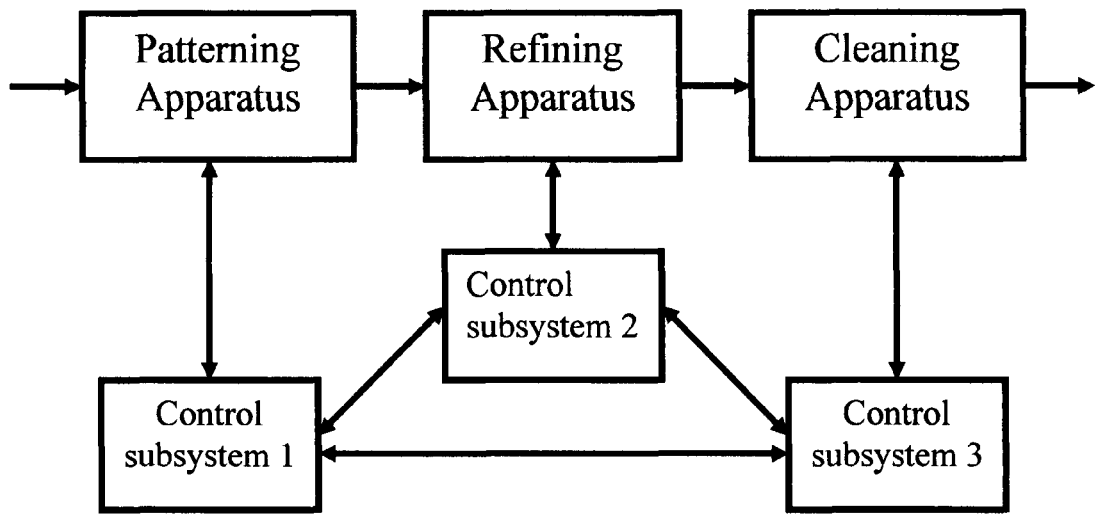
FIG. 14a, b illustrates some networked control subsystems
Figure 14B:
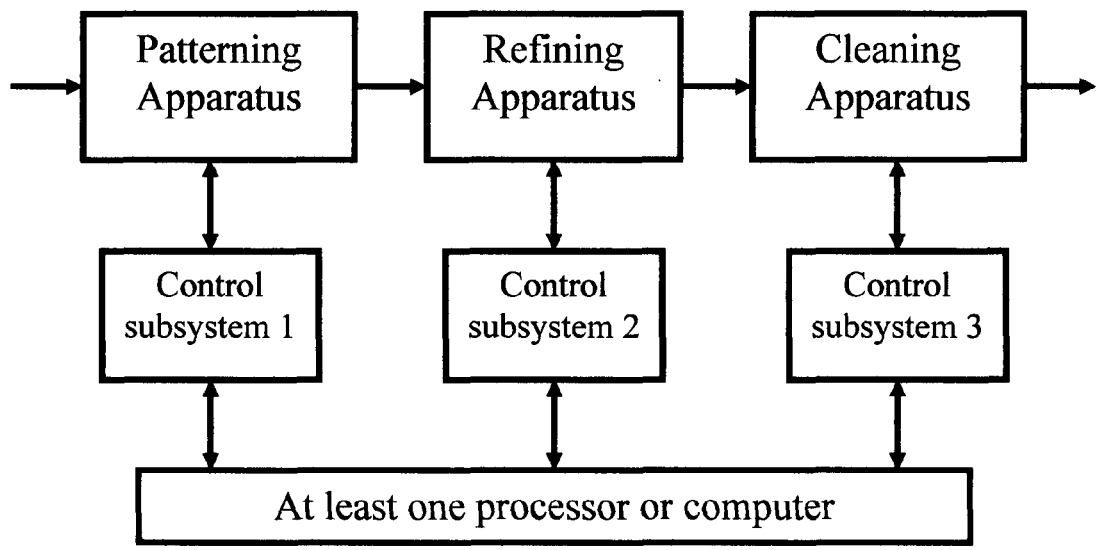

FIG. 14a is a nonlimiting illustrative of control subsystems which are networked to each other and to their respective process equipment (patterning apparatus, planarizing apparatus, and cleaning apparatus). As indicated by the arrows other process steps and apparatus can proceed this equipment and other process steps and apparatus can be downfield of this equipment. Further the as is generally known in the semiconductor industry, some steps or groups of steps can be repeated during the manufacture of a semiconductor wafer. FIG. 14b is a nonlimiting illustrative of control subsystems which are networked to each other through a more central computer unit and directly to their respective process equipment (patterning apparatus, planarizing apparatus, and cleaning apparatus). As indicated by the arrows other process steps and apparatus can proceed this equipment and other process steps and apparatus can be downfield of this equipment. Further the as is generally known in the semiconductor industry, some steps or groups of steps can be repeated during the manufacture of a semiconductor wafer. Still further, there are many generally known operative networking systems which are generally known in the computer art field and process control field which will be functional and useful. For instance, the control subsystems can be embedded or remote or some combination thereof. Networks and operative connections can be direct or indirect and/or some combination thereof. An operative network can aid in the process control using information selected from the group consisting of tracking codes, tracking information, cost of manufacture parameters, and models and combinations thereof.

Figure 15A:
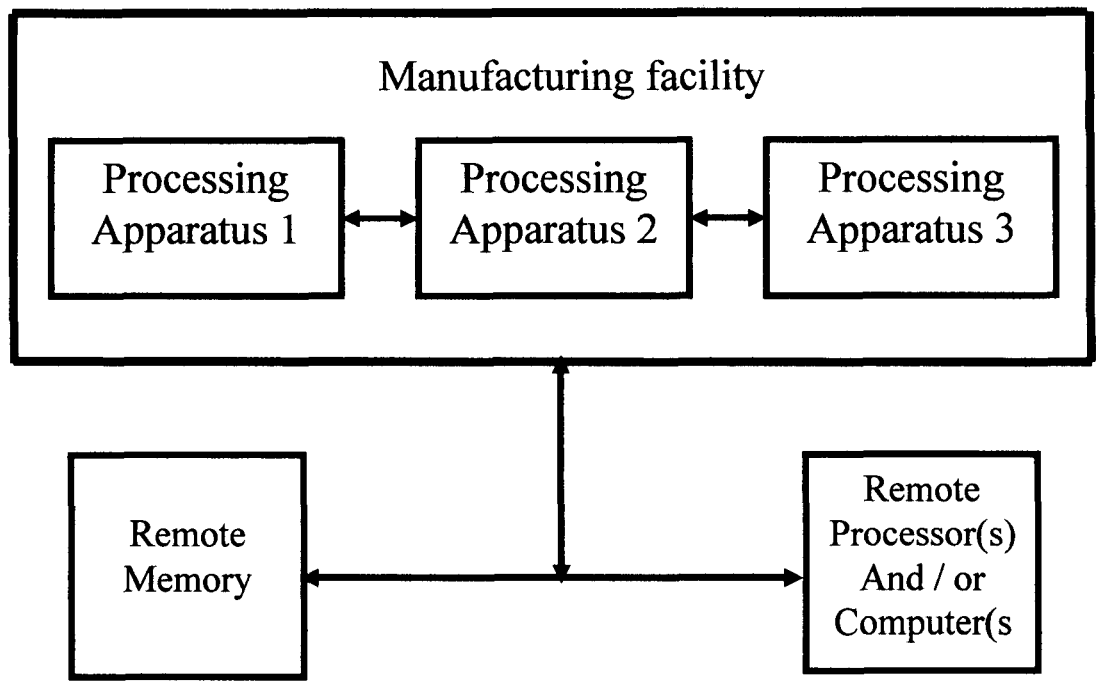
FIGS. 15a, b illustrates some manufacturing facilities and connections
Figure 15B:
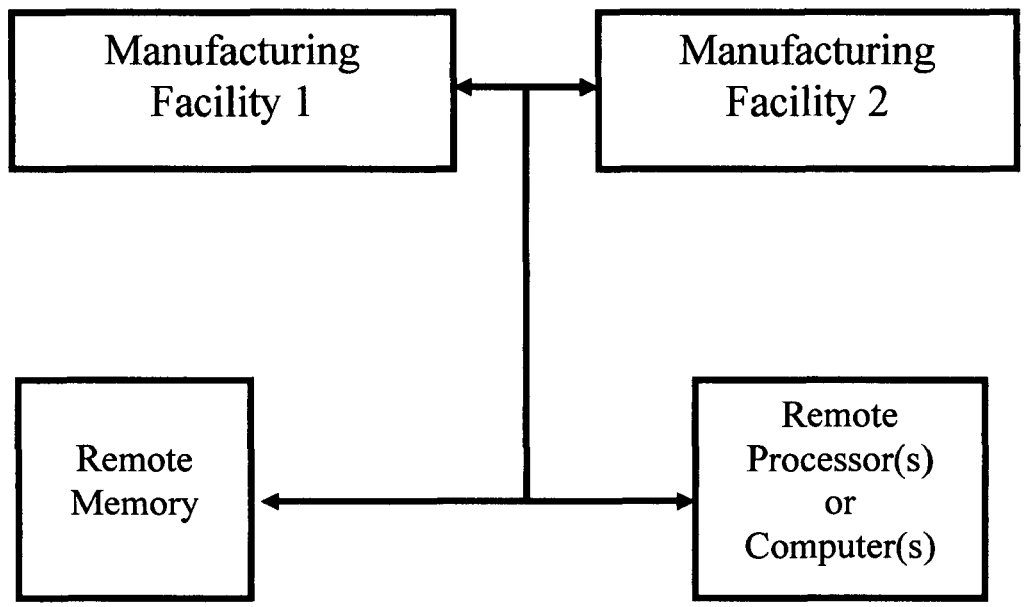

FIG. 15a shows an illustrative nonlimiting embodiment of a simplified block diagram of manufacturing facility. Electroprocessing apparatus 1, 2, and 3 are shown with operative communication between them. Some illustrative items not shown to simplify the figure and promote understanding include other manufacturing apparatus such metrology apparatus, control systems, and other manufacturing equipment. The overall manufacturing facility is shown with operative connections to remote memory (and/or remote storage). The overall manufacturing facility is shown with operative connections to remote processor(s) and/or remote computer(s). This can remote processing means or remote computing means. The remote memory is shown with operative connections to the remote processor(s) or remote computer(s). FIG. 15b shows an illustrative nonlimiting embodiment of a manufacturing facility 1 and a manufacturing facility 2 with operative connections between them. Both manufacturing facility 1 and 2 are shown with operative connections to remote memory (or storage) and remote processor(s) or remote computer(s). The remote memory is shown in operative communication with the remote processor(s) and/or computer(s). Operative connections and operative communications include are generally known to those skilled in the process control arts. Illustrative nonlimiting examples include at least in part optical communications, landlines, wire communications, and wireless communications. Local area networks, internet, cell phone, landline, cable communications can also be used. Operative communications can generally be used for local and remote communications. Internet communications and a satellite communications can be used. Local networks can be used. Those of ordinary skill in the art are generally familiar with networks, operative connections, operative communications, sending information, and receiving information. Those of ordinary skill in the art are generally familiar with networks are also generally familiar with communications system(s), communications path(s), and communications apparatus for sending information and for receiving information.

SUMMARY

As is generally known in the semiconductor wafer art, development of actual preferred embodiments is generally accomplished in stages along with numerous process and design specific information. Given the teachings and guidance contained herein, preferred embodiments are generally implemented in stages while taking into account numerous business, process, and product specific information by those generally skilled in the semiconductor wafer arts. Although the implementation of a preferred embodiment may have generally numerous steps while taking into account the numerous business, process, and product specific information, implementation merely requires routine experimentation and effort given the teachings and guidance contained herein. Thus although the implementation may be somewhat time-consuming, it is nevertheless a generally routine undertaking for those of ordinary skill in the art having the benefit of the information and guidance contained herein. In some discussion herein, generally known information, processes, procedures, and apparatus have not been belabored so as not to obscure preferred embodiments of the present invention.

Preferred embodiments of this invention include the combination of in situ control using a processor having access to cost of manufacture parameters and using mathematical evaluations to change in real time process control parameters which change the effective coefficient of friction at the operative finishing interface.

Preferred embodiments include the combination of in situ control using a processor having access to cost of manufacture information including activity based accounting and using determinations to change process control parameter(s). Preferred embodiments include the combination of in situ control using a processor having access to cost of manufacture information, revenue information, and using determinations for advanced changes to process control parameter(s). A preferred embodiment includes control using a processor or integrated circuitry having access to or in communication with cost of manufacture information, revenue information, and a model to determine changes to a process control parameter(s) and then changing the process control parameter. A preferred embodiment includes the control using a processor or integrated circuitry having access to or in communication with cost of manufacture information, revenue information, profit information, and a model to determine changes to a process control parameter(s) and then changing the process control parameter. Preferred embodiments of software and apparatus are discussed and disclosed. Real time rapid control of such preferred process control parameter as the pressure applied to the operative finishing interface to improve planarizing and/or finishing is preferred. At least one process sensor is preferred and at least two process sensors are more preferred and at least three process sensors are even more preferred. Particularly preferred cost of manufacture information can be selected from the group consisting of parametric yield, equipment yield, defect density, and planarizing rate. Other preferred cost of manufacture parameters include equipment utilization, raw materials cost such as slurry, chemicals, finishing element cost, cleaning chemicals and/or equipment. Thus another preferred set of cost of manufacture parameters can be selected from the group consisting of parametric yield, equipment yield, defect density, finishing rate, and consumable materials costs. Still other preferred cost of manufacture information includes mean time to finishing element change and mean time to finishing element conditioning. Illustrative examples of consumable materials costs include slurry cost, other chemical costs, and cleaning chemical costs. The cost of manufacture effects on other steps of the manufacturing of the completed semiconductor wafer can also be considered such as lithography (and of other cost of individual processing steps). By tracking individual semiconductor wafer, the in process cost of manufacture of individual semiconductor wafer can be tracked and used for improving the finishing process. A processor or integrated circuit is generally preferred to perform the multiple calculations in the preferred real time rapid process control to improve finishing. A processor or integrated circuit is generally preferred to perform the multiple computations in the preferred real time rapid process control to improve processing. A processor or integrated circuit is generally preferred to perform the multiple evaluations in the preferred real time rapid process control to improve processing. A processor or integrated circuit is generally preferred to perform the multiple determinations in the preferred real time rapid process control to improve processing. This can help reduce unwanted surface defects and also reduce the cost of manufacture for processing, finishing, and/or planarizing. This can help improve profitability and revenue for finishing and/or planarizing.

Preferred methods of control have been disclosed using a preferred control subsystem. A processor having access to a process model is preferred. A processor having access to or communicating with a cost of manufacture model is preferred. A processor having access to or communicating with a model including cost of manufacture information is preferred. A processor having access to or communicating with an activity based cost of manufacture model is also preferred. A processor having access to or communicating with an activity based cost of manufacture information is also preferred. A process model having access to or communicating with historical performance is preferred. A processor having access to or communicating with a memory device(s) is preferred. Determining a change during process control parameter during a non-steady state process time period can be preferred for some applications. Determining a change for a process control parameter that is in a non-steady state time period can be preferred for some applications. Determining a change for a process control parameter using progress of refining information in real time and changing the process control parameter during the non-steady state time period can be more preferred for some applications. Determining a multiplicity of changes for a process control parameter using progress of refining information in real time and changing the process control parameter a multiplicity of times during the non-steady state time period can be more preferred for some applications.

A process model is preferred for control. A cost of manufacture model is also preferred for control. Mathematical equations, expressions, and formulas including those developed based on process results can be used. Mathematical algorithms for control based on process performance results can be preferred. An empirically-based process model can be preferred. An empirically based process model developed in least in part on historical performance is preferred. A first principles-based process model can also be used for control. Using at least in part a first principles process model and at least in part an empirically based process model can be preferred for process control. A yield model can also be preferred for process control. A yield model based at least in part on historical performance is currently preferred. A recipe for finishing a semiconductor wafer can also be used. A recipes can be developed and/or modified based on historical performance. Multiple recipes stored in the look-up tables is preferred. A process model, more preferably multiple process models can be stored in the look-up tables. A processor having access to the look-up tables is preferred. Yield model are generally known to those skilled in the semiconductor wafer manufacturing arts. Process models are generally known to those skilled in the semiconductor wafer manufacturing arts.

Evaluating multiple variables, each with varying effects on the cost of manufacture is a preferred for changing the cost of manufacture. Evaluating multiple variables, each with varying effects on the cost of manufacture is a preferred for improving the cost of manufacture. A process variable is a preferred variable. A process control variable is an illustrative example of a preferred process variable. A cost of manufacture parameter is a preferred variable. Illustrative preferred examples of process control parameters and cost of manufacture are discussed herein. Determining a change for a process control parameter at least in part during the period of time of evaluating the multiple variables is preferred. Determining a change for a process control parameter at least in part after the period of time of evaluating the multiple variables is preferred. Evaluating multiple variables can be preferred for heterogeneous workpieces having different chemical compositions on the workpiece surface being planarized (or finished). Evaluating multiple variables can be preferred during time periods having differential planarizing rates measured in angstroms per minute (or finishing rates measured in angstroms per minute). Evaluating multiple variables can be preferred during time periods having differential planarizing rates measured in angstroms per minute (or finishing rates measured in angstroms per minute). Evaluating multiple variables can be preferred during time periods having different regional planarizing rates (for either material addition or removal) measured in angstroms per minute. Evaluating the multiple variables and determining a change with cost of manufacture information and multiple variable evaluation information can provide a more robust body of information to improve process control. Illustrative examples of differential planarizing rates and/or different regional planarizing rates can be localized electropolishing and/or electroplating. Illustrative examples of differential planarizing rates and/or different regional planarizing rates can be localized lubrication which changes local friction which in turn can change local abrasion rates and/or cut rates. Local, regional, and differential planarizing rates can change manufacturing yields, material consumption, equipment utilization, first pass first quality yields, etc. which can change the cost of manufacture of the workpiece. By evaluating these multiple variables and determining changes for the process control parameters using this information, improved control of the cost of manufacture can be generally be realized.

Illustrative non-limiting examples of useful technology have been referenced by their patents numbers and all of these patents are included herein by reference in their entirety for further general guidance and modification by those skilled in the arts.

Discussed herein have been one or more aspects of the present invention. It is, of course, not possible to describe every conceivable combination of embodiment, business condition, processing and/or finishing apparatus, finishing control subsystem, methods for purposes of describing the present invention and combinations thereof, but one of ordinary skill in the art will recognize, using the teaching and guidance herein, that many further combinations and permutations of the present invention are possible. As a non-limiting illustrative example, embodiments illustrated with Markush group wording can used as the expressed grouping or in as a single element or combination of elements. As a nonlimiting illustrative example, a particular feature of the invention may have been disclosed with respect to only one of a plurality of implementations and such particular feature may be combined with one or more other features of the other implementations which meet business and/or technical objectives during the implementation.

Artisans, given the teachings and guidance herein, given the teachings and guidance herein, generally understand a that a cost of manufacture model can be used in different ways for control and business needs. As illustrative examples, cost of manufacture models and/or their use can be directed at variable costs, fixed costs, and/or quality costs and thus effectively used for control at least in part. As illustrative examples, cost of manufacture models can be directed at one manufacturing operation's cost (for example planarizing) and/or a multiplicity of manufacturing operations' costs. As illustrative example, cost of manufacture models can be directed at one manufacturing operation's cost (for example, adding copper) and a second operation (for example, removing copper) and interrelationships and interactions therebetween. As further illustration, the first manufacturing operation can add a material (for example, copper) and the amount of material added (for example, copper) can impact the quality and cost to remove the material in the second operation (for example, copper) and thus the cost of manufacture. As illustrative example, cost of manufacture models can be directed at one manufacturing patterning operation and a second manufacturing operation (for example, planarizing) and effects patterning plays on the planarizing operation.

Artisans, given the teachings and guidance herein, generally understand when manufacturing operations are related. As an illustrative example, when a manufacturing operation "A" (including information therefrom) can influence a manufacturing operation "B", then manufacturing operation "A" is related to and/or related in part to manufacturing operation "B". As an illustrative example, when a manufacturing operation "A" (including information therefrom) can affect a manufacturing operation "B", then manufacturing operation "A" is related to and/or related at least in part to manufacturing operation "B". As an illustrative example, when a manufacturing operation "A" (including information therefrom) can be used and influence a process model for a manufacturing operation "B", then manufacturing operation "A" is related to and/or related at least in part to manufacturing operation "B". As an illustrative example a first manufacturing can add a material (for example, copper) and a second operation can remove material (for example, copper). As further illustration, the first manufacturing can add a material (for example, copper) and the amount of material added (for example, copper) can impact the quality and cost to remove the material in the second operation (for example, copper). As an illustrative example, when a manufacturing operation "A" (including information therefrom) is used for feedforward and/feedback control for a manufacturing operation "B", then manufacturing operation "A" is related to and/or related at least in part to manufacturing operation "B". Operation "A" and operation "B" can be carried out in any order such as operation "A" first, operation "B" first, or the operations performed simultaneously and/or at least in part simultaneously. Using the teachings and guidance herein artisans in the art can readily understand related manufacturing operations and/or manufacturing information useful in the instant methods and apparatus.

Some portions of the invention are presented in terms of electronic operations, procedures, steps, logic blocks, processor processing, controlling, determining and other symbolic representations of operations on information and/or data bits that can be performed on processor readable and/or computer readable memory. These descriptions and representations are the means used by those skilled in the data processing arts and/or process control arts to which effectively convey the substance of their work to others skilled in the art. A procedure, computer executed step, logic block, process, etc., is here, and generally, conceived to be a self-consistent sequence of steps or instructions or firmware leading to a targeted result. The operations and/or steps are those requiring physical manipulations of physical quantities. Usually, though not necessarily, these quantities take the form of electrical or magnetic signals capable of being stored, transferred, combined, compared, and otherwise manipulated in a processor and/or computer system. Generally information can be referred to as bits, values, elements, symbols, characters, terms, numbers, or the like.

It is generally recognized within the context in which they are used that all of these and similar terms can be associated with the appropriate physical quantities and are merely convenient labels applied to these quantities. Discussions utilizing terms in association such as "accessing" or "computing" or "calculating" or "determining" or "selecting" or "storing" or "selecting" or "moving" or "changing" or "determining" or "optimizing" or "evaluating" or "estimating" or "measuring" or "recording" or "associating" or the like, generally refer to the action and processes of a processor, controller, or computer system, or similar electronic processing or computing device, that manipulates, changes, and/or transforms data represented as physical (electronic) quantities within the processor, memory, and/or a computer system's registers and memories into other data similarly represented as physical quantities within the computer system memories or registers or other such information storage, transmission or display devices when discussing electronic processing.

What has been described above includes illustrations of the embodiments of the invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. To the extent that the term "includes" is used in either the detailed description or the claims, such term is intended to be inclusive in a manner similar to the term "comprising" as "comprising" is interpreted when employed as a transitional word in a claim.

I claim:

1. A system for processing a workpiece comprising:
   at least one planarizing apparatus "A" for a planarizing operation;
   at least one piece of workpiece fabrication machinery "B" other than said planarizing apparatus "A";
   at least one piece of metrology equipment;
   at least one processor;
   at least one processor readable memory device;
   at least one operative computerized network connecting said processor, said processor readable memory device, said planarizing apparatus "A", said workpiece fabrication machinery "B", and said metrology equipment;
   at least one operative sensor for sensing an item of in situ planarizing information; and
   wherein said processor readable memory device includes stored information comprising:
      (i) at least one cost of manufacture model which includes an item of cost information related to the planarizing operation,
      (ii) said item of in situ planarizing information,
      (iii) at least one process model related to the planarizing operation,
      (iv) an item of information from the metrology equipment related to the planarizing operation, and
      (v) an item of information related to the workpiece fabrication machinery "B" and the planarizing operation; and
   at least one operative controller for controlling a manufacturing operation operatively connected to the stored information.

2. The system according to claim 1 wherein said item of cost information comprises an item of cost of manufacture information related to a yield.

3. The system according to claim 1 wherein said stored information additionally includes encoded instructions that if executed by the at least one processor determines and controls said operative controller to change the cost of manufacture using:
   (i) said cost of manufacture model,
   (ii) said in situ item of information related to the planarizing operation,
   (iii) said process model related to the planarizing operation,
   (iv) said item of information from the metrology equipment related to the planarizing operation, and
   (v) said item of information related to said workpiece fabrication machinery "B" and said planarizing operation.

4. The system according to claim 3 wherein said item of cost information comprises an item of cost of manufacture information related to a yield.

5. The system according to claim 3 wherein said item of cost information comprises an item of cost of manufacture information related to an equipment yield.

6. The system of claim 3 wherein said item of cost information comprises an item of activity based cost of manufacture information.

7. The system according to claim 6 wherein said item of activity based cost of manufacture information comprises an item of activity based cost of manufacture information related to a maintenance cost.

8. The system according to claim 1 wherein the stored information additionally includes encoded instructions that if executed by the at least one processor determines and controls in real time said operative controller using:
   (i) said cost of manufacture model,
   (ii) said in situ information related at least in part to the planarizing operation,
   (iii) said process model related at least in part to the planarizing operation,
   (iv) said item of information from the at least one piece of metrology equipment related at least in part to the planarizing operation, and
   (v) said item of information related to said workpiece fabrication machinery "B" and said planarizing operation.

9. The system according to claim 8 wherein said item of cost information comprises an item of cost of manufacture information related to a yield.

10. The system according to claim 8 wherein said item of cost information comprises an item of in situ cost of manufacture information related to an equipment yield.

11. The system according to claim 8 wherein said system comprises a factory.

12. The system of claim 8 wherein said item of cost information comprises an item of activity based cost of manufacture information.

13. The system according to claim 12 wherein said item of activity based cost of manufacture information comprises an item of activity based cost of manufacture information related to a maintenance cost.

14. The system according to claim 1 wherein the stored information additionally includes encoded instructions that if executed by the at least one processor determines and controls in situ said operative controller using:
 (i) said cost of manufacture model,
 (ii) said in situ item of information related to the planarizing operation,
 (iii) said one process model related to the planarizing operation,
 (iv) said item of information from the metrology equipment related to the planarizing operation, and
 (v) said item of information related to said workpiece fabrication machinery "B" and said planarizing operation.

15. The system according to claim 14 wherein said item of cost information comprises an item of cost of manufacture information related to a yield.

16. The system according to claim 14 wherein said system comprises a factory.

17. The system of claim 1 wherein said item of cost information comprises an item of activity based cost of manufacture information.

18. The system according to claim 1 wherein said system comprises a factory.

19. The system according to claim 17 wherein said cost of manufacture model comprises at least one cost of manufacture model including an item of real time cost of manufacture information and wherein the planarizing apparatus "A" comprises an apparatus for applying an electrochemical energy for adding a material to the workpiece.

20. The system according to claim 17 wherein said item of activity based cost information comprises a multiplicity of activity based cost information items from a multiple of different levels of activity costs and a multiple of different cost drivers in each of the multiple of different levels of the activity costs.

21. The system according to claim 17 wherein said item of activity based cost of manufacture information comprises an item of activity based cost of manufacture information related to a maintenance cost.

* * * * *